(12) United States Patent
Kasai

(10) Patent No.: US 8,491,169 B2
(45) Date of Patent: Jul. 23, 2013

(54) FRAME, LIGHT SOURCE DEVICE, DISPLAY DEVICE, AND TELEVISION RECEIVER

(75) Inventor: Nobuhiro Kasai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 58 days.

(21) Appl. No.: 13/141,755

(22) PCT Filed: Oct. 20, 2009

(86) PCT No.: PCT/JP2009/068045
§ 371 (c)(1),
(2), (4) Date: Jun. 23, 2011

(87) PCT Pub. No.: WO2010/073805
PCT Pub. Date: Jul. 1, 2010

(65) Prior Publication Data
US 2011/0255015 A1  Oct. 20, 2011

(30) Foreign Application Priority Data

Dec. 25, 2008  (JP) .................................. 2008-330152
Mar. 3, 2009   (JP) .................................. 2009-048975

(51) Int. Cl.
*F21V 17/06* (2006.01)
(52) U.S. Cl.
USPC ..................... 362/433; 362/97.4; 362/217.15; 362/311.01; 362/632; 362/633; 349/58; 349/61
(58) Field of Classification Search
USPC ................. 362/97.1, 97.2, 97.4, 257, 311.01, 362/317, 433, 632–634, 217.15, 268, 330; 349/58, 61
See application file for complete search history.

(56) References Cited

U.S. PATENT DOCUMENTS

| | | | |
|---|---|---|---|
| 2006/0055839 | A1 | 3/2006 | Hirao et al. |
| 2009/0268121 | A1 | 10/2009 | Hisada |
| 2009/0296375 | A1 | 12/2009 | Iwamoto |

FOREIGN PATENT DOCUMENTS

| | | |
|---|---|---|
| CN | 101201488 A | 6/2008 |
| JP | 03-075477 U | 7/1991 |
| JP | 2003-288802 A | 10/2003 |
| JP | 2004-235103 A | 8/2004 |
| JP | 2004-327449 A | 11/2004 |
| WO | 2006/134735 A1 | 12/2006 |
| WO | 2007/026454 A1 | 3/2007 |
| WO | 2007/049379 A1 | 5/2007 |

OTHER PUBLICATIONS

Official Communication issued in International Patent Application No. PCT/JP2009/068045, mailed on Jan. 19, 2010.

*Primary Examiner* — Stephen F Husar
*Assistant Examiner* — Meghan Dunwiddie
(74) *Attorney, Agent, or Firm* — Keating & Bennett, LLP

(57) ABSTRACT

A frame, a light source device and a display device that are capable of preventing a wrinkle or distortion from occurring in optical members. The frame includes a first holding face (611) opposed to a border portion on one face in a thickness direction of a first optical member (701α, 701β) having a plate shape that includes a female engagement portion (7011α, 7011β) disposed on its border portion, a male engagement portion (62α, 62β, 62γ, 62δ) having a convex shape that is arranged to be engaged with the female engagement portion (7011α, 7011β), and a second holding face (612a, 612b, 612c, 612d) opposed to an end face in a plane direction of a second optical member (702) having a sheet shape or a film shape that is smaller than the first optical member.

18 Claims, 35 Drawing Sheets

FRAME, LIGHT SOURCE DEVICE, DISPLAY DEVICE, AND TELEVISION RECEIVER

TECHNICAL FIELD

The present invention relates to a frame, a light source device, a display device and a television receiver, and specifically relates to a frame that is arranged to hold optical members for controlling the properties of light transmitted therethrough and is favorably used in a liquid crystal display device, a light source device including the frame, a display device including the light source device, and a television receiver including the display device.

BACKGROUND ART

A display device that includes a non-self-emissive display panel such as a transmissive liquid crystal display panel generally includes a light source device that is disposed behind the display panel (also referred to as a "backlight device"). The light source device included in the display device is capable of illuminating the back surface of the display panel with light. When the back surface of the display panel is illuminated with the light, an image is displayed visible on the front surface of the display panel.

Examples of the light source device that is used in the display device include a direct light source device and a side-edge light source device. Among them, the direct light source device includes, for example, a chassis having the shape of a tray of low height, a light source such as a fluorescent tube, an optical member having a plate shape that is arranged to control the properties of light transmitted therethrough, optical members that are more deformable than the plate-shaped optical member (e.g., optical members having a sheet or film shape that are thinner than the plate-shaped optical member), a frame having a substantially square shape with an opening, and other predetermined members. The plate-shaped optical member, and the sheet-shaped or film-shaped optical members are also referred to as optical sheets.

In the light source device, the light source is disposed in front of the chassis, and the plate-shaped optical member and the sheet-shaped or film-shaped optical members are disposed in front of the chassis and the light source. The frame is attached to a front surface of the chassis while the light source, the plate-shaped optical member and the sheet-shaped or film-shaped optical members are disposed in front of the chassis.

Thus, a border portion of the plate-shaped optical member is sandwiched between a front surface of the chassis and a back surface of the frame, whereby the plate-shaped optical member is held in the light source device. The sheet-shaped or film-shaped optical members are layered on the front surface of the plate-shaped optical member. The light source device having the configuration described above is arranged to control the properties of the light emitted from the light source with the use of the optical members, and to illuminate the back surface of the display panel with the light the optical members transmit.

It is preferable that the plate-shaped optical member and the sheet-shaped or film-shaped optical members are supported such that no wrinkle or no distortion occurs therein. If a wrinkle or distortion occurs in these optical members, intensity distribution in a plane direction of the light emitting toward the back surface of the display panel could be nonuniform. The nonuniform intensity distribution in the plane direction of the emitted light could produce luminance unevenness or shadow on a screen of the display panel. The luminance unevenness or shadow could lower display quality of the display device. That is the reason why it is preferable that the optical members are supported such that no wrinkle or no distortion occurs therein.

During the use of the light source device, heat liberated by the light source could cause the optical members to expand. Having the above-described configuration that its border portion is in contact with or stuck between the front surface of the chassis and the back surface of the frame, the plate-shaped optical member has the border portion hindered from deforming, whereby a wrinkle or distortion could occur in the vicinity of the border portion, or the border portion could bend overall. Hence, in order that the border portion of the plate-shaped optical member may not be fixed, the clearance between the front surface of the chassis and the back surface of the frame is increased in size more than the thickness of the plate-shaped optical member (in using a plurality of plate-shaped optical members, more than the sum of their thicknesses). Consequently, the border portion of the plate-shaped optical member is not hindered from deforming, which can prevent a wrinkle or distortion from occurring in the plate-shaped optical member, or the plate-shaped optical member from bending.

However, because this configuration forms a clearance between the plate-shaped optical member and the back surface of the frame, a border portion of the sheet-shaped or film-shaped optical members that are disposed in front of the plate-shaped optical member could get into the formed clearance and get fixed therein. In such a case, an unexpected force could be exerted on the sheet-shaped or film-shaped optical members, causing a wrinkle or distortion to occur therein. In addition, when heat liberated by the light source could cause the sheet-shaped or film-shaped optical members in the fixed state to expand, a wrinkle or distortion could occur in the vicinity of the border portion.

In order that the border portion of the sheet-shaped or film-shaped optical members may not get into the clearance between the plate-shaped optical member and the back surface of the frame, the clearance between the plate-shaped optical member and the back surface of the frame may be decreased in size less than the thickness of the sheet-shaped or film-shaped optical members. However, the sheet-shaped or film-shaped optical members, the plate-shaped optical member or the frame is sometimes deformed elastically to get into the clearance. Getting into and being stuck in the clearance between the plate-shaped optical member and the frame, the border portion of the sheet-shaped or film-shaped optical members is hindered from deforming, causing a wrinkle or distortion to occur in the vicinity of the border portion of the sheet-shaped or film-shaped optical members.

As described above, it is difficult to prevent a wrinkle or distortion from occurring in the sheet-shaped or film-shaped optical members while preventing a wrinkle or distortion from occurring in the plate-shaped optical member in the light source device having the configurations described above. In other words, when a plurality of optical members are used, it is difficult to prevent a wrinkle or distortion from occurring in an optical member while preventing a wrinkle or distortion from occurring in another optical member.

CITATION LIST

Patent Literature
PTL 1: JP2004-235103

SUMMARY OF INVENTION

Technical Problem

In order to overcome the problems described above, one prefer red embodiment of the present invention provides a frame that is capable of preventing a border portion of an optical member from getting into a clearance between the other optical member and the frame, and provides a light source device, a display device, and a television receiver.

Another preferred embodiment of the present invention provides a frame that is capable of preventing a wrinkle or distortion from occurring in an optical member while preventing a wrinkle or distortion from occurring in the other optical member, and provides a light source device, a display device, and a television receiver. Another preferred embodiment of the present invention provides a frame that allows an optical member to easily deform and prevents another optical member from getting into the clearance by providing a clearance between the optical member and the frame, and provides a light source device, a display device, and a television receiver. Another preferred embodiment of the present invention provides a frame that is capable of preventing a wrinkle or distortion from occurring in optical members and thus preventing occurrence of luminance unevenness or shadow, and provides a light source device, a display device, and a television receiver.

In addition, in order to overcome the problems described above, another preferred embodiment of the present invention provides a frame for a light source device that is capable of preventing an optical member having a sheet or film shape from getting into a clearance between an optical member having a plate shape and the frame, and provides a light source device, a display device, and a television receiver. Another preferred embodiment of the present invention provides a frame for a light source device that is capable of preventing a wrinkle or distortion from occurring in an optical member having a sheet or film shape while preventing a wrinkle or distortion from occurring in an optical member having a plate shape, and provides a light source device, a display device, and a television receiver. Another preferred embodiment of the present invention provides a frame for a light source device that allows an optical member having a plate shape to easily deform and prevents an optical member having a sheet or film shape from getting into the clearance by providing a clearance between the plate-shaped optical member and the frame, and provides a light source device, a display device, and a television receiver. Another preferred embodiment of the present invention provides a frame for a light source device that is capable of preventing a wrinkle or distortion from occurring in an optical member having a plate shape and an optical member having a sheet or film shape and thus preventing occurrence of luminance unevenness or shadow, and provides a light source device, a display device, and a television receiver.

Solution to Problem

Preferred embodiments of the present invention provide a frame for holding a first optical member and a second optical member that includes a first holding face disposed opposed to a border portion on one face in a thickness direction of the first optical member, a second holding face disposed opposed to an end face in a plane direction of the second optical member, and a male engagement portion arranged to be engaged with a female engagement portion disposed at a given position on the border portion of the first optical member.

The second holding face preferably corresponds inside an outer periphery of the first optical member in a state where the male engagement portion is engaged with the female engagement portion of the first optical member.

It is preferable that the frame further includes an opening that is smaller than an outer dimension of the first optical member and larger than an outer dimension of the second optical member, or an opening having a configuration such that the first optical member cannot pass therethrough while the second optical member can pass therethrough. An inner peripheral surface of the opening functions as the second holding face, or the second holding face is provided to an inner peripheral surface of the opening. It is to be noted that "the first optical member cannot pass therethrough" means that the first optical member cannot pass through (cannot get into) the opening when it is maintained almost flat and its plane direction is made almost parallel to the plane direction of the frame.

The inner peripheral surface of the opening preferably includes a protrusion that protrudes inward. The protrusion preferably includes a third holding face disposed opposed to a border portion on one face in a thickness direction of the second optical member.

It is also preferable that the frame further includes an opening that is smaller than an outer dimension of the first optical member and an outer dimension of the second optical member, an opening having a configuration such that the first optical member and the second optical member cannot pass therethrough. It is to be noted that "the first optical member and the second optical member cannot pass therethrough" means that the first optical member and the second optical member cannot pass through (cannot get into) the opening when they are maintained almost flat and their plane direction is made almost parallel to the plane direction of the frame. The second holding face is disposed outer than an inner peripheral surface of the opening.

The second holding face preferably corresponds inside an outer periphery of the first optical member in a state where the male engagement portion is engaged with the female engagement portion of the first optical member.

The first holding face is preferably disposed outer than the second holding face, and the third holding surface is preferably disposed inner than the second holding face.

The second holding face is preferably a receding surface.

The male engagement portion is preferably a structure having a convex shape

At least a portion of a lateral surface of the male engagement portion preferably almost coincides with the second holding face.

The male engagement portion preferably has a lateral surface having a projecting shape, the lateral surface being oriented in a direction same as the second holding face. Alternatively, the male engagement portion preferably has a lateral surface defining a curved surface that projects, the lateral surface being oriented in a direction same as the second holding face.

The male engagement portion preferably has a substantially round shape, a substantially oval shape, or a substantially half-round shape.

The frame preferably has the outside shape of a substantially square, and the male engagement portions are each disposed preferably at positions close to both ends of all sides of the frame.

In another aspect of the present invention, alight source device includes the frame according to the preferred embodiment of the present invention, a light source, a first optical member that includes a female engagement portion disposed at a given position on a border portion of the first optical member and is arranged to control properties of light transmitted therethrough, a second optical member that is arranged to control properties of light transmitted therethrough, and a chassis that includes a support face on which a border portion of the first optical member is placed, the light source being disposed in front of the chassis, the first optical member being disposed in front of the chassis and the light source, the frame being attached to a front surface of the chassis, wherein the border portion of the first optical member is held between the support face of the chassis and the first holding face of the frame while the male engagement portion of the frame is engaged with the female engagement portion of the first optical member, and the second optical member fits in the region surrounded by the second holding face of the frame.

The first optical member is preferably an optical member that has a plate shape, and the second optical member is preferably an optical member that is more deformable than the first optical member.

Yet, in another aspect of the present invention, a light source device includes the frame according to the preferred embodiment of the present invention, alight source, one or more first optical members that include a female engagement portion disposed at a given position on a border portion of the one or more first optical members, and are arranged to control properties of light transmitted therethrough, one or more second optical members that are arranged to control properties of light transmitted therethrough, one or more third optical members that are arranged to control properties of light transmitted therethrough, and a chassis that includes a support face on which a border portion of the one or more first optical members and a border portion of the one or more third optical members are placed, the light source being disposed in front of the chassis, the one or more third optical members being disposed in front of the chassis and the light source, the one or more first optical members being disposed in front of the one or more third optical members, the frame being attached to a front surface of the chassis, wherein the border portion of the one or more first optical members and the border portion of the one or more third optical members are held between the support face of the chassis and the first holding face of the frame while the male engagement portion of the frame is engaged with the female engagement portion of the one or more first optical members, and the one or more second optical members fit in the region surrounded by the second holding face of the frame.

The one or more first optical members and the one or more third optical members are preferably optical members that have a plate shape, and the one or more second optical members are preferably optical members that are more deformable than the one or more first optical members and the one or more third optical members.

The female engagement portion is preferably a notch or a through-hole.

Yet, in another aspect of the present invention, a display device includes the light source device according to the preferred embodiment of the present invention, and a display panel arranged to perform display using light emitted from the light source device. The display panel is preferably a liquid crystal display panel that includes a pair of substrates, and liquid crystals that are filled between the substrates.

Yet, in another aspect of the present invention, a display device includes the light source device according to the preferred embodiment of the present invention, a transmissive display panel, and a bezel having a frame shape, the display panel being disposed in front of the frame of the light source device, the bezel being attached to front surfaces of the light source device and the display panel.

Yet, in another aspect of the present invention, a television receiver includes the display device according to the preferred embodiment of the present invention.

Yet, in another aspect of the present invention, a frame for a light source device that is arranged to hold an optical member having a plate shape that includes a notch at a given position on its outer periphery includes a front side section having a substantially square shape that includes an opening having a substantially same shape as the optical member and being smaller than an outer dimension of the optical member, a surface disposed opposed to an end face of the optical member, and an engagement projection having a convex shape that is arranged to be engaged with the notch of the optical member, and disposed opposed to a border portion of the optical member.

At least a portion of a lateral surface of the engagement projection preferably almost coincides with an inner peripheral surface of the front side section, the inner peripheral surface facing the opening.

At least a portion of a lateral surface of the engagement projection preferably has a shape projecting toward the opening. Alternatively, at least a portion of a lateral surface of the engagement projection preferably has a shape projecting toward the opening, and the lateral surface includes a curved surface.

The engagement projection preferably has a substantially round shape, a substantially oval shape, or a substantially half-round shape.

The engagement projections are each disposed preferably at positions close to both ends of all sides of the front side section.

Yet, in another aspect of the present invention, a light source device includes the frame for the light source device according to the preferred embodiment of the present invention, a light source, an optical member having a plate shape that includes a notch disposed at a given position on its outer periphery and is arranged to control properties of light transmitted therethrough, an optical member having a sheet shape or a film shape that has a size almost same as or smaller than the opening of the frame, and a chassis having a substantially flat plate shape that includes a support face on which a border portion of the plate-shaped optical member is placed, the light source being disposed in front of the chassis, the plate-shaped optical member being disposed in front of the chassis and the light source, the frame being attached to a front surface of the chassis, wherein the border portion of the plate-shaped optical member is held between the support face of the chassis and the front side section of the frame while the engagement projection of the frame is engaged with the notch, and the sheet-shaped or film-shaped optical member fits in the region surrounded by the engagement projection of the frame.

Yet, in another aspect of the present invention, a light source device includes the frame for the light source device according to the preferred embodiment of the present invention, a light source, one or more first optical members having a plate shape that are arranged to control properties of light transmitted therethrough, a second optical member having a plate shape that includes a notch disposed at a given position on its outer periphery and is arranged to control properties of light transmitted therethrough, an optical member having a sheet shape or a film shape that has a size almost same as or smaller than the opening of the frame, and a chassis having a substantially flat plate shape that includes a support face on which border portions of the one or more first optical members and the second optical member are placed, the light source being disposed in front of the chassis, the one or more first optical members being disposed in front of the chassis and the light source, the second optical member being disposed in front of the one or more first optical members, the frame being attached to a front surface of the chassis, wherein the border portions of the one or more first optical members and the second optical member are held between the support face of the chassis and the front side section of the frame while the engagement projection of the frame is engaged with the notch, and the sheet-shaped or film-shaped optical member fits in the region surrounded by the engagement projection of the frame.

Yet, in another aspect of the present invention, a display device includes the light source device according to the preferred embodiment of the present invention, and a display panel arranged to perform display using light emitted from the light source device. The display panel is preferably a liquid crystal display panel that includes a pair of substrates, and liquid crystals that are filled between the substrates.

Yet, in another aspect of the present invention, a display device includes the light source device according to the preferred embodiment of the present invention, a transmissive display panel, and a bezel having a square shape with an opening, the display panel being disposed in front of the frame of the light source device, the bezel being attached to front surfaces of the light source device and the display panel.

Yet, in another aspect of the present invention, a television receiver includes the display device according to the preferred embodiment of the present invention.

Advantageous Effects of Invention

According to the preferred embodiments of the present invention, the male engagement portion provided to the frame is arranged to be engaged with the female engagement portion disposed at the given position on the border portion of the one optical member (first optical member). With this configuration, no clearance is formed between the surface of the one optical member (first optical member) and the top surface of the male engagement portion. Thus, the other optical member (second optical member) can only shift on the surface of the one optical member (first optical member) until an end face in the plane direction of the other optical member (second optical member) touches the male engagement portion. The shift of the other optical member (second optical member) is confined by the male engagement portion.

The male engagement portion prevents the border portion of the other optical member (second optical member) from getting into a clearance, even formed, between the surface of the one optical member (first optical member) and the first holding face. To be specific, the prevention of the border portion of the other optical member (second optical member) from getting into the clearance can be achieved while the border portion of the one optical member (first optical member) is not hindered from deforming (or, is made to easily deform), which can prevent a wrinkle or distortion from occurring in the other optical member (second optical member) while preventing a wrinkle or distortion from occurring in the one optical member (first optical member).

In addition, the other optical member (second optical member) is disposed in the region surrounded by the second holding face of the frame. If at least the portion of the lateral surface of the male engagement portion almost coincides with the second holding face, the other optical member (second optical member) is prevented from shifting out of the region surrounded by the second holding face and thus can be kept in the region.

According to the preferred embodiments of the present invention, the engagement projection provided to the frame is arranged to be engaged with the notch disposed at the given position on the border portion of the plate-shaped optical member. With this configuration, no clearance is formed between the engagement projection and the plate-shaped optical member. Thus, the engagement projection does not let the sheet-shaped or film-shaped optical member get into a space between the plate-shaped optical member and the back surface of the frame, which can prevent the sheet-shaped or film-shaped optical member from getting into between the plate-shaped optical member and the frame.

The engagement projection that confines the shift of the sheet-shaped or film-shaped optical member prevents the border portion of the sheet-shaped or film-shaped optical member from getting into a clearance, even formed, between the plate-shaped optical member and the back surface of the frame. To be specific, the prevention of the border portion of the sheet-shaped or film-shaped optical member from getting into the clearance can be achieved while the border portion of the plate-shaped optical member is not hindered from deforming (or, is made to easily deform), which can prevent a wrinkle or distortion from occurring in the sheet-shaped or film-shaped optical member while preventing a wrinkle or distortion from occurring in the plate-shaped optical member.

Because a wrinkle or distortion can be prevented from occurring in the sheet-shaped or film-shaped optical member and the plate-shaped optical member, luminance unevenness or shadow resulting from a wrinkle or distortion in the sheet-shaped or film-shaped optical member is prevented from showing up. Therefore, the display quality of the display device including the light source device can be maintained or improved.

If at least the portion of the lateral surface of the engagement projection has the shape projecting toward the opening (e.g., the lateral surface includes the curved surface), the sheet-shaped or film-shaped optical member and the plate-shaped optical member, even when shifting or changing in dimension to get into the engagement projection, get in contact with the curved surface of the engagement projection. Thus, a local force is prevented from being exerted on the portion in contact, which can prevent occurrence of a wrinkle or distortion therein, and luminance unevenness or shadow resulting from a wrinkle or distortion is prevented from showing up. Therefore, the display quality of the display device including the light source device can be maintained or improved.

DESCRIPTION OF EMBODIMENTS

A detailed description of preferred embodiments of the present invention will now be provided with reference to the accompanying drawings.

Frame 6a, 6b, 6c, 6d according to the preferred embodiments of the present invention is arranged to hold a first optical member 701α, 701β, and a second optical member 702. The first optical member 701α, 701β has the outside shape of a substantially square plate and is arranged to control the properties of light transmitted therethrough. The second optical member 702 is more deformable than the first optical member 701α, 701β and is arranged to control the properties of light transmitted therethrough. Examples of the second optical member 702 include an optical member having the outside shape of a substantially square sheet or film that is thinner than the first optical member 701α, 701β. The outer dimension of the second optical member 702 is set to be smaller than that of the first optical member 701α, 701β. To be specific, when the second optical member 702 is placed on the first optical member 701α, 701β, the outer periphery of the second optical member 702 corresponds inside that of first optical member 701α, 701β.

Figure 1:
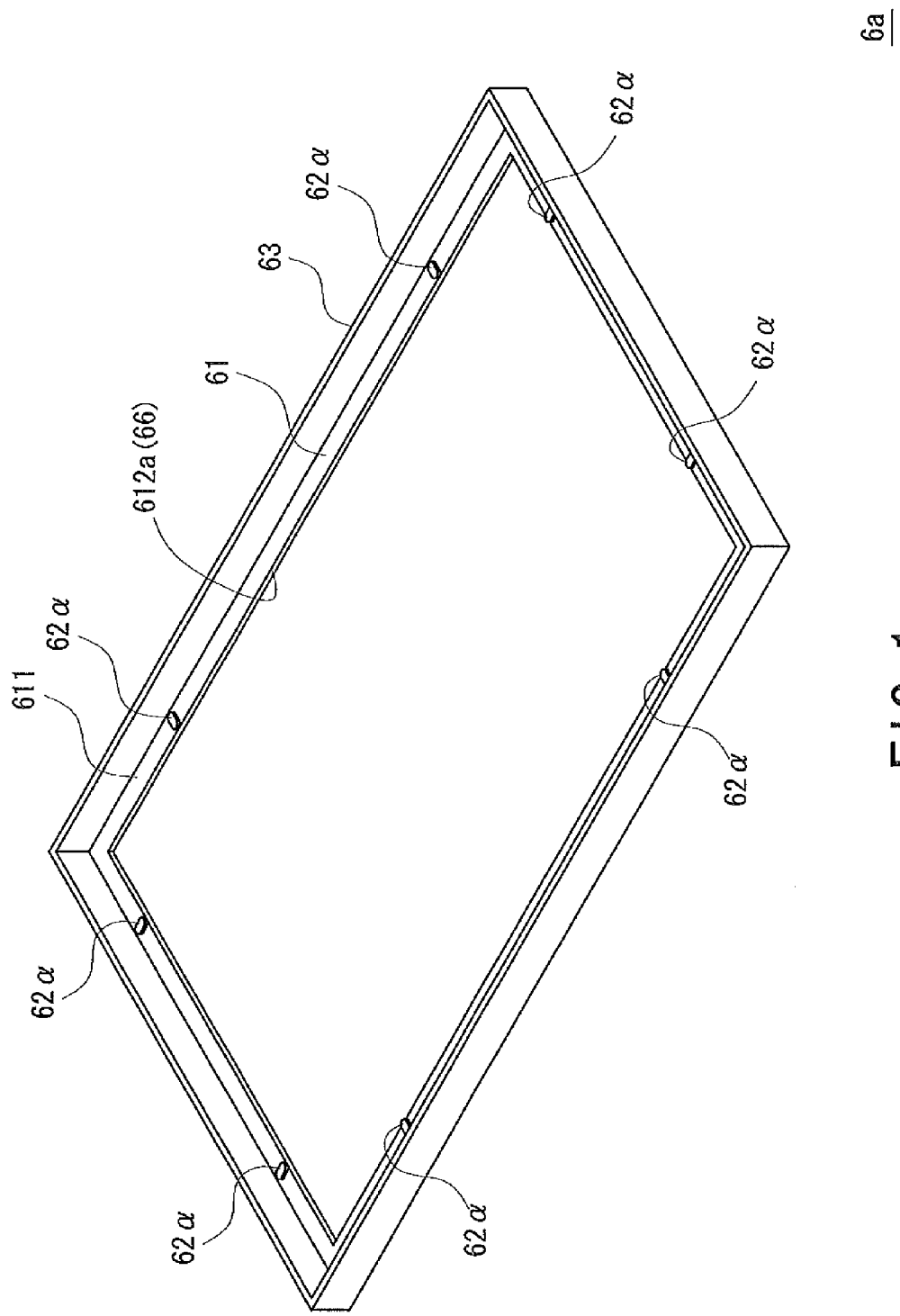
FIG. 1 is an external perspective view showing a schematic configuration of a frame according to a first preferred embodiment of the present invention.
Figure 2:
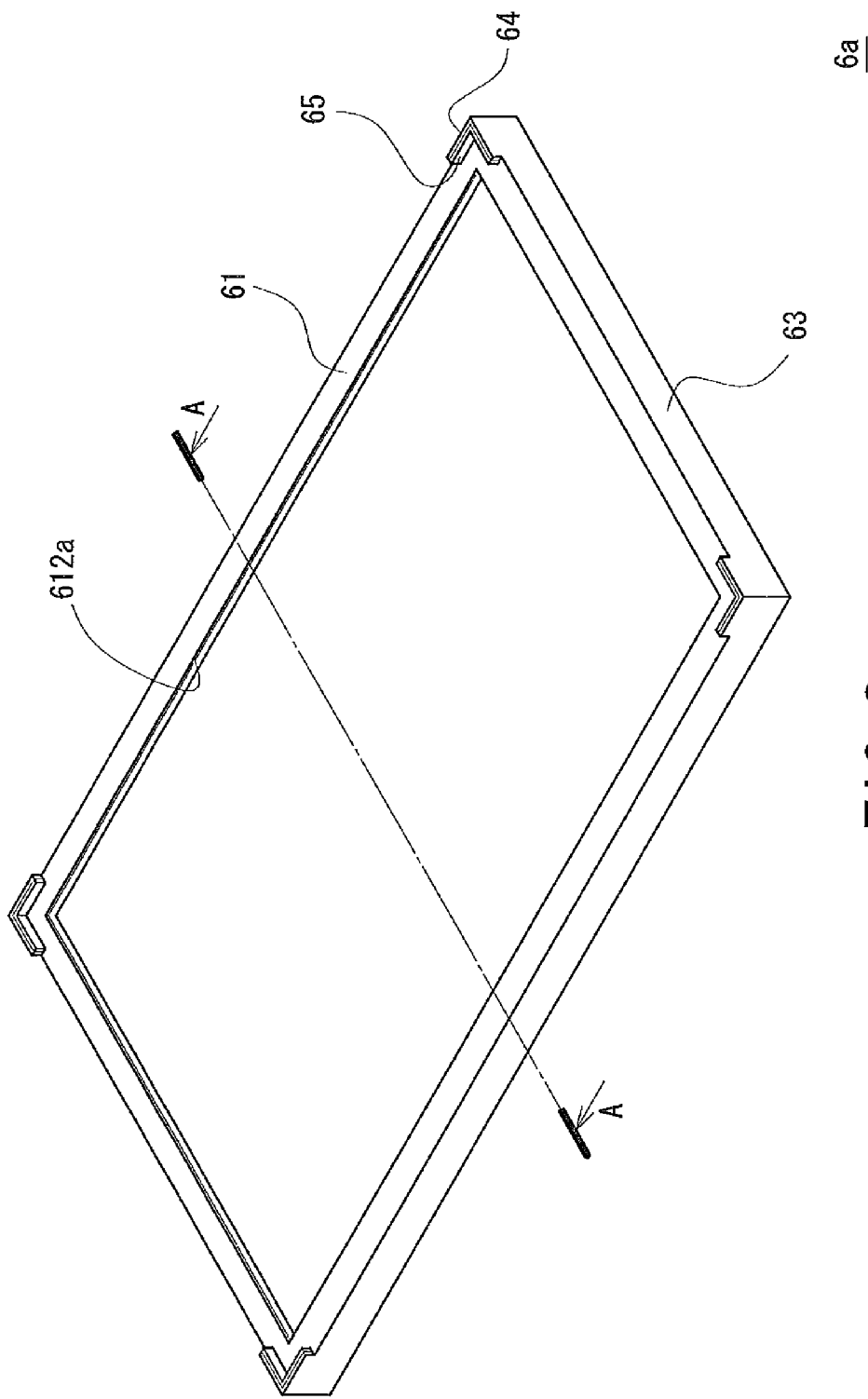
FIG. 2 is an external perspective view showing a schematic configuration of the frame according to the first preferred embodiment of the present invention, which is seen from the side opposite to the side from which the frame is seen in FIG. 1.
Figure 3:
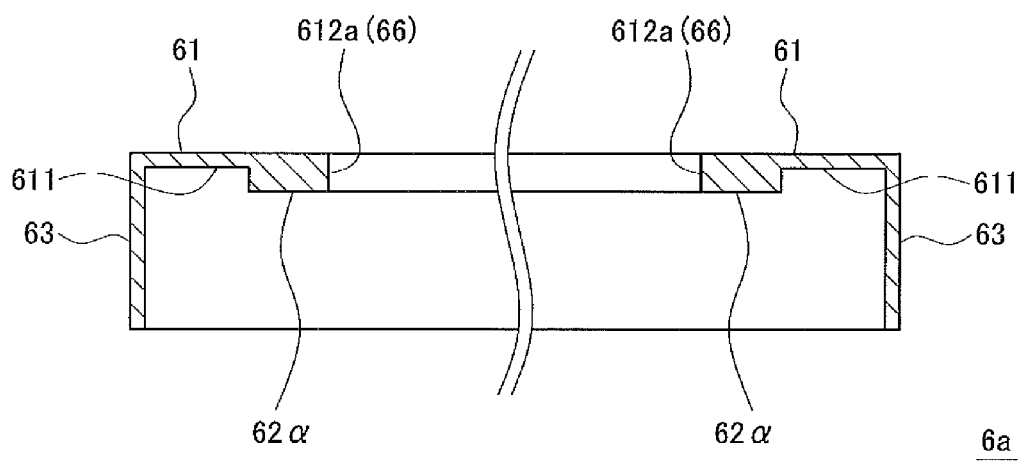
FIG. 3, which is a cross-sectional view showing the frame according to the first preferred embodiment of the present invention along the line A-A in the direction of the arrow of FIG. 2, is a schematic view showing a cross section structure of the frame.

A description of the frame 6a according to the first preferred embodiment of the present invention will be provided. FIG. 1 is an external perspective view showing a schematic configuration of the frame 6a according to the first preferred embodiment of the present invention. FIG. 2 is an external perspective view showing a schematic configuration of the frame 6a according to the first preferred embodiment of the present invention, which is seen from the side opposite to the side from which the frame 6a is seen in FIG. 1. FIG. 3, which is a cross-sectional view showing the frame 6a according to the first preferred embodiment of the present invention along the line A-A in the direction of the arrow of FIG. 2, is a schematic view showing a cross section structure of the frame 6a. In FIG. 1, the front surface of the frame 6a faces toward the bottom of FIG. 1, and the back surface faces toward the top of FIG. 1. In FIGS. 2 and 3, the front surface of the frame 6a faces toward the tops of FIGS. 2 and 3, and the back surface faces toward the bottoms of FIGS. 2 and 3.

The frame 6a according to the first preferred embodiment of the present invention has a substantially square shape with an opening.

As shown in FIGS. 1, 2 and 3, the frame 6a includes a front side section 61 having a substantially square shape with an opening. To be specific, the front side section 61 has the outside shape of a substantial square with an opening, where the opening has the shape almost same as the outside shape of the second optical member 702 (i.e., a substantially square shape).

The dimension of the opening is smaller than the outer dimension of the first optical member 701α, 701β, and larger than the outer dimension of the second optical member 702. To be specific, the first optical member 701α, 701β cannot pass through the opening when it is maintained almost flat (i.e., maintained unbent or undistorted) and its plane direction is made almost parallel to a plane direction of the front side section 61. Meanwhile, the second optical member 702 can pass through (get into) the opening even when it is maintained almost flat and its plane direction is made almost parallel to the plane direction of the front side section 61.

Back surfaces on all the sides of the front side section 61 define first holding faces 611 that are arranged to hold the first optical member 701α, 701β. Inner peripheral surfaces 66 of the opening of the front side section 61 defines second holding faces 612a that are arranged to hold the second optical member 702. As shown, the second holding faces 612a are disposed inside the first holding faces 611 (i.e., disposed closer to the opening).

As shown in FIGS. 1 and 2, male engagement portions 62α are provided on the back surfaces on all the sides of the front side section 61 (i.e., the first holding faces 611). The male engagement portions 62α are arranged to be engaged with female engagement portions 7011α, 7011β that are provided at given positions on a border portion (an outer periphery) of the first optical member 701α, 701β. The male engagement portions 62α define structures having a convex shape that protrude toward the back side (i.e., protrusions). Top surfaces (surfaces facing the back side) of the male engagement portions 62α are disposed at a more back side than the first holding faces 611. Portions of lateral surfaces of the male engagement portions 62α almost coincide with the second holding faces 612a (i.e., the inner peripheral surfaces 66 of the opening) of the front side section 61.

The male engagement portions 62α are disposed at given positions on all the sides of the front side section 61. To be specific, the male engagement portions 62α are each disposed at least at positions close to both the ends of all the sides of the front side section 61 (i.e., at two positions on each side of the front side section 61).

In addition, side walls 63 that rise toward the back side are provided at outer peripheral edges of the front side section 61. Thus, each side of the frame 6a according to the first preferred embodiment of the present invention has the shape of the letter L in cross section as especially shown in FIG. 3. In addition, the front side section 61 includes a planar surface on its front surface as shown in FIG. 2, on which a border portion of a display panel is to be placed. The front side section 61 includes locating projections 64 for locating the display panel at predetermined positions on its front surface. The shape or the positions of the locating projections 64 are not limited specifically. For example, the locating projections 64 may have the shape of the letter L and may be disposed at the four corners of the front side section 61 as shown in FIG. 2. The locating projections 64 may each include cushioning materials 65 such as rubber and sponge on their inside surfaces. Thus, the display panel can be placed on the frame 6a so as to be fit into a region surrounded by the locating projections 64.

The frame 6a according to the first preferred embodiment of the present invention may be of a monolithic construction made of a resin material, may be of a multi-component assembled construction made of a resin material, may be of a monolithic construction made of a metal plate that is subjected to press working, or may be of a multi-component assembled construction made of a metal plate that is subjected to press working. The male engagement portions 62α and the front side section 61 may be of a monolithic construction, or may be of a multi-component assembled construction.

Figure 4A:
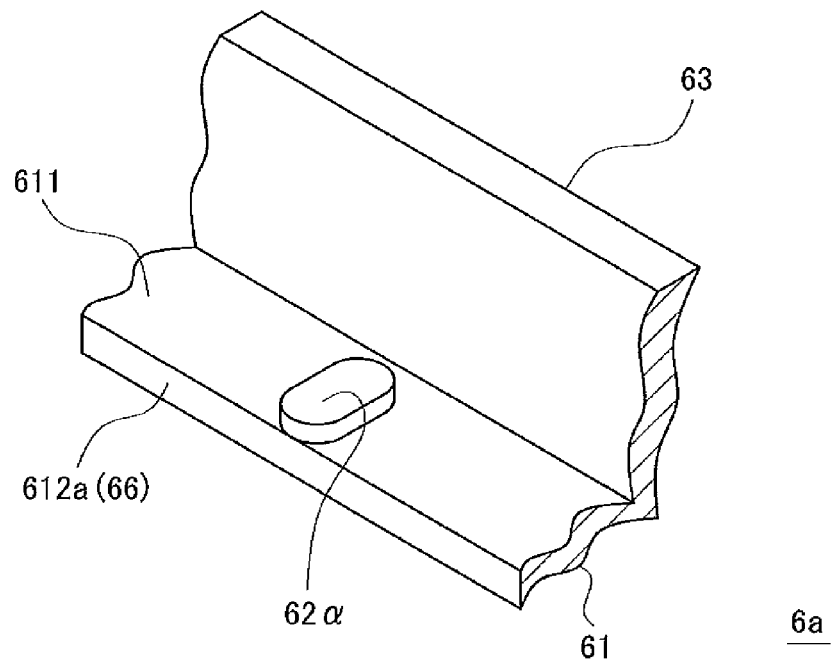
FIGS. 4A and 4B are external perspective views showing a schematic configuration of male engagement portions, where shown in FIG. 4A is a male engagement portion having a substantially oval shape, and shown in FIG. 4B is a male engagement portion having a substantially round shape.
Figure 4B:
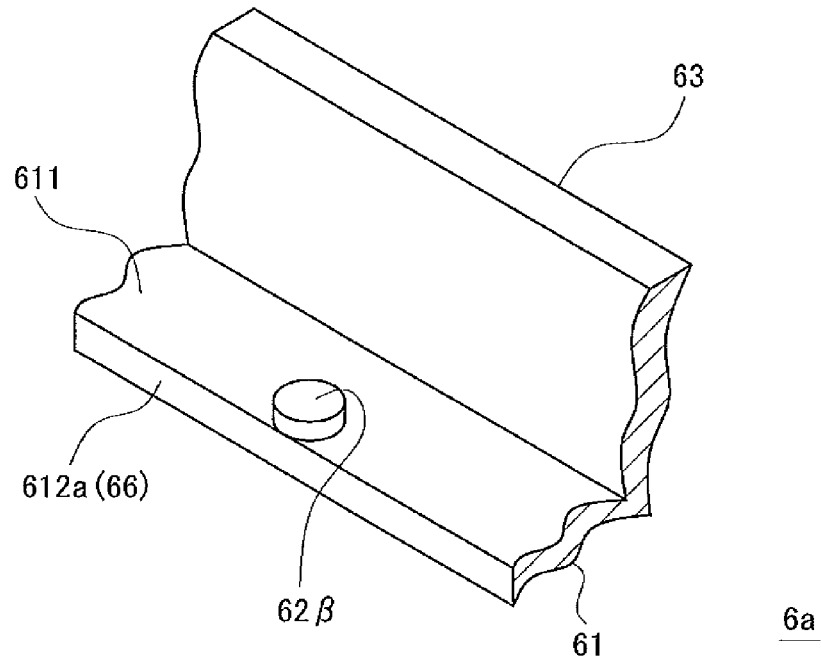
Figure 5A:
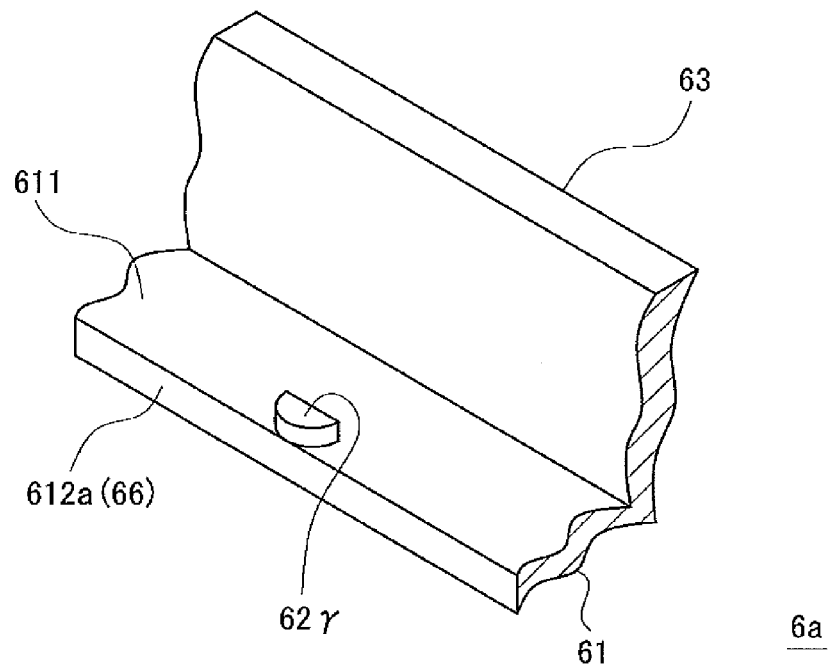
FIGS. 5A and 5B are external perspective views showing a schematic configuration of male engagement portions, where shown in FIG. 5A is a male engagement portion having a substantially half-round shape, and shown in FIG. 5B is a male engagement portion having a substantially square shape.
Figure 5B:
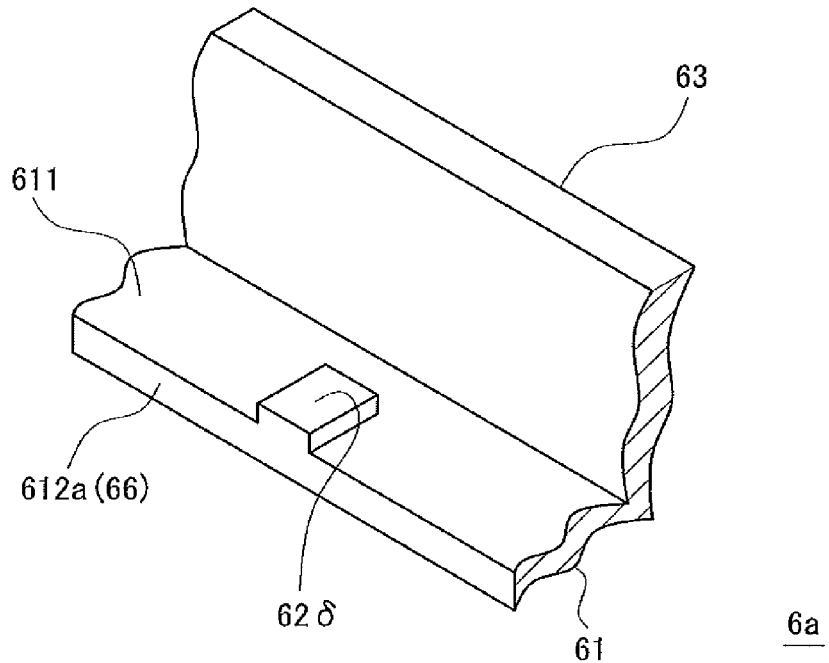

FIGS. 4A and 4B, and 5A and 5B are external perspective views schematically showing the variety of the male engagement portions provided to the frame 6a according to the first preferred embodiment of the present invention. Shown in FIG. 4A is a male engagement portion 62α having a substantially oval shape. Shown in FIG. 4B is a male engagement portion 62β having a substantially round shape. Shown in FIG. 5A is a male engagement portion 62γ having a substantially half-round shape. Shown in FIG. 5B is a male engagement portion 62δ having a substantially square shape.

In the case of the male engagement portions 62α having the substantially oval shape, the axis lines in longitudinal directions of the male engagement portions 62α are substantially perpendicular to longitudinal directions of the sides of the front side section 61 as shown in FIG. 4A. Thus, one ends in the longitudinal directions of the male engagement portions 62α (i.e., the front-ends on curved surfaces of the half-round shapes of the male engagement portions 62α) almost coincide with the second holding faces 612a on the sides of the front side section 61.

In the case of the male engagement portions 62β having the substantially round shape, portions of lateral surfaces of the male engagement portions 62β almost coincide with the second holding faces 612a on the sides of the front side section 61 as shown in FIG. 4B.

In the case of the male engagement portions 62γ having the substantially half-round shape, surfaces corresponding to the arcs of the half-round shapes of the male engagement portions 62γ (i.e., curved surfaces) are oriented in directions same as the second holding faces 612a on the sides of the front side section 61, and surfaces corresponding to the chords of the half-round shapes of the male engagement portions 62γ (i.e., flat surfaces) are oriented toward the side walls 63 as shown in FIG. 5A. Thus, portions of the surfaces corresponding to the arcs almost coincide with the second holding faces 612a on the sides of the front side section 61.

As shown in FIGS. 4A, 4B and 5A, at least portions of lateral surfaces of the male engagement portions 62α, 62β and 62γ are formed to have a projecting shape (to be specific, formed to be curved surfaces). Thus, the projecting portions are oriented in directions same as the second holding faces 612a on the sides of the front side section 61. In other words, the lateral surfaces of the male engagement portions 62α, 62β and 62γ that are oriented in the directions same as the second holding face 612a of the front side section 61 are formed so as to curve toward the opening. Thus, the projecting portions almost coincide with the second holding faces 612a on the sides of the front side section 61 (the inner peripheral surfaces 66 of the opening of the frame 6a according to the first preferred embodiment of the present invention).

It is also preferable that the male engagement portions include no projecting port ion (no curved surface). For example, as shown in FIG. 5B, the male engagement portions 62δ have a substantially square shape. Any one sides of the male engagement portions 62δ almost coincide with the second holding faces 612a.

Figure 6A:
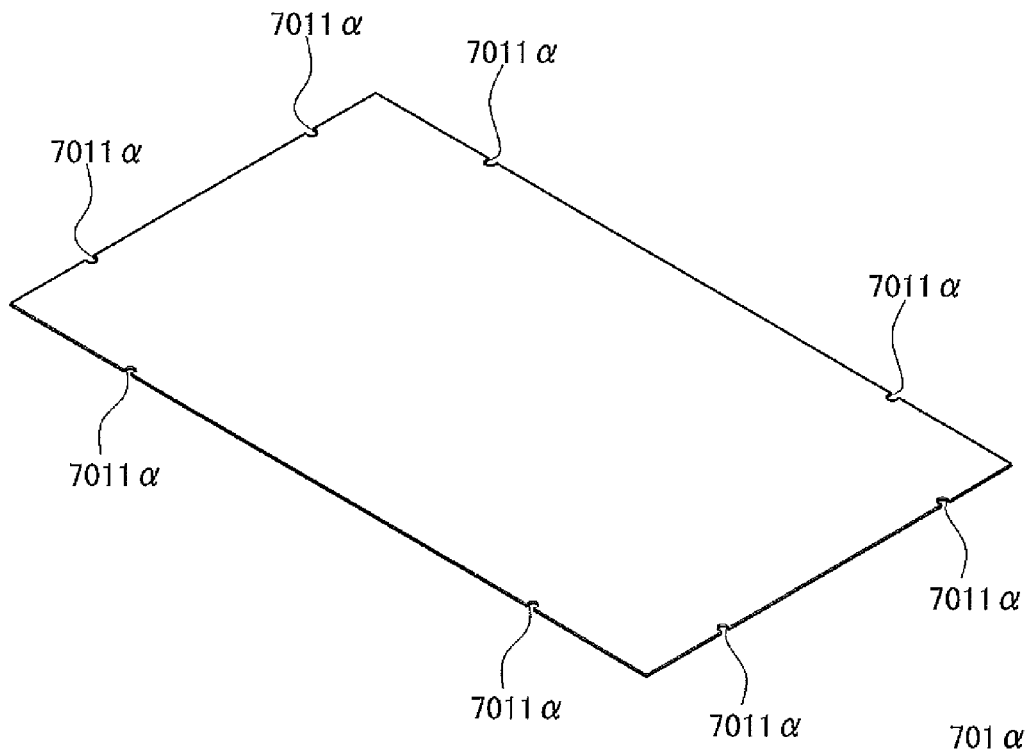
FIGS. 6A and 6B are external perspective views showing schematic configurations of first optical members that are subjects to be held by frames according to preferred embodiments of the present invention, where shown in FIG. 6A is the first optical member including notches that define female engagement portions, and shown in FIG. 6B is the first optical member including through-holes that define female engagement portions.
Figure 6B:
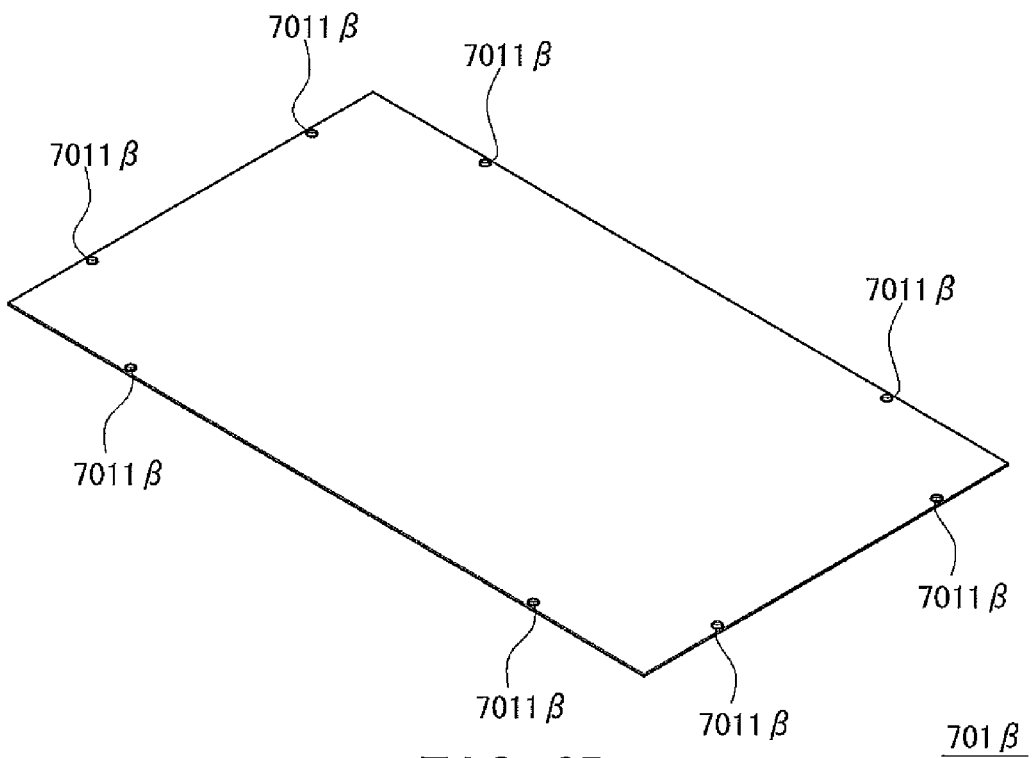

FIGS. 6A and 6B are external perspective views showing schematic configurations of the first optical members 701α and the first optical members 701β that are subjects to be held, where shown in FIG. 6A is the first optical member 701α including notches that define female engagement portions 7011α, and shown in FIG. 6B is the first optical member 701β including through-holes that define female engagement portions 7011β. The first optical member 701α shown in FIG. 6A and the first optical member 701β shown in FIG. 6B have the same configuration except for the female engagement portions 7011α and 7011β.

The first optical members 701α and 701β have the outside shape of a substantially square plate as shown in FIGS. 6A and 6B. The first optical members 701α and 701β include the female engagement portions 7011α and 7011β respectively that are disposed at given positions on their border portions (outer peripheries). The first optical member 701α includes the notches that define the female engagement portions 7011α as shown in FIG. 6A. The first optical member 701β includes the through-holes that define the female engagement portions 7011β as shown in FIG. 6B.

The female engagement portions 7011α and 7011β have their numbers, positions, shapes and dimensions set so as to be engaged with the male engagement portions 62α, 62β, 62γ, 62δ on all the sides of the front side section 61 when the first optical member 701α, 701β is disposed behind the front side section 61 of the frame 6a according to the first preferred embodiment of the present invention.

For example, when the first optical member 701α includes the notches that define the female engagement portions 7011α in a case where the frame 6a includes the male engagement portions 62α, 62β, 62γ shown in FIGS. 4A, 4B, 5A, notches having the substantial shape of the letter U or a substantially half-round shape are formed as the female engagement portions 7011α at positions corresponding to the male engagement portions 62α, 62β, 62γ. When the first optical member 701α includes the notches that define the female engagement portions 7011α in a case where the frame 6a includes the male engagement portions 62δ shown in FIG. 5B, notches having a substantially square shape are formed as the female engagement portions 7011α at positions corresponding to the male engagement portions 62δ.

When the first optical member 701β includes the through-holes that define the female engagement portions 7011β in a case where the frame 6a includes the male engagement portions 62α, 62β, 62γ, 62δ, through-holes into which the male engagement portions 62α, 62β, 62γ, 62δ can be inserted are formed at positions corresponding to the male engagement portions 62α, 62β, 62γ, 62δ. For example, when the first optical member 701β includes the through-holes that define the female engagement portions 7011β in a case where the frame 6a includes the male engagement portions 62α having the substantially oval shape shown in FIG. 4A, through-holes having a substantially oval shape are formed as the female engagement portions 7011β in the first optical member 701β. In a case where the frame 6a includes the male engagement portions 62β having the substantially round shape shown in FIG. 4B, through-holes having a substantially round shape are formed. In a case where the frame 6a includes the male engagement portions 62γ having the substantially half-round shape shown in FIG. 5A, through-holes having a substantially half-round shape are formed. In a case where the frame 6a includes the male engagement portions 62δ having the substantially square shown in FIG. 5B, through-holes having a substantially square shape are formed.

Figure 7:
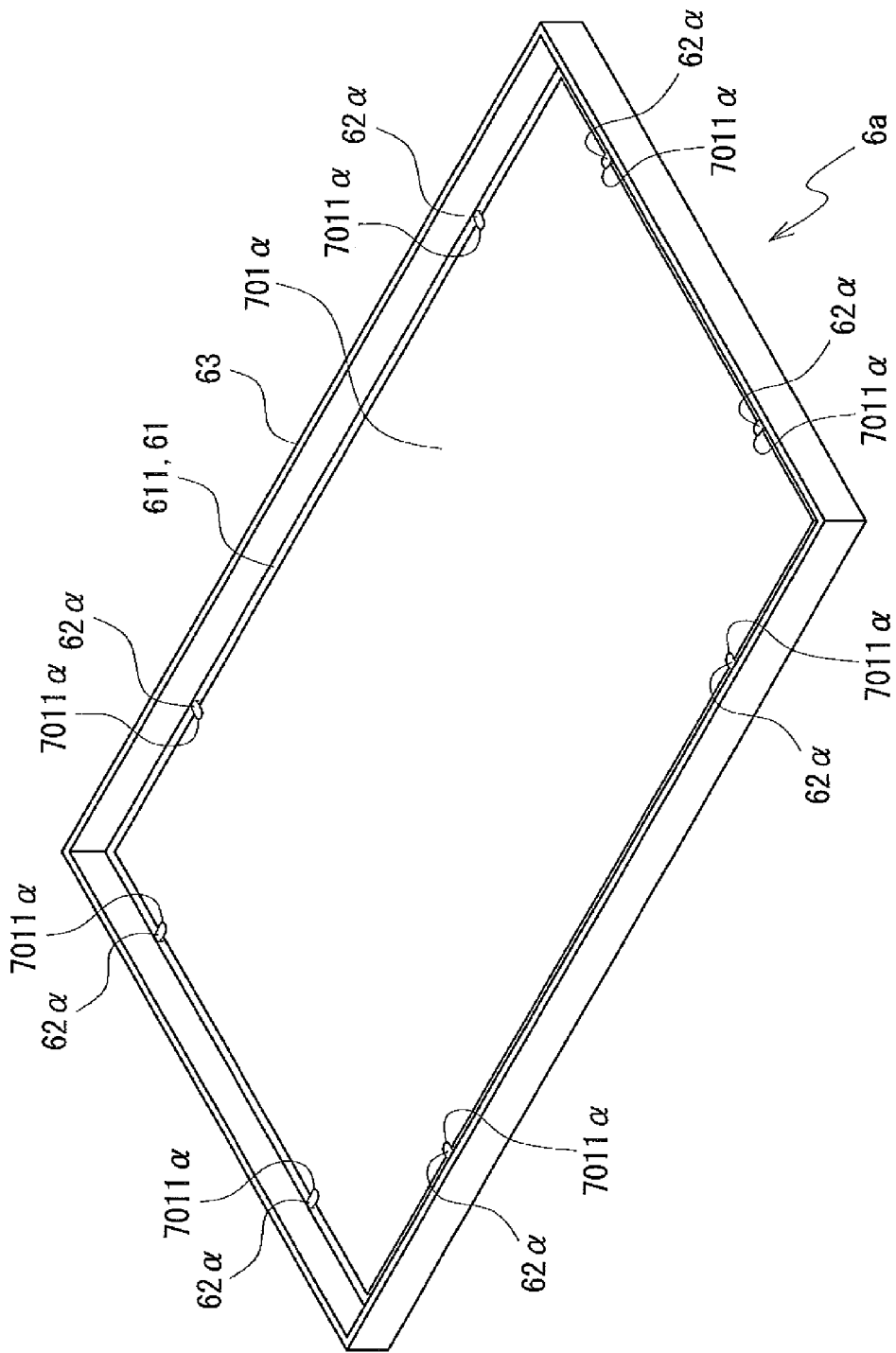
FIG. 7 is an external perspective view showing the frame according to the first preferred embodiment of the present invention, where the first optical member including notches that define female engagement portions is engaged with the frame.
Figure 8:
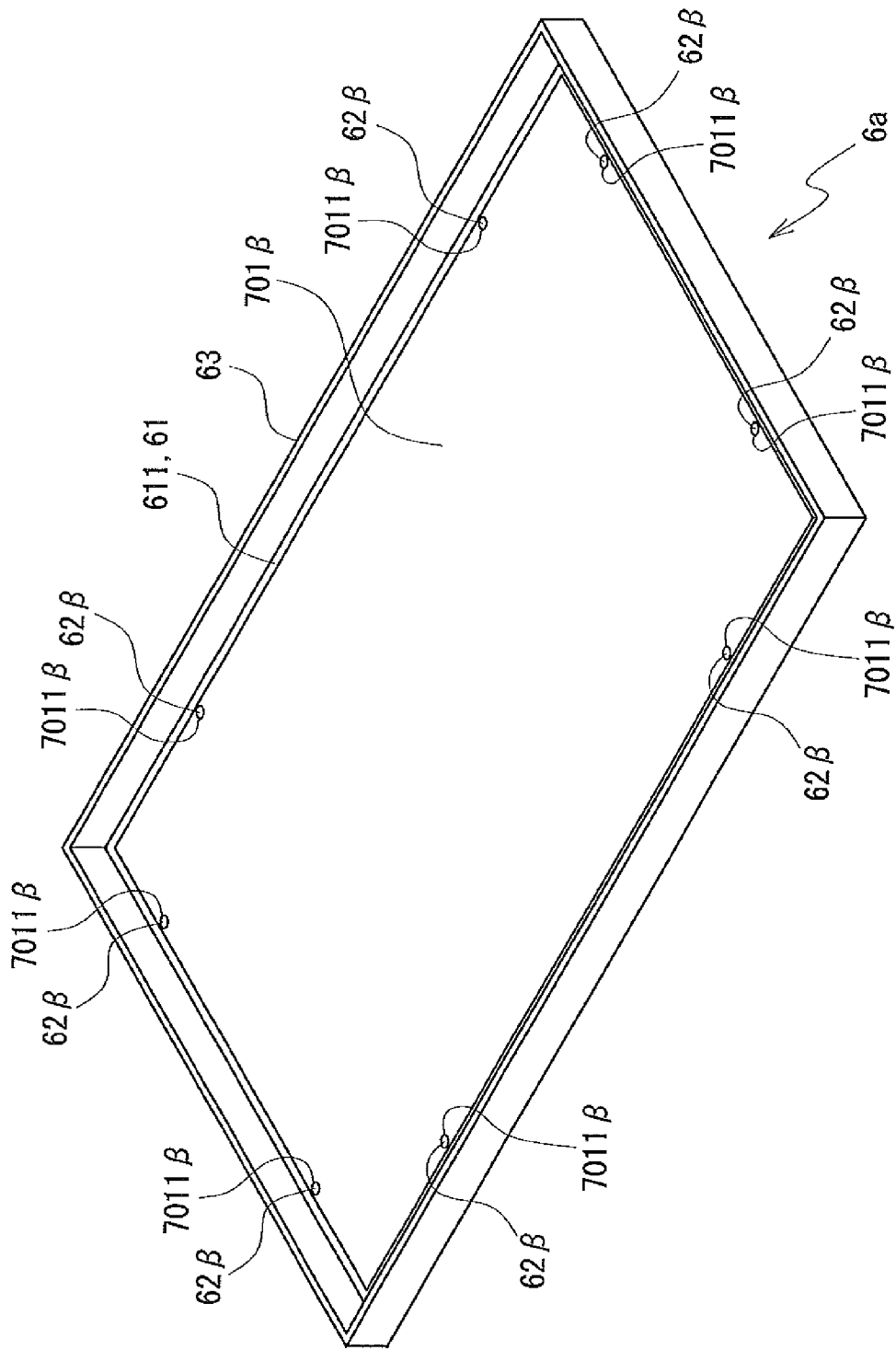
FIG. 8 is an external perspective view showing the frame according to the first preferred embodiment of the present invention, where the first optical member including through-holes that define female engagement portions is engaged with the frame.
Figure 9A:
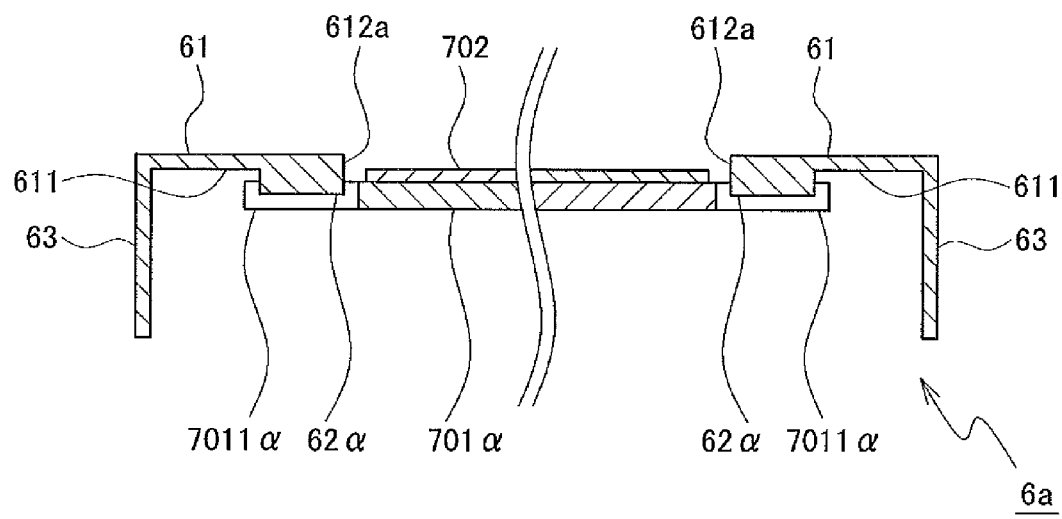
FIGS. 9A and 9B are cross-sectional views showing the frame according to the first preferred embodiment of the present invention, the first optical member disposed behind the frame, and a second optical member disposed in front of the first optical member, where shown in FIG. 9A is the first optical member including notches that define female engagement portions, and shown in FIG. 9B is the first optical member including through-holes that define female engagement portions.
Figure 9B:
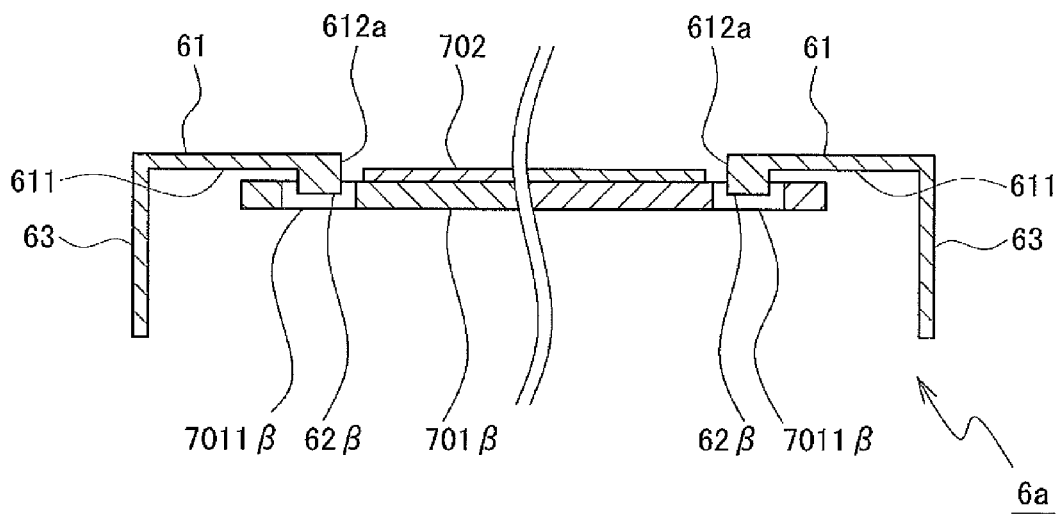

FIG. 7 is an external perspective view showing the frame 6a according to the first preferred embodiment of the present invention, where the first optical member 701α including the notches that define the female engagement portions 7011α is disposed behind the front side section 61 of the frame 6a. FIG. 8 is an external perspective view showing the frame 6a according to the first preferred embodiment of the present invention, where the first optical member 701β including the through-holes that define the female engagement portions 7011β is disposed behind the front side section 61 of the frame 6a. FIG. 9A is a cross-sectional view showing the frame 6a according to the first preferred embodiment of the present invention, the first optical member 701α disposed behind the front side section 61 of the frame 6a, and the second optical member 702 disposed in front of the first optical member 701α. FIG. 9B is a cross-sectional view showing the frame 6a according to the first preferred embodiment of the present invention, the first optical member 701β disposed behind the front side section 61 of the frame 6a, and the second optical member 702 disposed in front of the first optical member 701β. It is to be noted that shown in FIG. 7 is the frame 6a including the male engagement portions 62α having the substantially oval shape, and shown in FIG. 8 is the frame 6a including the male engagement portions 62β having the substantially round shape; however, the male engagement portions 62α, 62β, 62γ, 62δ having other shapes may be included in the frame 6a.

The dimension of the opening is smaller than the outer dimension of the first optical member 701α, 701β. Thus, when the first optical member 701α, 701β is disposed behind the front side section 61 of the frame 6a, the entire border portion on one face (front surface) in the plane direction of the first optical member 701α, 701β is opposed to the back surface of the front side section 61 (i.e., the first holding faces 611) as shown in FIGS. 7, 8, 9A and 9B, whereby the border portion of the first optical member 701α, 701β is held by the first holding faces 611.

Thus, the male engagement portions 62α, 62β, 62γ, 62δ on the front side section 61 are engaged with the female engagement portions 7011α of the first optical member 701α as shown in FIGS. 7 and 9A. The male engagement portions 62α, 62β, 62γ, 62δ on the front side section 61 are engaged with the female engagement portions 7011β of the first optical member 701β as shown in FIGS. 8 and 9B. When the male engagement portions 62α, 62β, 62γ, 62δ are engaged with the female engagement portions 7011α, 7011β, the second holding faces 612a correspond inside the outer periphery of the first optical member 701α, 701β.

The dimensions and shapes of the male engagement portions 62α, 62β, 62γ and 62δ provided to the frame 6a according to the first preferred embodiment of the present invention, and the dimensions and shapes of the notches and through-holes that define the female engagement portions 7011α and 7011β will be described. The dimensions are set such that a given clearance is formed between lateral surfaces of the male engagement portions 62α, 62β, 62γ, 62δ and inner peripheral surfaces of the notches or through-holes in the engaged state. To be specific, the clearance is set such that the lateral surfaces of the male engagement portions 62α, 62β, 62γ, 62δ and the inner peripheral surfaces of the notches or through-holes do not get in contact with each other (or, such that the male engagement portions 62α, 62β, 62γ, 62δ do not hinder the first optical member 701α, 701β from deforming) even when the first optical members 701α and 701β change in dimension due to temperature change or humidity change (or, even when a deformation volume of the front side section 61 differs from that of the first optical member 701α, 701β due to temperature change or humidity change).

By setting as described above, even when the first optical member 701α, 701β changes in dimension (or, even when a deformation volume of the first optical member 701α, 701β differs from that of the front side section 61), the male engagement portions 62α, 62β, 62γ, 62δ are prevented from getting in contact with and applying a force on the inner peripheral surfaces of the notches or through-holes that define the female engagement portions 7011α, 7011β. Consequently, the first optical member 701α, 701β is maintained flat, which can prevent a wrinkle or distortion from occurring therein.

The dimension of the opening is larger than the outer dimension of the second optical member 702 as shown in FIGS. 9A and 9B. Thus, while being maintained flat (i.e., maintained unbent or undistorted), the second optical member 702 is disposed in a region surrounded by the second holding faces 612a (i.e., the inner peripheral surfaces 66 of the opening). Thus, end faces in a plane direction of the second optical member 702 are opposed to the second holding faces 612a. The second optical member 702 has its position set to be held by the second holding faces 612a.

When the male engagement portions 62α, 62β, 62γ, 62δ are engaged with the female engagement portions 7011α, 7011β of the first optical member 701α, 701β, the top surfaces of the male engagement portions 62α, 62β, 62γ, 62δ are disposed at a more backside than the front surface of the first optical member 701α, 701β (see FIGS. 9A and 9B). Consequently, the border portion of the second optical member 702 cannot get into between the top surfaces of the male engagement portions 62α, 62β, 62γ, 62δ and the front surface of the first optical member 701α, 701β.

In other words, the second optical member 702 can only shift on the front surface of the first optical member 701α, 701β until an end face of the second optical member 702 touches the lateral surfaces of the male engagement portions 62α, 62β, 62γ, 62δ. Because at least the portions of the lateral surfaces of the male engagement portions 62α, 62β, 62γ, 62δ almost coincide with the second holding faces 612a, the border portion of the second optical member 702 does not stick out of the second holding faces 612a.

Thus, the border portion of the second optical member 702 does not get into a clearance that may be formed between the first holding faces 611 and the front surface of the first optical member 701α, 701β. Consequently, an unexpected force is prevented from being exerted on the border portion of the second optical member 702, which prevents occurrence of a wrinkle or distortion therein. To be specific, if the border portion of the second optical member 702 gets into the clearance formed between the first holding faces 611 and the front surface of the first optical member 701α, 701β, the border portion that is getting into the clearance could be stacked between and fixed by the first optical member 701α, 701β and the first holding faces 611. Meanwhile, if another portion of the second optical member 702, which is not getting into the clearance and not fixed, deforms or shifts, a wrinkle or distortion could occur in the vicinity of the border between the border portion that is getting into the clearance and the other portion that is not getting into the clearance. In contrast, the frame 6a according to the first preferred embodiment of the present invention has the configuration that the border portion of the second optical member 702 is not fixed, which prevents occurrence of a wrinkle or distortion therein.

In addition, if the second optical member 702 rotates on the front surface of the first optical member 701α, 701β, the four corners of the second optical member 702 stick out of the region surrounded by the second holding faces 612a and could get into between the front surface of the first optical member 701α, 701β and the first holding faces 611, causing a wrinkle or distortion to occur in the four corners of the second optical member 702. In contrast, the frame 6a according to the first preferred embodiment of the present invention has the configuration that the male engagement portions 62α, 62β, 62γ, 62δ are each disposed at positions close to both the ends of all the sides of the front side section 61, which prevents the second optical member 702 from rotating. Thus, the four corners of the second optical member 702 do not get into between the front surface of the first optical member 701α, 701β and the first holding faces 611.

As described above, the frame 6a according to the first preferred embodiment of the present invention is capable of holding the first optical member 701α, 701β and the second optical member 702 without causing any wrinkle or distortion therein.

A description of the frame 6b according to the second preferred embodiment of the present invention will be provided. Explanations of the same configurations as those of the frame 6a according to the first preferred embodiment of the present invention are omitted, and different respects are explained mainly, providing the same reference numerals as those of the frame 6a according to the first preferred embodiment of the present invention.

Figure 10:
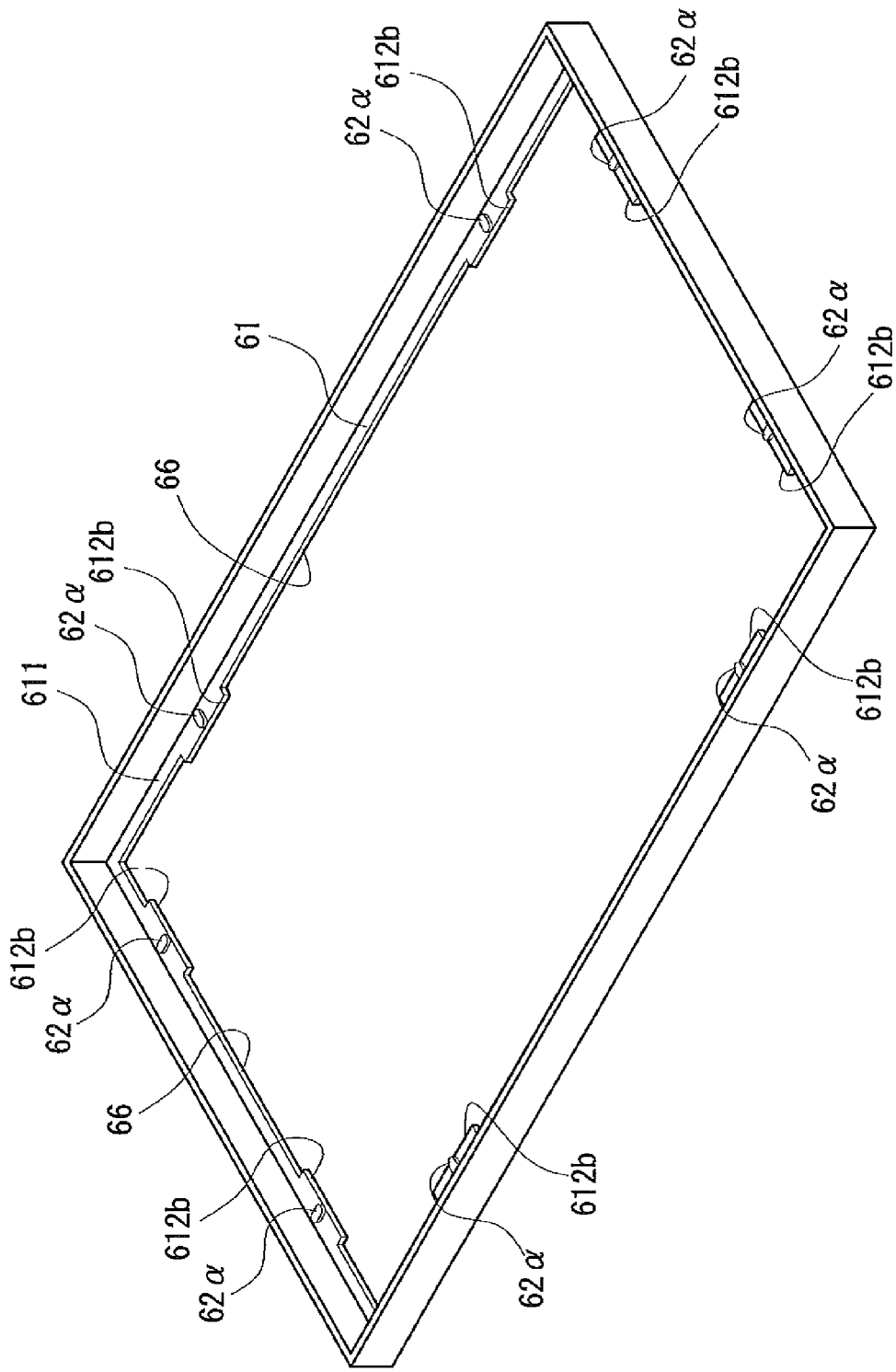
FIG. 10 is an external perspective view showing a schematic configuration of a frame according to a second preferred embodiment of the present invention.
Figure 11:
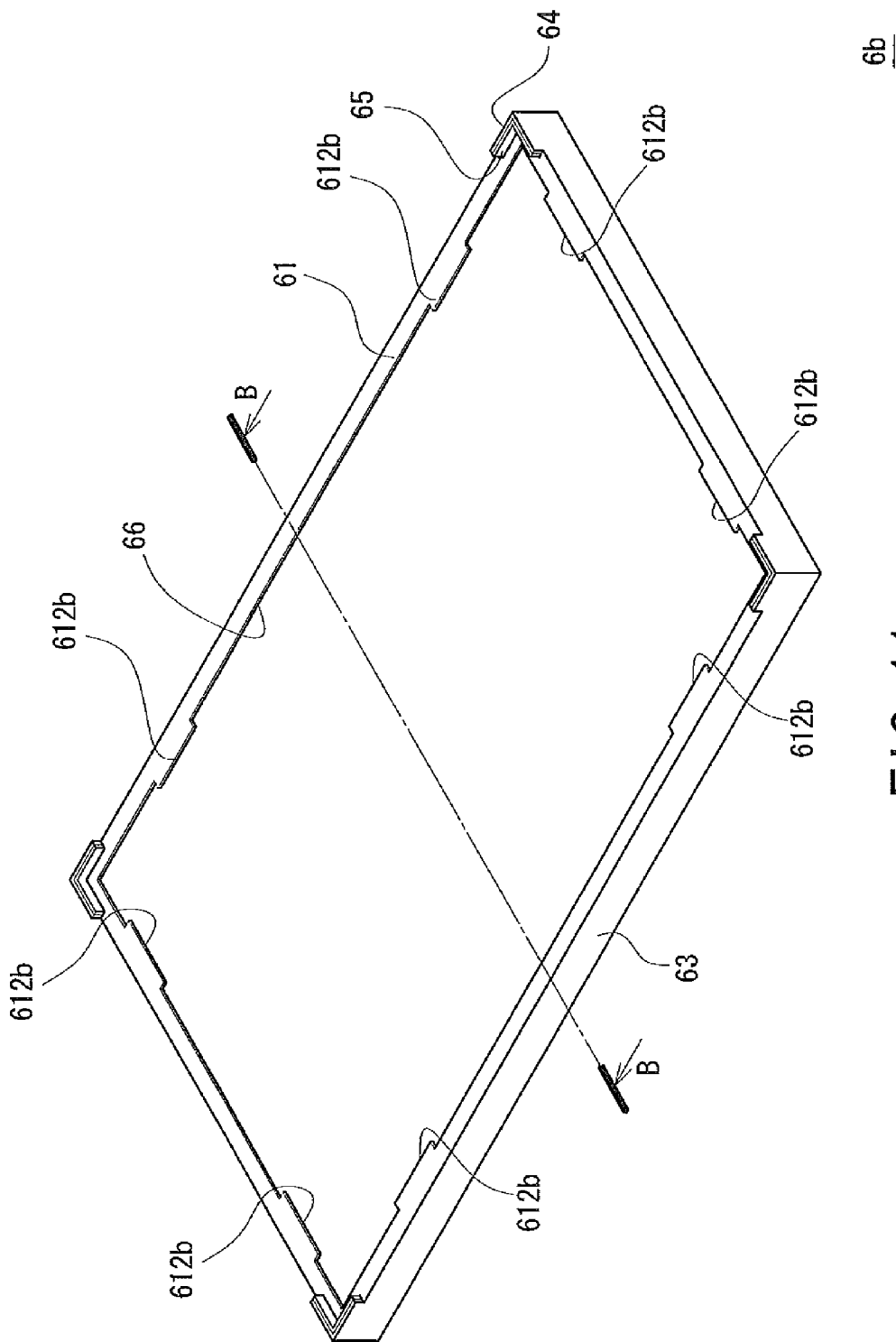
FIG. 11 is an external perspective view showing a schematic configuration of the frame according to the second preferred embodiment of the present invention, which is seen from the side opposite to the side from which the frame is seen in FIG. 10.
Figure 12:
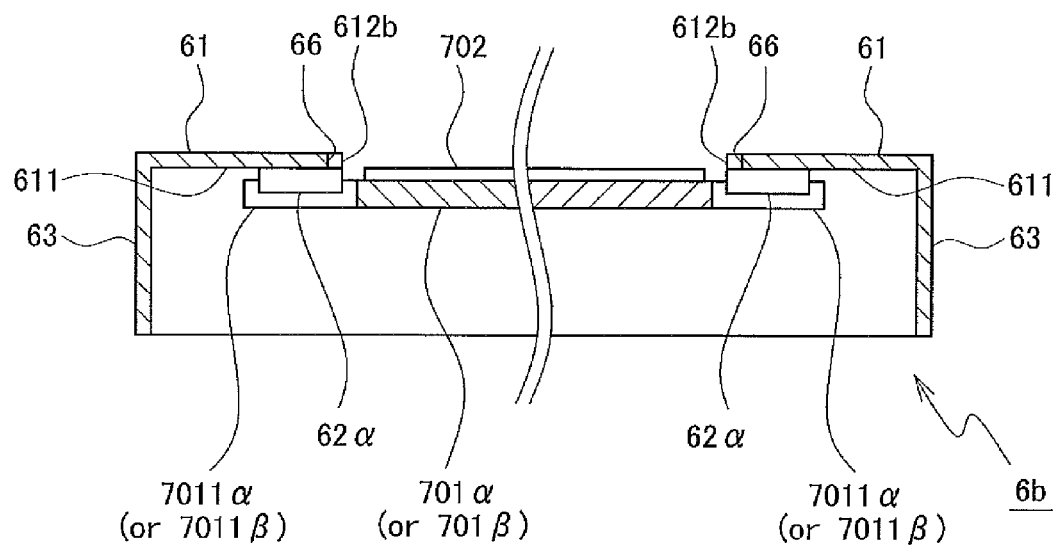
FIG. 12, which is a cross-sectional view showing the frame according to the second preferred embodiment of the present invention along the line B-B in the direction of the arrow of FIG. 11, is a schematic view showing the frame, the first optical member disposed behind the frame, and the second optical member disposed in front of the first optical member.

FIG. 10 is an external perspective view showing a schematic configuration of the frame 6b according to the second preferred embodiment of the present invention. FIG. 11 is an external perspective view showing a schematic configuration of the frame 6b according to the second preferred embodiment of the present invention, which is seen from the side opposite to the side from which the frame is seen in FIG. 10. FIG. 12, which is a cross-sectional view showing the frame 6b according to the second preferred embodiment of the present invention along the line B-B in the direction of the arrow of FIG. 11, is a schematic view showing the frame 6b, the first optical member 701α, 701β disposed behind the front side section 61 of the frame 6b, and the second optical member 702 disposed in front of the first optical member 701α, 701β.

The frame 6b according to the second preferred embodiment of the present invention has a configuration almost same as the frame 6a according to the first preferred embodiment of the present invention as shown in FIGS. 10 and 11. That is, the frame 6b according to the second preferred embodiment of the present invention includes the front side section 61 that has the outside shape of the substantial square with the opening having the substantially square shape.

As shown in FIGS. 10, 11 and 12, the inner peripheral surfaces 66 of the opening are provided with second holding faces 612b. To be specific, structures that protrude inward the opening are attached to the inner peripheral surfaces 66 of the opening, and top surfaces of the structures, which are formed almost flat, define the second holding faces 612b.

The male engagement portions 62α, 62β, 62γ, 62δ are provided on the back surface of the front side section 61 of the frame 6b. The configuration of the male engagement portions 62α, 62β, 62γ, 62δ provided to the frame 6b is same as that of the frame 6a according to the first preferred embodiment of the present invention. At least portions of lateral surfaces of the male engagement portions 62α, 62β, 62γ, 62δ almost coincide with the second holding faces 612b. It is to be noted that shown in FIG. 10 is the frame 6b including the male engagement portions 62α having the substantially oval shape; however, it is also preferable that the frame 6b includes the male engagement portions 62β, 62γ, 62δ having the shapes other than the substantially oval shape.

The dimension of a region surrounded by the second holding faces 612b and the inner peripheral surfaces 66 of the opening is same as that of the opening of the frame 6a according to the first preferred embodiment of the present invention. In other words, the dimension of the region is smaller than the outer dimension of the first optical member 701α, 701β, and larger than the outer dimension of the second optical member 702. Thus, when the first optical member 701α, 701β is disposed behind the front side section 61, the border portion of the first optical member 701α, 701β is opposed to the first holding faces 611 (i.e., the back surface of the front side section 61) as shown especially in FIG. 12, whereby the border portion of the first optical member 701α, 701β is held by the first holding faces 611.

Disposed in front of the first optical member 701α, 701β, the second optical member 702 fits in the region surrounded by the second holding faces 612b. Thus, the end faces of the second optical member 702 are opposed to the second holding faces 612b. The second optical member 702 has its position set to be held by the second holding faces 612b.

Having the configuration described above, the frame 6b according to the second preferred embodiment of the present invention can produce an effect same as the frame 6a according to the first preferred embodiment of the present invention. Accordingly, the configuration that the inner peripheral surfaces 66 of the opening of the front side section 61 define the second holding faces 612a is preferable, and the configuration that the inner peripheral surfaces 66 of the opening of the front side section 61 are provided with the second holding faces 612b is also preferable.

A description of a frame 6c according to the third preferred embodiment of the present invention will be provided. Explanations of the same configurations as those of the frame 6a according to the first preferred embodiment of the present invention are omitted, and different respects are explained mainly, providing the same reference numerals as those of the frame 6a according to the first preferred embodiment of the present invention.

Figure 13:
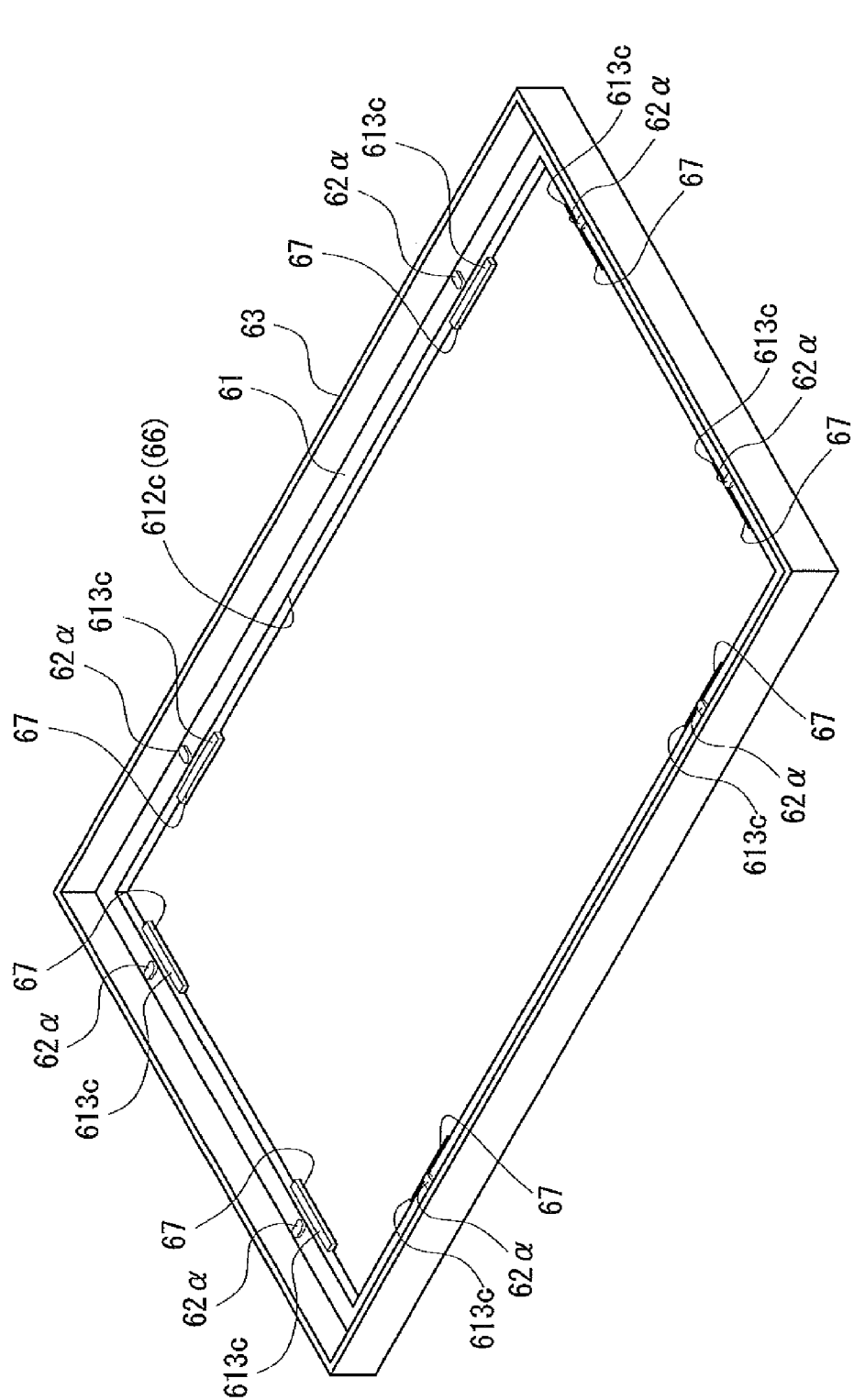
FIG. 13 is an external perspective view showing a schematic configuration of a frame according to a third preferred embodiment of the present invention.
Figure 14:
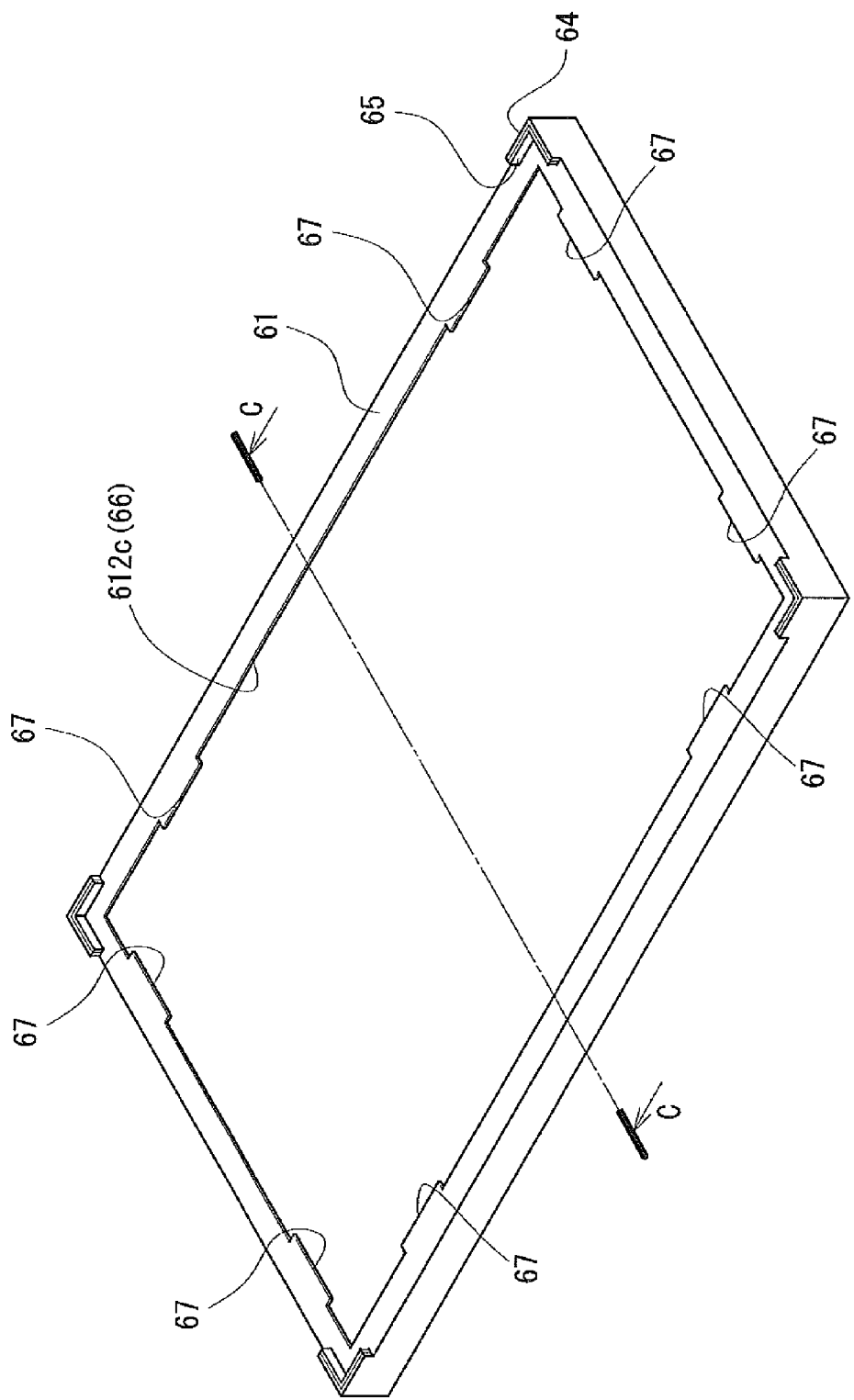
FIG. 14 is an external perspective view showing a schematic configuration of the frame according to the third preferred embodiment of the present invention, which is seen from the side opposite to the side from which the frame is seen in FIG. 13.
Figure 15:
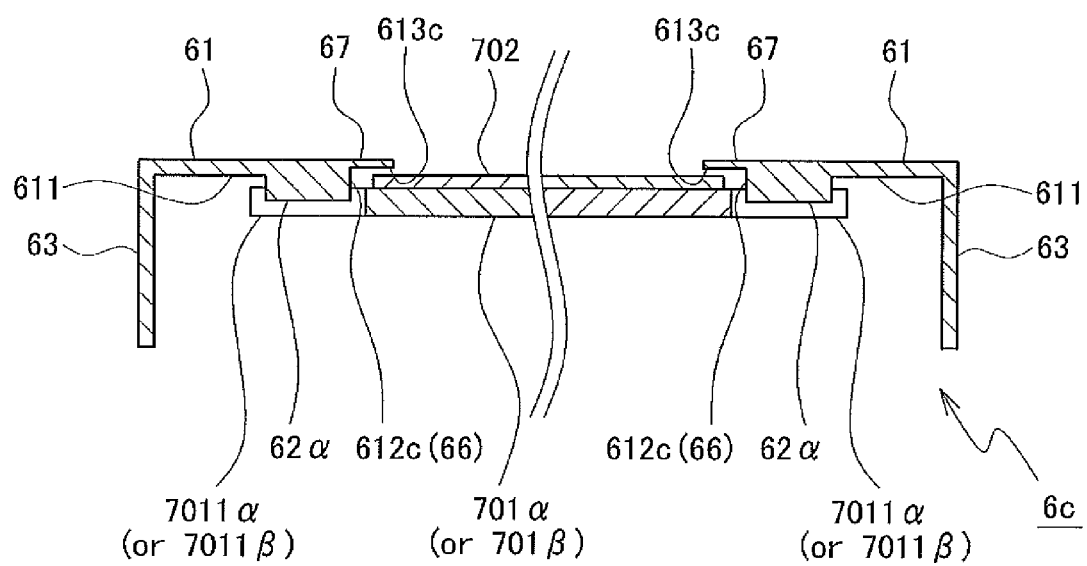
FIG. 15, which is a cross-sectional view showing the frame according to the third preferred embodiment of the present invention along the line C-C in the direction of the arrow of FIG. 14, is a schematic view showing the frame, the first optical member disposed behind the frame, and the second optical member disposed in front of the first optical member.

FIG. 13 is an external perspective view showing a schematic configuration of the frame 6c according to the third preferred embodiment of the present invention. FIG. 14 is an external perspective view showing a schematic configuration of the frame 6c according to the third preferred embodiment of the present invention, which is seen from the side opposite to the side from which the frame 6c is seen in FIG. 13. FIG. 15, which is a cross-sectional view showing the frame 6c according to the third preferred embodiment of the present invention along the line C-C in the direction of the arrow of FIG. 14, is a schematic view showing the frame 6c, the first optical member 701α, 701β disposed behind the front side section 61 of the frame 6c, and the second optical member 702 disposed in front of the first optical member 701α, 701β.

The frame 6c according to the third preferred embodiment of the present invention has a configuration almost same as the frame 6a according to the first preferred embodiment of the present invention as shown in FIGS. 13 and 14. That is, the frame 6c according to the third preferred embodiment of the present invention includes the front side section 61 that has the outside shape of the substantial square with the opening having the substantially square shape. The dimension of the opening is same as that of the opening of the frame 6a according to the first preferred embodiment of the present invention.

The inner peripheral surfaces 66 of the opening define second holding faces 612c. The inner peripheral surfaces 66 of the opening are provided with protrusions 67. The protrusions 67 define structures having a substantially flat plate shape that protrude inward the opening. The back surfaces of the protrusions 67 define third holding faces 613c arranged to hold the second optical member 702. The third holding faces 613c are almost parallel to the first holding surfaces 611, and disposed at a more front side than the first holding faces 611.

The male engagement portions 62α, 62β, 62γ, 62δ are provided on the back surface of the front side section 61. The configuration of the male engagement portions 62α, 62β, 62γ, 62δ provided to the frame 6c is same as that of the frame 6a according to the first preferred embodiment of the present invention. At least portions of lateral surfaces of the male engagement portions 62α, 62β, 62γ, 62δ almost coincide with the second holding faces 612c. It is to be noted that shown in FIGS. 13 and 15 is the frame 6c including the male engagement portions 62α having the substantially oval shape; however, it is also preferable that the frame 6b includes the male engagement portions 62β, 62γ, 62δ having the shapes other than the substantially oval shape.

When the first optical member 701α, 701β is disposed behind the front side section 61, the border portion of the first optical member 701α, 701β is opposed to the first holding surfaces 611, whereby the border portion of the first optical member 701α, 701β is held by the first holding faces 611. The second optical member 702 fits in a region surrounded by the second holding faces 612c (i.e., the inner peripheral surfaces 66 of the opening). Thus, the second optical member 702 has its position set to be held by the second holding faces 612c. A border portion on one face (front surface) in a thickness direction of the second optical member 702 is opposed to the third holding faces 613c of the protrusions 67, whereby the second optical member 702 is held by the third holding faces 613c of the protrusions 67 so as not to fall in front of the opening.

The distance between the first holding faces 611 and the third holding faces 613c is set to be larger than the thickness of the second optical member 702. If a plurality of second optical members 702 are used, the distance is set to be larger than the sum of the thicknesses of the second optical members 702. Thus, even when the border portion of the first optical member 701α, 701β is brought into intimate contact with the first holding faces 611, the border portion of the second optical member 702 is prevented from being stuck and fixed between the first optical member 701α, 701β and the third holding faces 613c. Consequently, the border portion of the second optical member 702 can be maintained in a free state, which can prevent a wrinkle or distortion from occurring therein.

Having the configuration described above, the frame 6c according to the third preferred embodiment of the present invention can produce an effect same as the frame 6a according to the first preferred embodiment of the present invention. It is also preferable that the inner peripheral surfaces 66 of the opening are provided with the second holding faces 612c and the protrusions 67. In other words, it is also preferable that that the inner peripheral surfaces 66 of the opening of the frame 6b according to the second preferred embodiment of the present invention are provided with the protrusions 67.

A description of a frame 6d according to the fourth preferred embodiment of the present invention will be provided. Explanations of the same configurations as those of the frame 6a according to the first preferred embodiment of the present invention are omitted, and different respects are explained mainly, providing the same reference numerals as those of the frame 6a according to the first preferred embodiment of the present invention.

Figure 16:
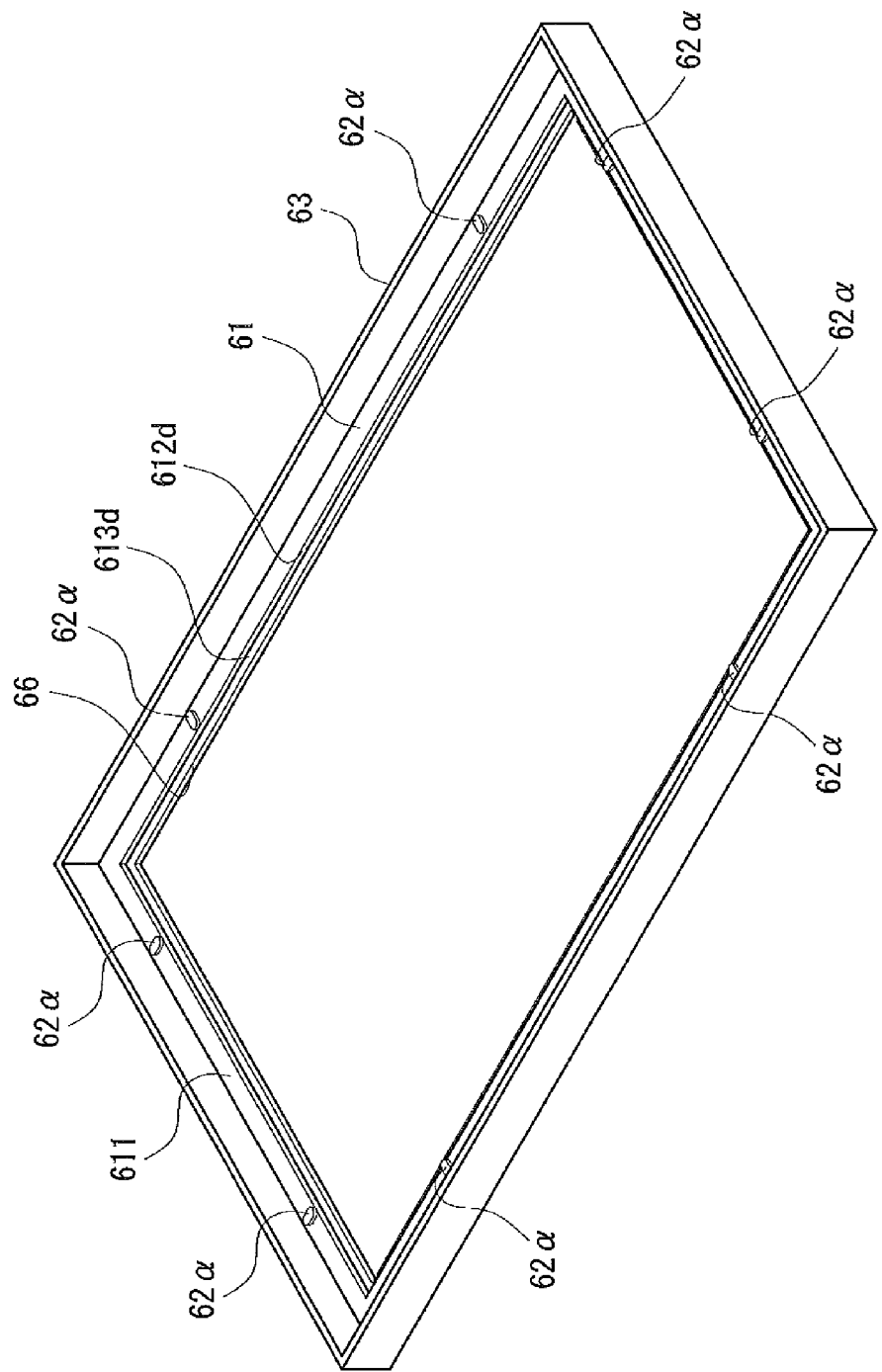
FIG. 16 is an external perspective view showing a schematic configuration of a frame according to a fourth preferred embodiment of the present invention.
Figure 17:
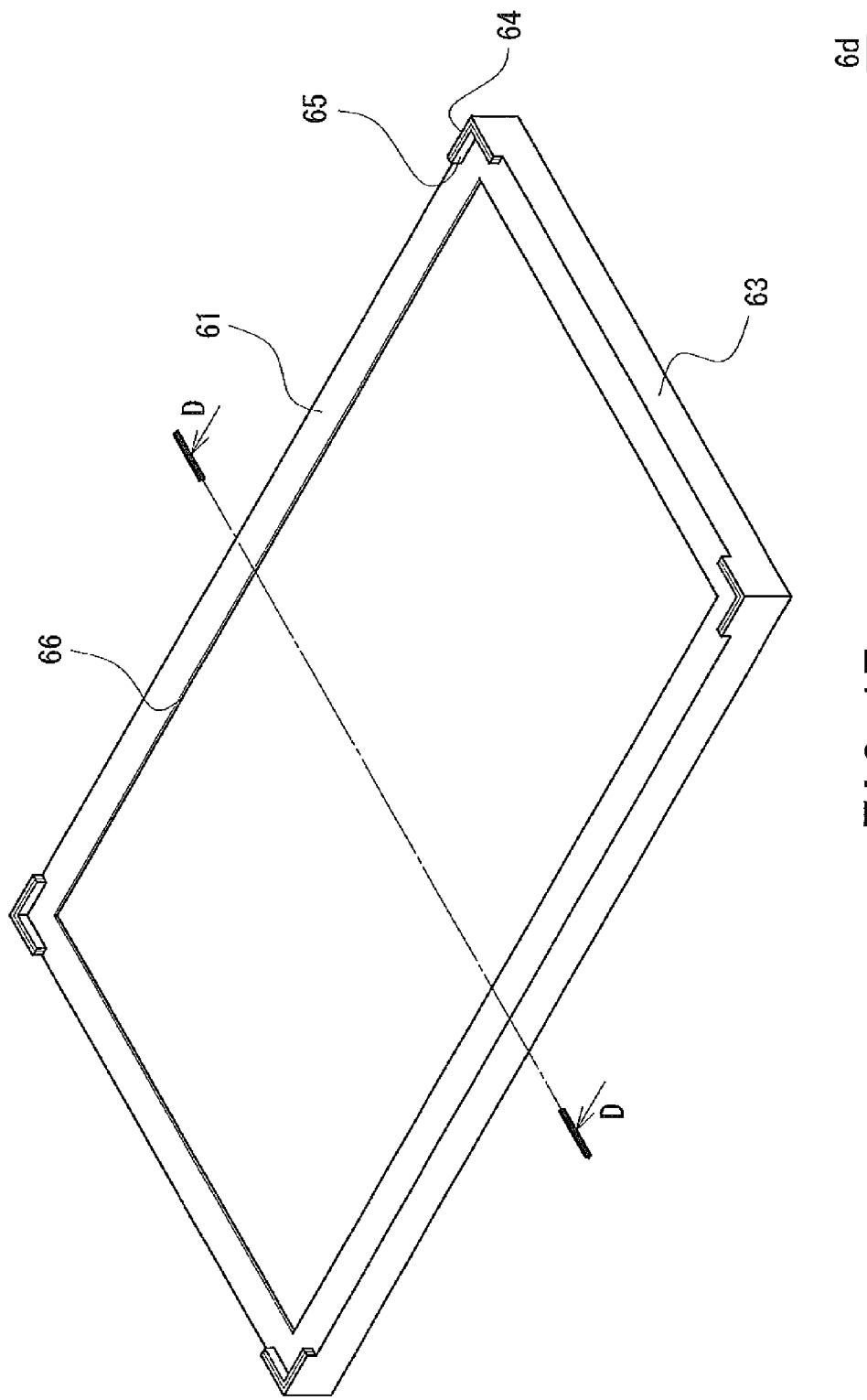
FIG. 17 is an external perspective view showing a schematic configuration of the frame according to the fourth preferred embodiment of the present invention, which is seen from the side opposite to the side from which the frame is seen in FIG. 16.
Figure 18:
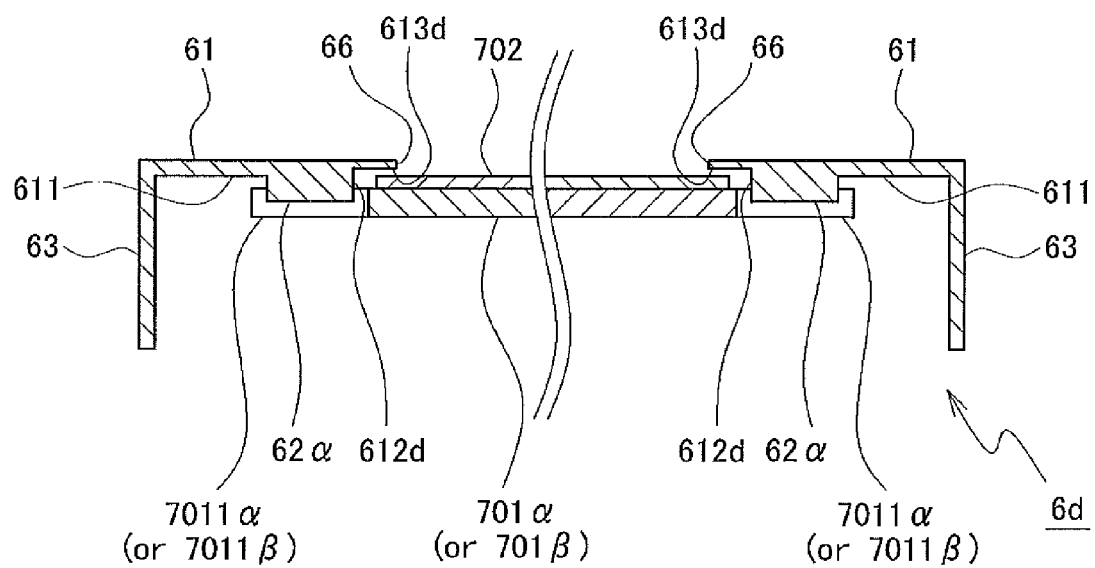
FIG. 18, which is a cross-sectional view showing the frame according to the fourth preferred embodiment of the present invention along the line D-D in the direction of the arrow of FIG. 17, is a schematic view showing the frame, the first optical member disposed behind the frame, and the second optical member disposed in front of the first optical member.

FIG. 16 is an external perspective view showing a schematic configuration of the frame 6d according to the fourth preferred embodiment of the present invention. FIG. 17 is an external perspective view showing a schematic configuration of the frame 6d according to the fourth preferred embodiment of the present invention, which is seen from the side opposite to the side from which the frame is seen in FIG. 16. FIG. 18, which is a cross-sectional view showing the frame 6d according to the fourth preferred embodiment of the present invention along the line D-D in the direction of the arrow of FIG. 17, is a schematic view showing the frame 6d, the first optical member 701α, 701β disposed behind the front side section 61 of the frame 6d, and the second optical member 702 disposed in front of the first optical member 701α, 701β.

As shown in FIGS. 16 and 17, the frame 6d according to the fourth preferred embodiment of the present invention has a substantially square shape with an opening.

The frame 6d includes the front side section 61 having the substantially square shape with the opening. To be specific, the front side section 61 has the outside shape of a substantial square with an opening, where the opening has a substantially square shape. The opening of the front side section 61 has the shape almost same as the first optical member 701α, 701β and the second optical member 702 that are the subjects to be held by the front side section 61 (i.e. substantially square shape). The dimension of the opening is smaller than the outer dimensions of the first optical member 701α, 701β and the second optical member 702. To be specific, the first optical member 701α, 701β and the second optical member 702 cannot pass through (cannot get into) the opening when they are maintained almost flat and their plane directions are made almost parallel to the plane direction of the front side section 61.

As shown especially in FIG. 16, second holding faces 612d are provided on the back surface of the front side section 61 so as to surround the opening and be disposed outer than the inner peripheral surfaces 66 of the opening. The second holding faces 612d are opposed to the end faces of the second optical member 702 to hold it. The second holding faces 612d define receding surfaces that are positioned outer than the inner peripheral surfaces 66 and face inward the opening. The dimension of a region surrounded by the second holding faces 612d is same as that of the opening of the frame 6a according to the first preferred embodiment of the present invention. In other words, the dimension of the region is smaller than the outer dimension of the first optical member 701α, 701β, and larger than the outer dimension of the second optical member 702. Thus, the second optical member 702 can fit in the region surrounded by the second holding faces 612d while the first optical member 701α, 701β cannot.

Portions of the back surfaces of the front side section 61 that are outer than the second holding faces 612d define the first holding faces 611 that are opposed to the border portion of the first optical member 701α, 701β to hold it. Portions of the back surfaces of the front side section 61 that are inner than the second holding faces 612d define third holding faces 613d that are opposed to the border portion of the second optical member 702 to hold it. The third holding faces 613d are almost parallel to the first holding surfaces 611. The second holding faces 612d are almost perpendicular to the first holding surfaces 611.

When the first optical member 701α, 701β is disposed behind the front side section 61 and the male engagement portions 62α, 62β, 62γ, 62δ are engaged with the female engagement portions 7011α, 7011β, the second holding faces 612d corresponds inside the outer periphery of the first optical member 701α, 701β as shown in FIG. 18. Thus, the border portion of the first optical member 701α, 701β is opposed to the first holding faces 611 disposed outer than the second holding faces 612d, whereby the border portion of the first optical member 701α, 701β is held by the first holding faces 611.

Disposed in front of the first optical member 701α, 701β, the second optical member 702 fits in the region surrounded by the second holding faces 612d (i.e., the receding surfaces), and the end faces of the second optical member 702 are opposed to the second holding faces 612d. Thus, the second optical member 702 has its position in the plane direction set by the second holding faces 612d. In addition, the border portion on the front surface of the second optical member 702 is opposed to third holding faces 613d, whereby the second optical member 702 is held by the third holding faces 613d so as not to fall in front of the opening of the front side section 61.

The width of the second holding faces 612d (the distance between the first holding faces 611 and the third holding faces 613d) is set to be larger than the thickness of the second optical member 702. If a plurality of second optical members 702 are used, the distance is set to be larger than the sum of the thicknesses of the second optical members 702. Thus, even when the border portion of the first optical member 701α, 701β is brought into intimate contact with the first holding faces 611, the border portion of the second optical member 702 is prevented from being stuck and fixed between the first optical member 701α, 701β and the third holding faces 613d, whereby the border portion of the second optical member 702 can be maintained in a free state. Consequently, an external force is prevented from being exerted on the border portion of the second optical member 702, which prevents occurrence of a wrinkle or distortion therein.

The male engagement portions 62α, 62β, 62γ, 62δ arranged to be engaged with female engagement portions 7011α, 7011β of the first optical member 701α, 701β are provided on the first holding faces 611. Portions of lateral surfaces of the male engagement portions 62α, 62β, 62γ, 62δ almost coincide with the second holding faces 612d (receding surfaces). With this configuration, the male engagement portions 62α, 62β, 62γ, 62δ can prevent the second optical member 702 from shifting out of the region surrounded by the second holding faces 612d. Thus, the border portion of the second optical member 702 does not get into a clearance that may be formed between the first holding faces 611 and the front surface of the first optical member 701α or 701β. Having the configuration described above, the frame 6d according to the fourth preferred embodiment of the present invention can produce an effect same as the frame 6a according to the first preferred embodiment of the present invention.

Next, a description of a light source device 7a according to a first preferred embodiment of the present invention will be provided, which includes the frame 6a, 6b, 6c, 6d according to the preferred embodiments of the present invention.

Figure 19:
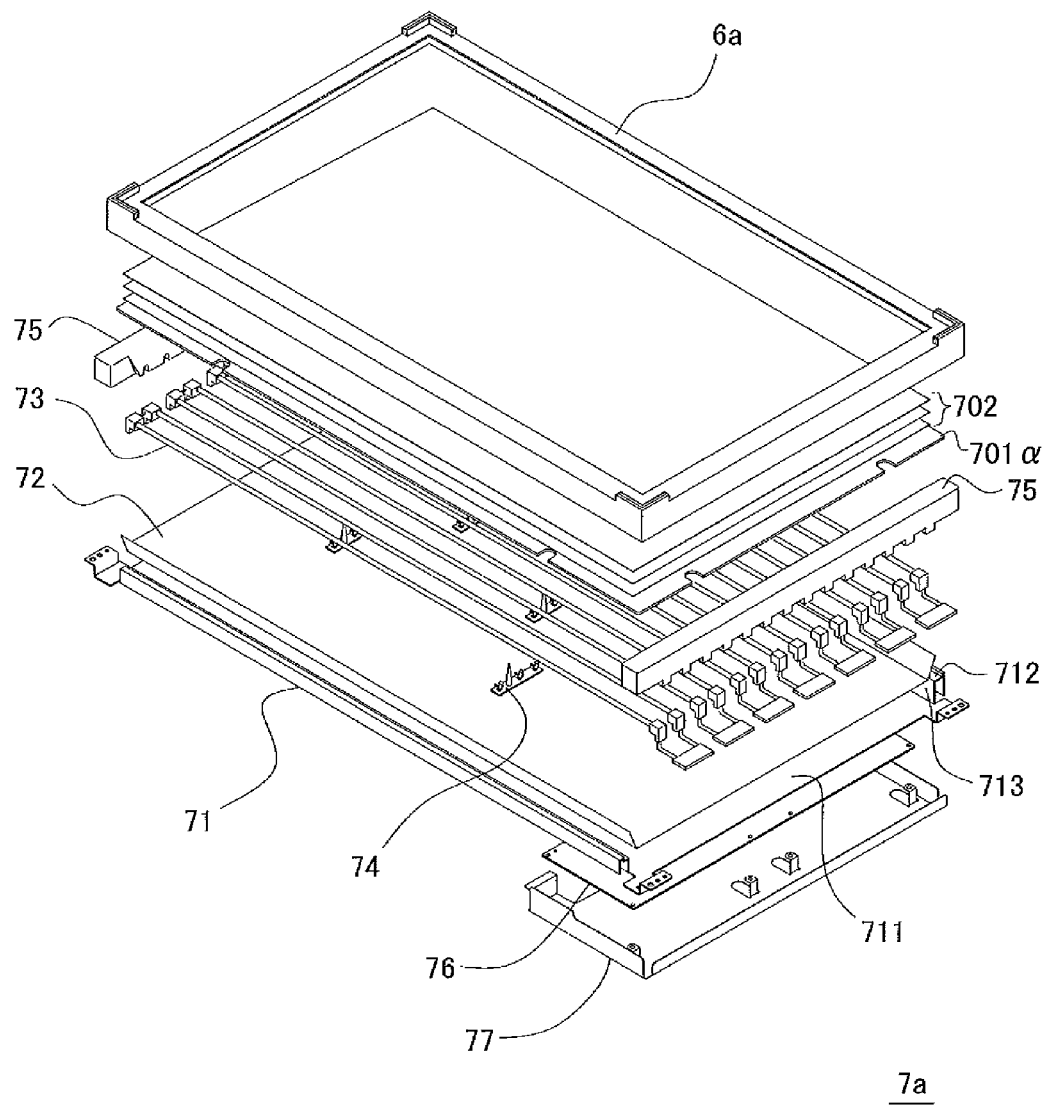
FIG. 19 is an exploded perspective view showing a schematic configuration of a light source device according to a first preferred embodiment of the present invention.
Figure 20:
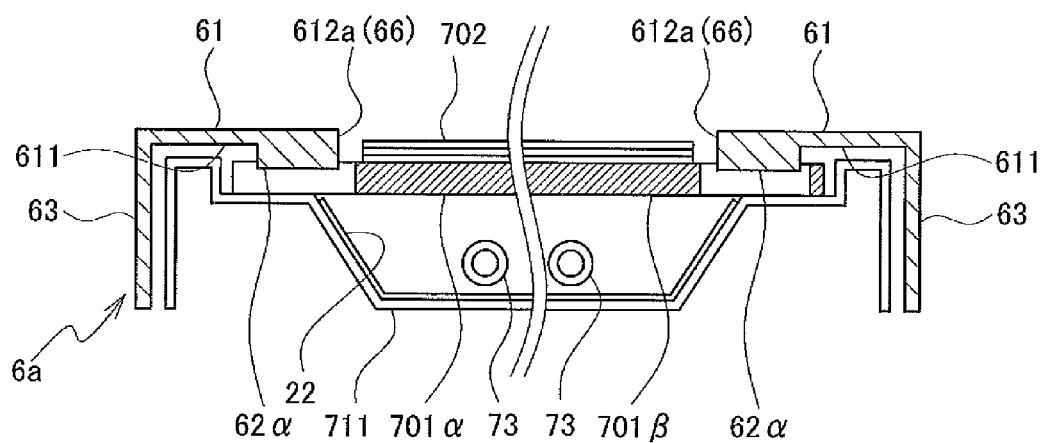
FIG. 20 is a schematic view showing a cross section structure of the light source device according to the first preferred embodiment of the present invention, where shown in the right half of the view is the first optical member including through-holes that define female engagement portions, and shown in the left half of the view is the first optical member including notches that define female engagement portions.

FIG. 19 is an exploded perspective view showing a schematic configuration of the light source device 7a according to the first preferred embodiment of the present invention. FIG. 20 is a schematic view showing a cross section structure of the light source device 7a according to the first preferred embodiment of the present invention. Shown in FIG. 19 is the light source device 7a including the frame 6a according to the first preferred embodiment of the present invention, for example. Shown in FIG. 19 is the first optical member 701α including notches that define the female engagement portions 7011α. It is also preferable that the frame 7a includes the first optical member 701β that includes through-holes. Shown in the right half of the view in FIG. 20 is the first optical member 701β including through-holes that define the female engagement portions 7011β, and shown in the left half is the first optical member 701α including notches that define the female engagement portions 7011α. In FIGS. 19 and 20, the front surfaces of the light source device 7a and the other components face toward the tops of FIGS. 19 and 20, and the back surfaces face toward the bottoms of FIGS. 19 and 20.

The light source device 7a according to the first preferred embodiment of the present invention includes a chassis 71, a reflection sheet 72, light sources 73, light source holders 74, side holders 75, the first optical member 701α, 701β, the second optical members 702, the frame 6a, 6b, 6c, 6d according to the preferred embodiments of the present invention, a light source driving circuit board 76, and a light source driving circuit board cover 77.

The chassis 71 has the shape of a tray of low height. The chassis 71 includes a bottom 711, side walls 713, and support faces 712. The bottom 711 has a substantially planar surface. The bottom 711 may include through-holes disposed at given positions, with which the light source holders 74 are to be engaged. The side walls 713 are each disposed along the longer sides of the bottom 711 and raised from the bottom 711 toward the front side. The support faces 712 are disposed in the vicinity of top ends of the side walls 713. The support faces 712 are planes on which the border portion of the optical member 701α, 701β is to be placed, which are substantially parallel to the bottom 711.

The light sources 73 are capable of emitting light with a given wavelength (e.g., white light). A variety of conventional light sources can be used for the light sources 73. Examples of the conventional light sources include a fluorescent lamp such as a cold cathode fluorescent lamp and a hot cathode fluorescent lamp, a discharge lamp such as a xenon lamp, and a light emitting element such as an LED (Light Emitting Diode). The light source device 7a shown in FIGS. 19 and 20 includes linear fluorescent lamps as the light sources 73; however, the present invention is not limited to this configuration.

The reflection sheet 72 has a sheet, film or plate shape, and has a surface property of diffusely reflecting light. The reflection sheet 72 is preferably expanded PET (polyethylene terephthalate) formed like a sheet, film or plate. The reflection sheet 72 may include through-holes at its given positions, through which anchors (described later) of the light source holders 74 are made to pass, which are omitted and not shown in FIGS. 19 and 20.

The light source holders 74 are arranged to hold the light sources 73 to fix to the chassis 71 while supporting the first optical member 701α, 701β and the second optical members 702. Each light source holder 74 includes clips for holding the light sources 73, a supporting pin for supporting the first optical member 701α, 701β and the second optical members 702, and the anchor for engaging light source holders 74 with the chassis 71. The clips, the supporting pin and the anchor of each light source holder 74 are of a monolithic construction preferably made of a resin material. Conventional light source holders can be used for the light source holders 74. For example, the light source holder disclosed in Japanese Patent Application Laid-Open Publication No. 2004-327449 (referred to as a "lamp holder" therein) can be favorably used for the light source holders 74.

The first optical member 701α, 701β is arranged to control the properties of light transmitted therethrough. A diffusion plate is used for the first optical member 701α, 701β of the light source device 7a according to the first preferred embodiment of the present invention. The diffusion plate is an optical member having a plate shape, and has the function of randomly diffusing (or scattering) light transmitted therethrough, allowing uniformalization of intensity distribution in a plane direction of the light. The diffusion plate is made from a nearly clear resin material that is a base material, in which fine particles having a property of reflecting light, or fine particles made of a material having a refractive index different from the base material are mixed. The diffusion plate is formed like a thin plate by being subjected to injection molding.

The first optical member 701α, 701β has the substantially square shape. The outer dimension of the first optical member 701α, 701β is set such that the first optical member 701α, 701β can be placed on the support faces 712 of the chassis 71, and is set to be larger than the dimension of the opening of the frame 6a, 6b, 6c, 6d. The female engagement portions 7011α, 7011β are provided at the given positions on the border portion of the first optical member 701α, 701β. The configuration, number, position, and dimension of the female engagement portions 7011α, 7011β are set as described above.

The second optical members 702 are arranged to control the properties of light transmitted therethrough. Optical members that are softer (more deformable) than the first optical member 701α, 701β are used for the second optical members 702. When the first optical member 701α, 701β is an optical member having a plate shape, optical members having a sheet or film shape that are thinner than the first optical member 701α, 701β are used for the second optical members 702. Examples of the second optical members 702 include a diffusion sheet, a diffusion film, a lens sheet, a lens film, and a reflective polarizing film.

The diffusion sheet is an optical member having a sheet shape. The diffusion film is an optical member having a film shape. Each of the diffusion sheet and the diffusion film has a function that is similar to the function of the diffusion plate. Each of the diffusion sheet and the diffusion film is made from a nearly clear material that is a base material, in which fine particles having a property of reflecting light, or fine particles made of a material having a refractive index different from the base material are mixed, and is formed into a sheet shape or a film shape. The nearly clear base material is preferably PET (polyethylene terephthalate).

The lens sheet is an optical member having a sheet shape. The lens film is an optical member having a film shape. Each of the lens sheet and the lens sheet film has the function of gathering light transmitted therethrough, allowing enhancement of brightness of the light. Each of the lens sheet and the lens sheet has a layer structure made up of a base layer, and a layer of a given cross-sectional shape that has a light-gathering function. The base layer is preferably made from PET (polyethylene terephthalate). The layer having the light-gathering function is preferably made from an acrylic resin.

The reflective polarizing film (also referred to as a brightness enhancement film) is an optical member having a film shape, and has the function of effectively using light. To be specific, the reflective polarizing film is arranged to transmit light that is polarized in a given direction (i.e., light that vibrates in a given direction), and reflect light other than the polarized light. The reflective polarizing film is preferably a DBEF film (DBEF is a registered trademark of 3M COMPANY).

The outer dimension and shape of the second optical members 702 is set to be smaller than that of the first optical member 701α, 701β, and set such that the second optical members 702 fit in the region surrounded by the second holding faces 612a, 612b, 612c, 612d of the frame 6a, 6b, 6c, 6d according to the preferred embodiments of the present invention. In other words, the second optical members 702 are formed so as to have the dimension and the shape almost same as the region surrounded by the second holding faces 612a, 612b, 612c, 612d, or formed so as to have the shape almost same as the region surrounded by the second holding faces 612a, 612b, 612c, 612d while having the dimension smaller than it.

The light source driving circuit board 76 incorporates electric circuits for driving the light sources 73. When fluorescent lamps are used for the light sources 73, the light source driving circuit board 76 incorporates an inverter circuit that generates a high-tension alternating-current voltage. The light source driving circuit board cover 77 has the shape of a plate, or a tray of low height. The light source driving circuit board cover 77 is arranged to protect the light source driving circuit board 76, and prevent unnecessary radiation from the light source driving circuit board 76. For this purpose, the light source driving circuit board cover 77 is made from a conductor such as metal.

Next, a description of assembly of the light source device 7a according to the first preferred embodiment of the present invention will be provided.

The reflection sheet 72 is laid on the front surface of the bottom 711 of the chassis 71. The light sources 73 of a given number are arranged in parallel on the front surface of the bottom 711 of the chassis 71 on which the reflection sheet 72 is laid. The light sources 73 are held by the light source holders 74 and fixed to the front surface of the bottom 711 of the chassis 71.

The side holders 75 are disposed along the shorter sides of the chassis 71 so as to cover both end portions of the light sources 73.

The first optical member 701α, 701β is laid on the front surfaces of the chassis 71 and the side holders 75. To be specific, the border portion of first optical member 701α, 701β is placed on the support faces 712 of the chassis 71 and the front surfaces of the side holders 75. The center portion of the first optical member 701α, 701β (i.e., a portion that is not placed on the support faces 712 of the chassis 71 nor the front surfaces of the side holders 75) is supported by the supporting pins of the light source holders 74.

The second optical members 702 are layered on the front surface of the first optical member 701α, 701β. Specific combinations of the second optical members 702 include a combination of two lens sheets or lens films, one diffusion sheet or diffusion film, and one reflective polarizing film, where the first lens sheet or lens film, the diffusion sheet, the second lens sheet or lens film, and the reflective polarizing film are layered in this order from the back side of the light source device 7a.

The kind, combination and number of the second optical members 702 are not limited to the ones described above. The kind, combination and number of the second optical members 702 are preferably selected according to the kind and the requirements of the light source device 7a or the kind and the requirements of a display device including the light source device 7a.

Then, the frame 6a, 6b, 6c, 6d according to the preferred embodiments of the present invention is attached to the front surface of the chassis 71, whereby the border portion of the first optical member 701α, 701β is sandwiched between the support faces 712 of the chassis 71 and the front side section 61 of the frame 6a, 6b, 6c, 6d, and between the front surfaces of the side holders 75 and the front side section 61 of the frame 6a, 6b, 6c, 6d (see especially FIG. 20). Thus, the first optical member 701α, 701β is held by the frame 6a, 6b, 6c, 6d in the light source device 7a according to the first preferred embodiment of the present invention.

The light source driving circuit board 76 is disposed behind the chassis 71. The light source driving circuit board cover 77 is disposed so as to cover the light source driving circuit board 76. In FIG. 20, the light source driving circuit board 76 and the light source driving circuit board cover 77 are omitted and not shown.

With the configuration described above, the light emitted from the light sources 73 is transmitted through the first optical member 701α, 701β and the second optical members 702 while its properties are controlled thereby, and projected toward the front side.

The distance between the support faces 712 of the chassis 71 and the first holding faces 611 is set to be larger than the thickness of the first optical member 701α, 701β. Thus, sandwiched between the support faces 712 and the first holding faces 611, the border portion of the first optical member 701α, 701β is prevented from being stuck and fixed therebetween, and can be maintained in a free state. Thus, a clearance is formed between the first optical member 701α, 701β and the first holding faces 611.

A clearance formed between the support faces 712 and the top surfaces of the male engagement portions 62α, 62β, 62γ, 62δ is set to be smaller than the thickness of the first optical member 701α, 701β when the frame 6a, 6b, 6c, 6d according to the preferred embodiments of the present invention is attached to the chassis 71. The top surfaces of the male engagement portions 62α, 62β, 62γ, 62δ are disposed at a more backside than the front surface of the first optical member 701α, 701β. Consequently, the male engagement portions 62α, 62β, 62γ, 62δ can be kept engaged with the female engagement portions 7011α, 7011β.

With the configuration described above, even when the first optical member 701α, 701β changes in dimension (or, even when a deformation volume of the front side section 61 differs from that of the first optical member 701α, 701β due to temperature change or humidity change, a force to hinder the change in dimension is prevented from being exerted on the border portion of the first optical member 701α, 701β. Consequently, the first optical member 701α, 701β, even if changes in dimension, is maintained flat, which can prevent a wrinkle or distortion from occurring therein. Thus, luminance unevenness or shadow resulting from a wrinkle or distortion in the first optical member 701α, 701β can be prevented from showing up.

In addition, when the frame 6a, 6b, 6c, 6d according to the preferred embodiments of the present invention is attached, the second optical members 702 fit in the region surrounded by the second holding faces 612a, 612b, 612c, 612d, in other words, the region surrounded by the male engagement portions 62α, 62β, 62γ, 62δ.

Accordingly, the second optical members 702, even if shift on the front surface of the first optical member 701α, 701β, cannot shift out of the region surrounded by the male engagement portions 62α, 62β, 62γ, 62δ because the end faces of the second optical members 702 touch the male engagement portions 62α, 62β, 62γ, 62δ. In other words, the male engagement portions 62α, 62β, 62γ, 62δ confine a region within which the second optical members 702 can shift to the region surrounded by them, and thus the second optical members 702 cannot shift out of the region surrounded by the male engagement portions 62α, 62β, 62γ, 62δ. In addition, because the portions of the lateral surfaces of the male engagement portions 62α, 62β, 62γ, 62δ almost coincide with the second holding faces 612a, 612b, 612c, 612d, the second optical members 702 cannot shift out of the region surrounded by the second holding faces 612a, 612b, 612c, 612d.

If the male engagement portions 62α, 62β, 62γ, 62δ are each disposed at positions close to both the ends of all the sides of the front side section 61 (i.e., two at each side), the second optical members 702 can be prevented from rotating. Thus, the four corners of the second optical members 702 do not stick out of the region surrounded by the second holding faces 612a, 612b, 612c, 612d.

Thus, the borer portion of the second optical members 702 do not get into between the front surface of the first optical member 701α, 701β and the first holding faces 611.

Consequently, an unexpected force is prevented from being exerted on the border portion of the second optical members 702, which can prevent a wrinkle or distortion from occurring therein. For example, even when the second optical members 702 change in dimension due to temperature change or humidity change, the border portion of the second optical members 702 can be maintained in a free state (a state where no external force is exerted, a state where the change in dimension is not hindered), which can prevent a wrinkle or distortion from occurring therein. Thus, because the second optical members 702 are maintained flat, luminance unevenness or shadow resulting from a wrinkle or distortion in the second optical members 702 can be prevented from showing up.

As described above, according to the light source device 7a according to the first preferred embodiment of the present invention, the formation of the clearance between the border portion of the first optical member 701α, 701β and the first holding faces 611 of the frame 6a, 6b, 6c, 6d according to the preferred embodiments of the present invention can prevent a wrinkle or distortion from occurring in the first optical member 701α, 701β, while the border portion of the second optical members 702 does not get into the clearance, which can prevent a wrinkle or distortion from occurring in the second optical members 702. Thus, luminance unevenness or shadow resulting from a wrinkle or distortion in the first optical member 701α, 701β and the second optical members 702 can be prevented from showing up, allowing the light source device 7a to emit light of which luminance distribution in a plane direction is even. Therefore, the display quality of a display device including the light source device 7a can be maintained or improved.

It is to be noted that when the first optical member 701α, 701β shifts or changes in dimension, the lateral surfaces of the male engagement portions 62α, 62β, 62γ, 62δ could get in contact with the inner peripheral surfaces of the notches or through-holes that define the female engagement portions 7011α, 7011β. In addition, when the second optical members 702 shift or change in dimension, the end faces of the second optical members 702 could get in contact with the lateral surfaces of the male engagement portions 62α, 62β, 62γ, 62δ.

However, in a case where the male engagement portions 62α, 62β, 62γ shown in FIGS. 4A, 4B and 5A are used, the inner peripheral surfaces of the notches or through-holes of the first optical member 701α, 701β or the end faces of the second optical members 702 get in contact with the portions of the male engagement portions 62α, 62β, 62γ that have a projecting shape (i.e., curved surfaces). Thus, a local force is prevented from being exerted on the inner peripheral surfaces of the notches or through-holes of the first optical member 701α, 701β, or the end faces of the second optical members 702.

The prevention of a local force from being exerted on the local portions of the first optical member 701α, 701β and the second optical members 702 can prevent a wrinkle or distortion from occurring in the vicinity of the portions of the first optical member 701α, 701β and the second optical members 702, at which the first optical member 701α, 701β and the second optical members 702 get in contact with the male engagement portions 62α, 62β, 62γ. Therefore, luminance unevenness or shadow resulting from a wrinkle or distortion in the first optical member 701α, 701β and the second optical members 702 can be prevented from showing up, which can improve or maintain the display quality of the display device including the light source device 7a.

Described above is the configuration that the light source device 7a according to the first preferred embodiment of the present invention includes one first optical member 701α, 701β; however, the number of the first optical member 701α, 701β is not limited thereto. It is preferable that two or more first optical members 701α, 701β are included.

In this case, the distance between the support faces 712 and the first holding faces 611 is set to be larger than the sum obtained by the following equation: the sum=(the thickness of one first optical member 701α, 701β)×(the number of all the first optical members 701α, 701β). In addition, the clearance formed between the support faces 712 and the top surfaces of the male engagement portions 62α, 62β, 62γ, 62δ is set to be smaller than the sum obtained by the following equation: the sum=(the thickness of one first optical member 701α, 701β)×(the number of all the first optical members 701α, 701β).

When two or more first optical members 701α, 701β are included, the male engagement portions 62α, 62β, 62γ, 62δ are engaged at least with the female engagement portions 7011α, 7011β of the first optical member 701α, 701β that is disposed at the most front side among all the first optical members 701α, 701β. Thus, the borer portion of the second optical members 702 do not get into between the first optical member 701α, 701β and the first holding faces 611.

As described above, it is preferable that when one first optical member 701α, 701β is included, the male engagement portions 62α, 62β, 62γ, 62δ are engaged with the female engagement portions 7011α, 7011β of the first optical member 701α, 701β. It is preferable that when two or more first optical members 701α, 701β are included, the male engagement portions 62α, 62β, 62γ, 62δ are engaged at least with the female engagement portions 7011α, 7011β of the first optical member 701α, 701β that is disposed at the most front side among all the first optical members 701α, 701β. The female engagement portions 7011α, 7011β of the first optical member (s) 701α, 701β other than the one disposed at the most front side may be left unengaged with the male engagement portions 62α, 62β, 62γ, 62δ.

Next, a description of a light source device 7b according to a second preferred embodiment of the present invention will be provided, which includes the frame 1a, 1b, 1c, 1d, 1e, 1f, 1g, 1h according to the preferred embodiments of the present invention, the first optical member 701α, 701β, the second optical members 702, and a third optical member 703.

Figure 21:
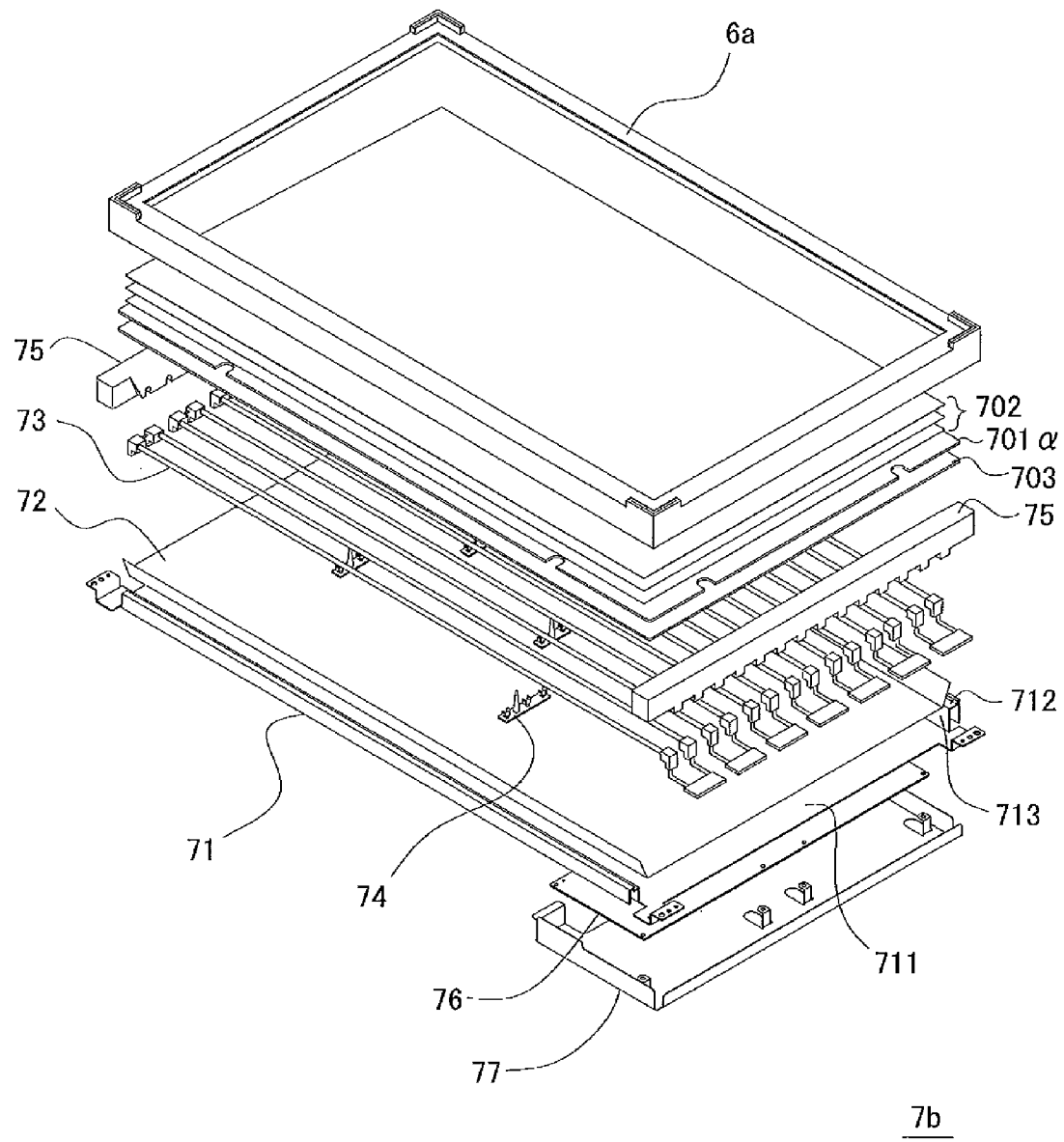
FIG. 21 is an exploded perspective view showing a schematic configuration of a light source device according to a second preferred embodiment of the present invention.
Figure 22:
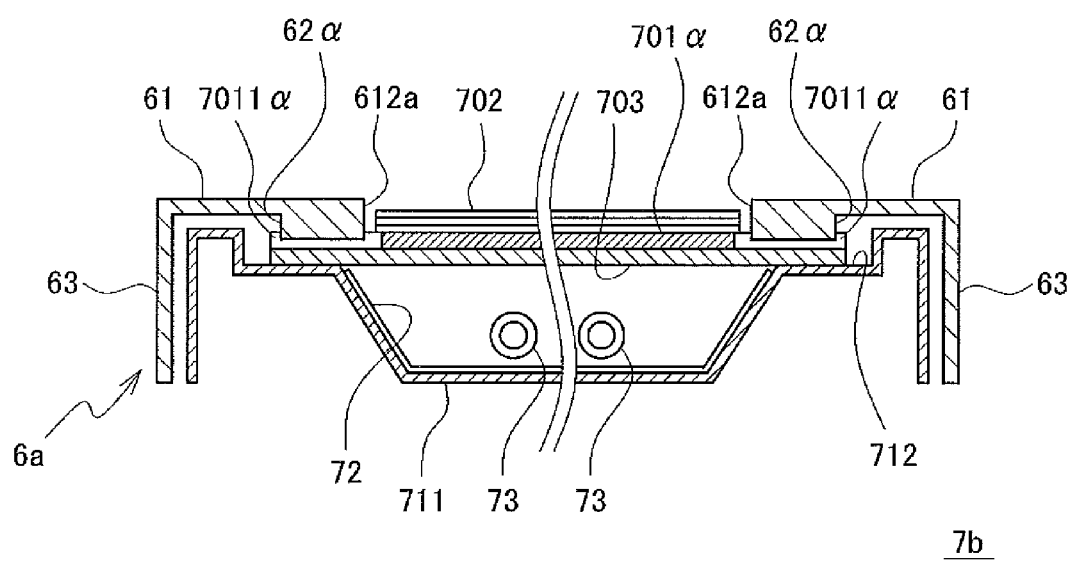
FIG. 22 is a schematic view showing a cross section structure of the light source device according to the second preferred embodiment of the present invention.

FIG. 21 is an exploded perspective view showing a schematic configuration of the light source device 7b according to the second preferred embodiment of the present invention. FIG. 22 is a schematic view showing a cross section structure of the light source device 7b according to the second preferred embodiment of the present invention. Explanations of the same configurations as those of the light source device 7a according to the first preferred embodiment of the present invention are omitted, and different respects are explained mainly, providing the same reference numerals as those of the light source device 7a according to the first preferred embodiment of the present invention.

The light source device 7b according to the second preferred embodiment of the present invention includes the chassis 71, the reflection sheet 72, the light sources 73, the light source holders 74, the side holders 75, the first optical member 701α, 701β, the second optical members 702, the third optical member 703, the frame 6a, 6b, 6c, 6d according to the preferred embodiments of the present invention, the light source driving circuit board 76, and the light source driving circuit board cover 77.

The configurations of the first optical member 701α, 701β and the second optical members 702 are as described above. A diffusion plate is used for the first optical member 701α, 701β. A diffusion sheet, a diffusion film, a lens sheet, a lens film, and a reflective polarizing film are preferably used for the second optical members 702.

The third optical member 703 has the plate shape and is arranged to control the properties of light transmitted therethrough. A diffusion plate is used for the third optical member 703. The function and the configuration of the diffusion plate are as described above. The outer dimension of the third optical member 703 is set such that the third optical member 703 can be placed on the support faces 712 of the chassis 71, and is set to be larger than the dimension of the opening of the front side section 61 of the frame 6a, 6b, 6c, 6d according to the preferred embodiments of the present invention. That is, the third optical member 703 has the dimension and shape almost same as the first optical member 701α, 701β. No female engagement portion (e.g., notch, through-hole) is provided on a border portion of the third optical member 703.

The chassis 71, the light sources 73, the reflection sheet 72, the light source holders 74 and the light source driving circuit board 76 have the configurations same as those included in the light source device 7a according to the first preferred embodiment of the present invention, and explanations thereof are omitted.

Next, a description of assembly of the light source device 7b according to the second preferred embodiment of the present invention will be provided.

The first optical member 701α, 701β and the third optical member 703 are layered on the front surface of the chassis 71 and the front surfaces of the side holders 75. To be specific, the first optical member 701α, 701β is disposed in front of the third optical member 703.

The second optical members 702 are layered on the front surface of the first optical member 701α, 701β.

Then, the frame 6a, 6b, 6c, 6d according to the preferred embodiments of the present invention is attached to the front surface of the chassis 71, whereby the border portions of the first optical member 701α, 701β and the third optical member 703 are sandwiched between the support faces 712 and the first holding faces 611, and between the front surfaces of the side holders 75 and the first holding faces 611 (see especially FIG. 22). Thus, the first optical member 701α, 701β and the third optical member 703 are held in the light source device 7b according to the second preferred embodiment of the present invention.

The distance between the support faces 712 and the first holding faces 611 is set to be larger than the sum of the thicknesses of the first optical member 701α, 701β and the third optical member 703. Thus, sandwiched between the support faces 712 and the first holding faces 611, the border portions of the first optical member 701α, 701β and the third optical member 703 are prevented from being stuck and fixed therebetween, and can be maintained in a free state. Thus, a clearance is formed between the front surface of the first optical member 701α, 701β and the first holding faces 611.

A clearance formed between the support faces 712 and the top surfaces of the male engagement portions 62α, 62β, 62γ, 62δ is set to be larger than the third optical member 703 but smaller than the sum of the thicknesses of the first optical member 701α, 701β and the third optical member 703 when the frame 6a, 6b, 6c, 6d according to the preferred embodiments of the present invention is attached to the chassis 71. Thus, sandwiched between the top surfaces of the male engagement portions 62α, 62β, 62γ, 62δ and the support faces 712, the border portion of the third optical member 703 is prevented from being stuck and fixed therebetween, and can be maintained in a free state.

When the frame 6a, 6b, 6c, 6d according to the preferred embodiments of the present invention is attached to the front surface of the chassis 71, the male engagement portions 62α, 62β, 62γ, 62δ are engaged with the female engagement portions 7011α, 7011β of the first optical member 701α, 701β. The top surfaces of the male engagement portions 62α, 62β, 62γ, 62δ are disposed at a more back side than the front surface of the first optical member 701α, 701β.

With the configuration described above, even when the first optical member 701α, 701β and the third optical member 703 change in dimension (or, even when a deformation volume of the front side section 61 differs from that of the first optical member 701α, 701β and the third optical member 703) due to temperature change or humidity change, a force to hinder the change in dimension is prevented from being exerted on the border portions of the first optical member 701α, 701β and the third optical member 703. Consequently, the first optical member 701α, 701β and the third optical member 703, even if change in dimension, are maintained flat, which can prevent a wrinkle or distortion from occurring therein. Thus, luminance unevenness or shadow resulting from a wrinkle or distortion in the first optical member 701α, 701β and the third optical member 703 can be prevented from showing up.

In addition, when the frame 6a, 6b, 6c, 6d according to the preferred embodiments of the present invention is attached, the second optical members 702 fit in the region surrounded by the second holding faces 612a, 612b, 612c, 612d, in other words, the region surrounded by the male engagement portions 62α, 62β, 62γ, 62δ.

Accordingly, the second optical members 702, even if shift in their plane direction, cannot shift out of the region surrounded by the male engagement portions 62α, 62β, 62γ, 62δ because the end faces of the second optical members 702 touch the male engagement portions 62α, 62β, 62γ, 62δ. In other words, the male engagement portions 62α, 62β, 62γ, 62δ confine a region within which the second optical members 702 can shift to the region surrounded by them, and thus the second optical members 702 cannot shift out of the region surrounded by the male engagement portions 62α, 62β, 62γ, 62δ. In addition, because the portions of the lateral surfaces of the male engagement portions 62α, 62β, 62γ, 62δ almost coincide with the second holding faces 612a, 612b, 612c, 612d, the borer portion of the second optical members 702 do not get into between the first optical member 701α, 701β and the first holding faces 611.

In addition, because the male engagement portions 62α, 62β, 62γ, 62δ that are each disposed at positions close to both the ends of all the sides of the front side section 61 prevent the second optical members 702 from rotating, the four corners of the second optical members 702 do not stick out of the region surrounded by the second holding faces 612a, 612b, 612c, 612d. Thus, the borer portion of the second optical members 702 do not get into between the first optical member 701α, 701β and the first holding faces 611.

Having the configuration described above, the light source device 7b according to the second preferred embodiment of the present invention can produce an effect same as the light source device 7a according to the first preferred embodiment of the present invention.

Described above is the configuration that the light source device 7b according to the second preferred embodiment of the present invention includes one first optical member 701α, 701β and one third optical member 703; however, the numbers of the first optical member 701α, 701β and the third optical member 703 are not limited thereto. It is preferable that one first optical member 701α, 701β and two or more third optical members 703 are included. In this case, the third optical members 703 are layered, and the first optical member 701α, 701β is disposed on the front surface of the third optical member 703 disposed at the most front side among the third optical members 703. It is also preferable that two or more first optical members 701α, 701β and two or more third optical members 703 are included. In this case, it is essential only that one of the first optical members 701α, 701β should be disposed at the most front side among the optical members 701α, 701β and the third optical members 703, and the order of the optical members 701α, 701β and the third optical members 703 is not limited specifically.

In this case, the distance between the support faces 712 and the first holding faces 611 is set to be larger than the sum obtained by the following equation: the sum=(the thickness of one first optical member 701α, 701β)×(the number of all the first optical members 701α, 701β)+(the thickness of one third optical member 703)×(the number of all the third optical members 703). In addition, the clearance formed between the support faces 712 and the top surfaces of the male engagement portions 62α, 62β, 62γ, 62δ is set to be larger than the sum obtained by the following equation: the sum={(the thickness of one first optical member 701α, 701β)×(the number of all the first optical members 701α, 701β−1)+(the thickness of one third optical member 703)×(the number of all the third optical members 703)}, but smaller than the sum obtained by the following equation: the sum=(the thickness of one first optical member 701α, 701β)×(the number of all the first optical members 701α, 701)+(the thickness of one third optical member 703)×(the number of all the third optical members 703).

When two or more first optical members 701α, 701β and two or more third optical member 703 are included, the male engagement portions 62α, 62β, 62γ, 62δ are engaged with the female engagement portions 7011α, 7011β of the first optical member 701α, 701β that is disposed at the most front side among all the first optical members 701α, 701β. Thus, sandwiched between the clearance formed between the support faces 712 and the top surfaces of the male engagement portions 62α, 62β, 62γ, 62δ, the border portion of the first optical member(s) 701α, 701β other than the one disposed at the most front side and the border portion of the third optical members 703 are prevented from being stuck and fixed therebetween, and can be maintained in a free state.

As described above, it is essential only that the light source device 7a and the light source device 7b including the frame 6a, 6b, 6c, 6d according to the preferred embodiments of the present invention should have the configuration that at least one first optical member 701α, 701β is included, which is opposed directly to the first holding faces 611, and the male engagement portions 62α, 62β, 62γ, 62δ are engaged with the female engagement portions 7011α, 7011β.

By having a configuration such that only the first optical members 701α, 701β are included and no third optical member 703 is included in a case where a plurality of optical members are held by the support faces 712 and the holding faces 611, the kind of optical members can be reduced (or, the need to increase the kind is eliminated). Therefore, reduction of cost of production or cost of parts can be achieved, or increase thereof can be restrained. In addition, this configuration eliminates the necessity to distinguish the first optical members 701α, 701β from the third optical member 703 in assembling the light source device 7a, 7b including the frame 6a, 6b, 6c, 6d according to the preferred embodiments of the present invention, which can simplify the assembly operation.

Figure 23:
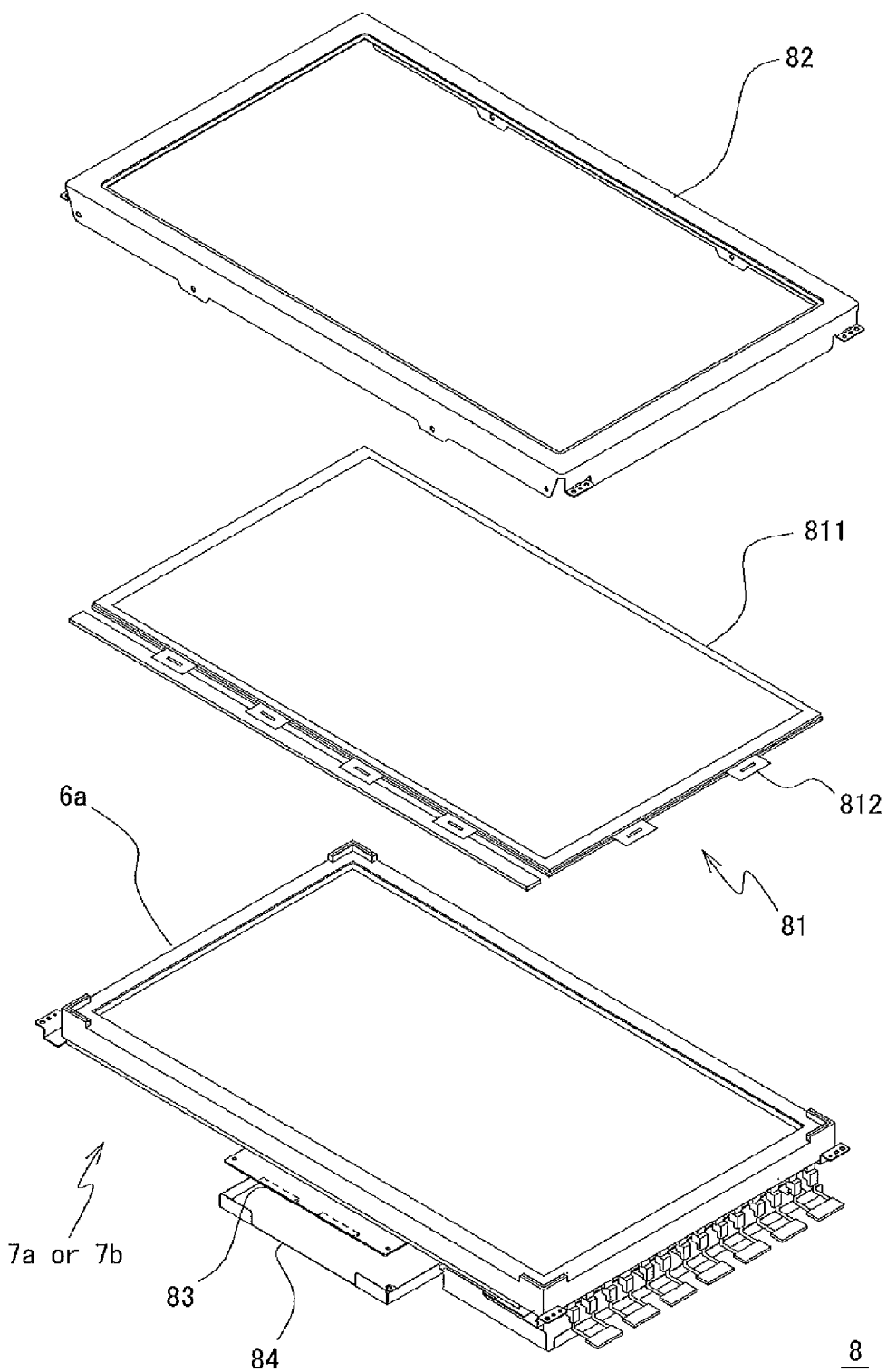
FIG. 23 is an exploded perspective view showing a schematic configuration of a display device according to a preferred embodiment of the present invention.

Next, a description of a display device 8 according to a preferred embodiment of the present invention that includes the light source device 7a, 7b according to the preferred embodiments of the present invention will be provided. FIG. 23 is an exploded perspective view showing a schematic configuration of the display device 8 according to the preferred embodiment of the present invention.

As shown in FIG. 23, the display device 8 according to the preferred embodiment of the present invention includes the light source device 7a, 7b according to the preferred embodiments of the present invention, a display panel assembly 81, a bezel 82, a control circuit board 83, and a control circuit board cover 84.

The display panel assembly 81 includes a display panel 811, and a circuit board 812 that incorporates driver ICs (or driver SIs) arranged to drive the display panel 811. A variety of conventional transmissive display panels can be used for the display panel 811. For example, a generally-used transmissive active matrix liquid crystal display panel can be used. The generally-used transmissive crystal display panel includes a pair of substrates (a TFF array substrate and a color filter), and liquid crystals are filled between the substrates.

When one surface of the display panel is illuminated with light, the light transmits the substrates to display an image visible on the other surface of the display panel. That is, the image display is performed using the light emitted from a light source device.

The bezel 82 has the function of supporting and protecting the display panel assembly 81. As shown in FIG. 23, the bezel 82 has a frame shape, which is a substantially square shape with an opening. A variety of conventional bezels can be used for the bezel 82.

The control circuit board 83 incorporates electronic circuits for generating a signal to control the display panel 811 based on a signal inputted from the outside (e.g., a tuner). A variety of conventional control circuit boards can be used for the control circuit board 83. The control circuit board cover 84 has the shape of a plate, or a tray of low height to cover the control circuit board 83. The control circuit board cover 84 has the function of protecting the control circuit board 83, and preventing unnecessary radiation from the control circuit board 83. For this purpose, the light source driving circuit board cover 84 is made from a conductor such as metal.

Next, a description of assembly of the display device 8 according to the preferred embodiment of the present invention will be provided.

The display panel assembly 81 is disposed in front of the light source device 7a, 7b according to the preferred embodiments of the present invention. To be specific, the display panel 811 of the display panel assembly 81 is placed on the front surface of the front side section 61 of the frame 6a, 6b, 6c, 6d, and located by the locating projections 64. The circuit board 812 attached to the display panel 811 is disposed on the front surface of the front side section 61 of the frame 6a, 6b, 6c, 6d, and on the outer surfaces of the outer walls 63.

Then, the bezel 82 is attached to the front surfaces of the display panel assembly 81 and the light source device 7a, 7b. Thus, the border portion of the display panel 811 is sandwiched between the front side section 61 and the bezel 82, whereby the display panel assembly 81 is held in the display device 8.

The control circuit board 83 is disposed behind the chassis 71 of the light source device 7a, 7b according to the preferred embodiments of the present invention. The control circuit board cover 84 is disposed so as to cover the control circuit board 83.

Figure 24:
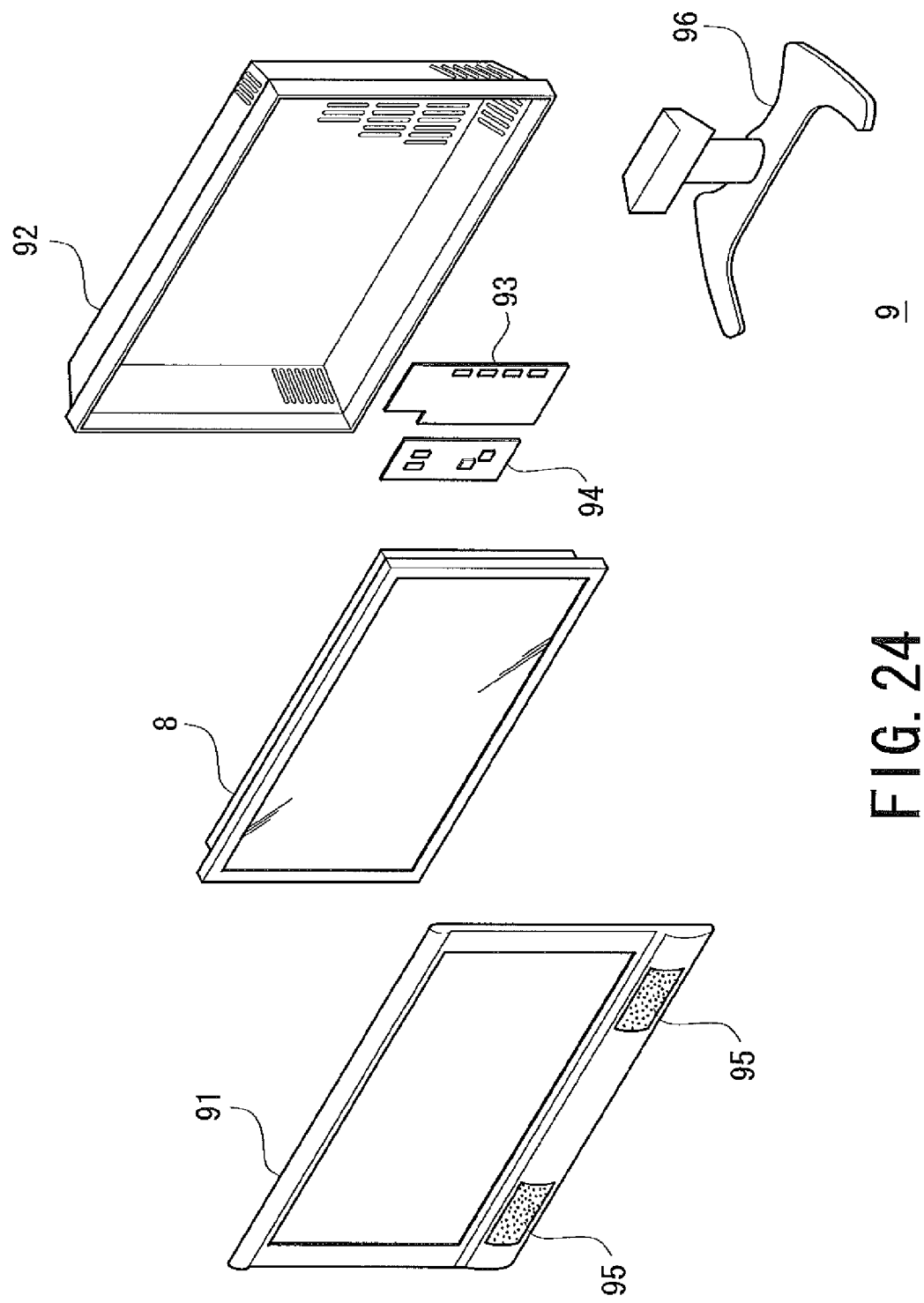
FIG. 24 is an exploded perspective view showing a schematic configuration of a television receiver according to a preferred embodiment of the present invention.

Next, a brief description of a television receiver 9 according to a preferred embodiment of the present invention including the display device 8 according to the preferred embodiment of the present invention will be provided. FIG. 24 is an exploded perspective view showing a schematic configuration of the television receiver 9 according to the preferred embodiment of the present invention. The television receiver 9 includes the display device 8 according to the preferred embodiment of the present invention, an electric power supply board 93, a tuner 94, loudspeaker units 95, a front side cabinet 91, a back side cabinet 92, and a supporting member 96.

The electric power supply board 93 is arranged to supply electric power to the display device 8 according to the preferred embodiment of the present invention, the tuner 94 and other components.

The tuner board 94 is arranged to produce an image signal and a sound signal of a given channel based on a received radio wave and a signal inputted from the outside. A conventional terrestrial tuner (analog and/or digital), a BS tuner and a CS tuner may be used for the tuner 94.

The display device 8 according to the preferred embodiment of the present invention is arranged to display an image based on the image signal of the given channel produced by the tuner 94. The loudspeaker units 95 are arranged to produce a sound based on the sound signal produced by the tuner 94. A variety of conventional loudspeaker units such as generally-used speakers may be used for the loudspeaker units 95.

The display device 8 according to the preferred embodiment of the present invention, the electric power supply board 93, the tuner 94 and the loudspeaker units 95 are housed between the front side cabinet 91 and the backside cabinet 92, which is supported by the supporting member 96. The television receiver 9 is not limited to this configuration. For example, the electric power supply board 93, the tuner board 94 and the loudspeaker units 95 may be incorporated in the display device 8 according to the preferred embodiment of the present invention.

Next, brief descriptions of other preferred embodiments of the present invention will be provided with reference to the accompanying drawings.

Figure 25:
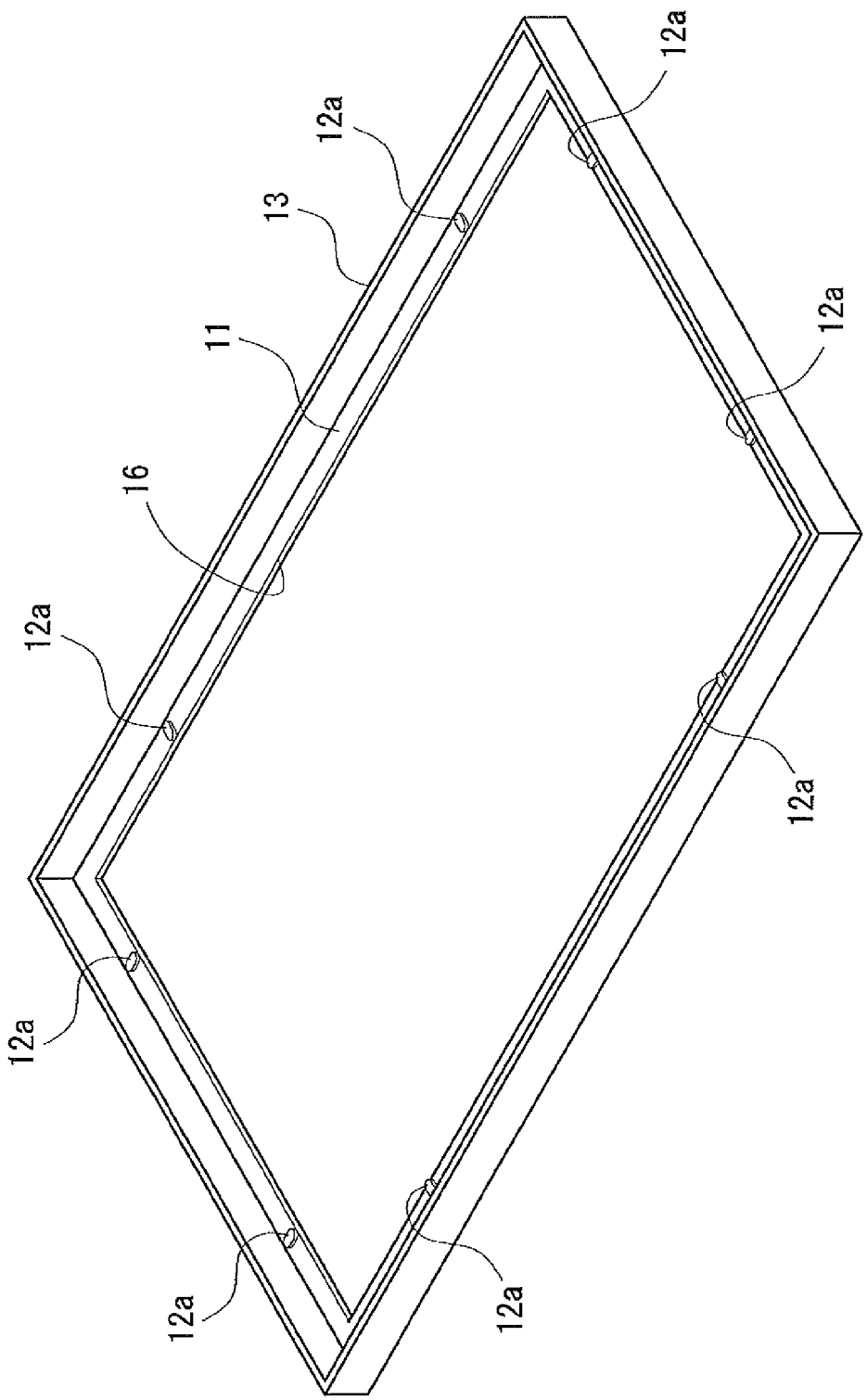
FIG. 25 is an external perspective view showing a schematic configuration of a frame for a light source device according to another preferred embodiment of the present invention.
Figure 26:
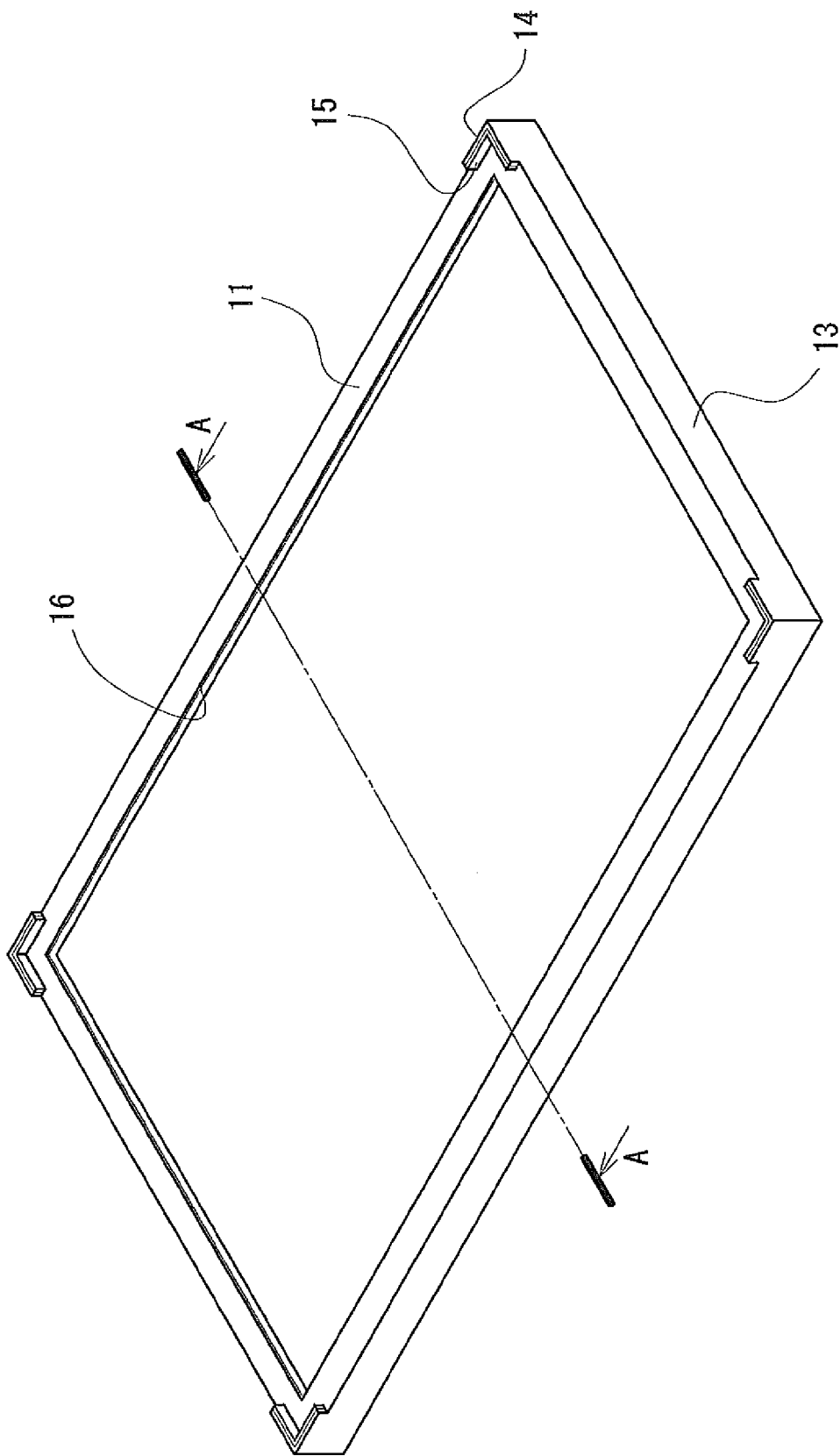
FIG. 26 is an external perspective view showing a schematic configuration of the frame for the light source device according to the another preferred embodiment of the present invention, which is seen from the side opposite to the side from which the frame is seen in FIG. 25.
Figure 27:
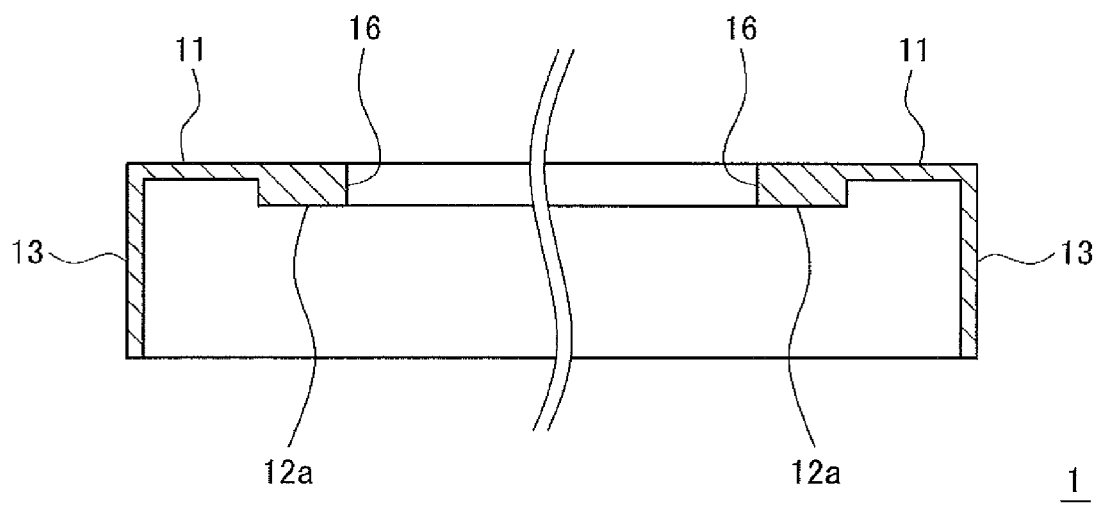
FIG. 27, which is a cross-sectional view showing the frame for the light source device according to the another preferred embodiment of the present invention along the line A-A in the direction of the arrow of FIG. 26, is a schematic view showing a cross section structure of the frame.

FIG. 25 is an external perspective view showing a schematic configuration of a frame 1 for a light source device according to another preferred embodiment of the present invention. FIG. 26 is an external perspective view showing a schematic configuration of the frame 1 frame 1 for the light source device according to the another preferred embodiment of the present invention, which is seen from the side opposite to the side from which the frame 1 is seen in FIG. 25. FIG. 27, which is a cross-sectional view showing the frame 1 for the light source device according to the another preferred embodiment of the present invention along the line A-A in the direction of the arrow of FIG. 26, is a schematic view showing a cross section structure of the frame 1. The back surface of the frame 1 faces toward the top of FIG. 25, the front surface of the frame 1 faces toward the top of FIG. 26, and the front surface of the frame 1 faces toward the top of FIG. 27. The front surface of the frame 1 faces toward the bottom of FIG. 25, the back surface of the frame 1 faces toward the bottom of FIG. 26, and the back surface of the frame 1 faces toward the bottom of FIG. 27.

The frame 1 for the light source device according to the another preferred embodiment of the present invention is arranged to hold an optical member that has the shape of a substantially square plate, includes notches disposed at given positions on its outer periphery, and is arranged to control the properties of light transmitted therethrough. As shown in FIGS. 25 to 27, the frame 1 has a substantially square shape with an opening.

As shown in FIGS. 25 to 27, the frame 1 includes a front side section 11 having a substantially square shape with an opening. To be specific, the front side section 11 has the outside shape of a substantial square with an opening, where the opening has a substantially square shape. The shape of the opening is almost same as the outside shape of the optical member that is to be held by the frame 1. The dimension of the opening is smaller than the outer dimension of the optical member.

As shown in FIGS. 25 to 27, engagement projections 12a are provided on the back surfaces on all the sides of the front side section 11. The engagement projections 12a are arranged to be engaged with the notches provided on the outer periphery of the optical member that is to be held by the frame 1. The engagement projections 12a define structures having a convex shape that protrude toward the back side. Portions of lateral surfaces of the engagement projections 12a almost coincide with inner peripheral surfaces 16 of the opening of the front side section 11. The engagement projections 12a are disposed at given positions on all the sides of the front side section 11. To be specific, the engagement projections 12*a* are each disposed at least at positions close to both the ends of all the sides of the front side section 11 (i.e., at two positions on each side of the front side section 11).

In addition, side walls 13 that rise toward the back side are provided at outer peripheral edges of the front side section 11. Thus, each side of the frame 1 according to the another preferred embodiment of the present invention has the shape of the letter L in cross section as especially shown in FIG. 27. In addition, the front side section 11 includes a planar surface on its front surface as shown in FIG. 26, on which a border portion of a display panel is to be placed. The front side section 11 includes locating projections 14 for locating the display panel at predetermined positions on its front surface. The shape or the positions of the locating projections 14 are not limited specifically. For example, the locating projections 14 may have the shape of the letter L and may be disposed at the four corners of the front side section 11 as shown in FIG. 26. The locating projections 14 may each include cushioning materials 15 such as rubber and sponge on their inside surfaces. Thus, the display panel can be placed on the frame 1 so as to befit into a region surrounded by the locating projections 14.

The frame 1 according to the another preferred embodiment of the present invention may be of a monolithic construction made of a resin material, may be of a multi-component assembled construction made of a resin material, may be of a monolithic construction made of a metal plate that is subjected to press working, or may be of a multi-component assembled construction made of a metal plate that is subjected to press working. The engagement projections 12*a* and the front side section 11 may be of a monolithic construction, or may be of a multi-component assembled construction.

Figure 28A:
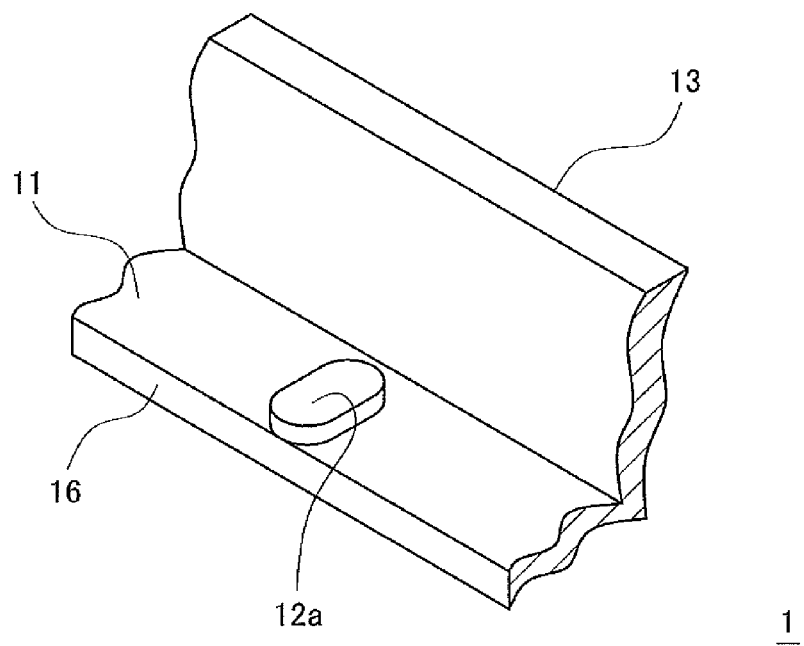
FIGS. 28A and 28B are external perspective views showing schematic configurations of engagement projections, where shown in FIG. 28A is an engagement projection having a substantially oval shape, and shown in FIG. 28B is an engagement projection having a substantially round shape.
Figure 28B:
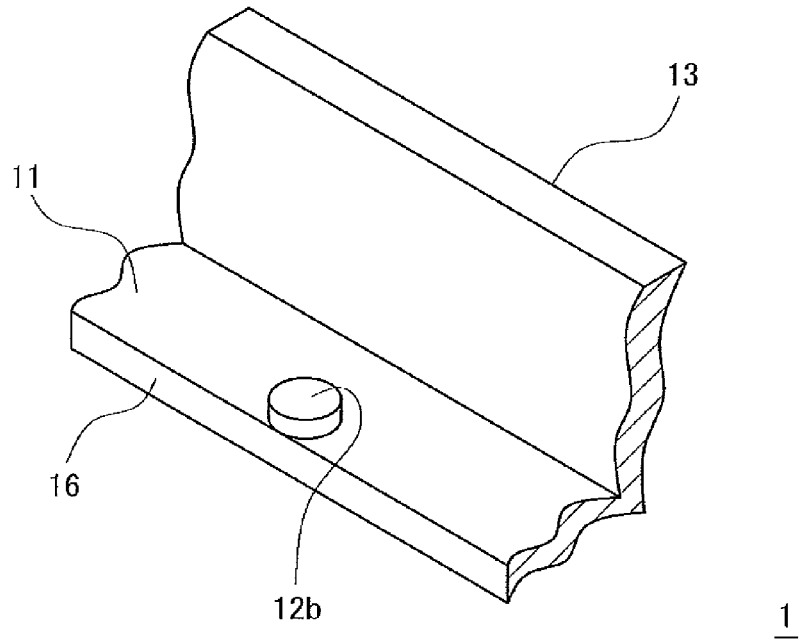
Figure 29A:
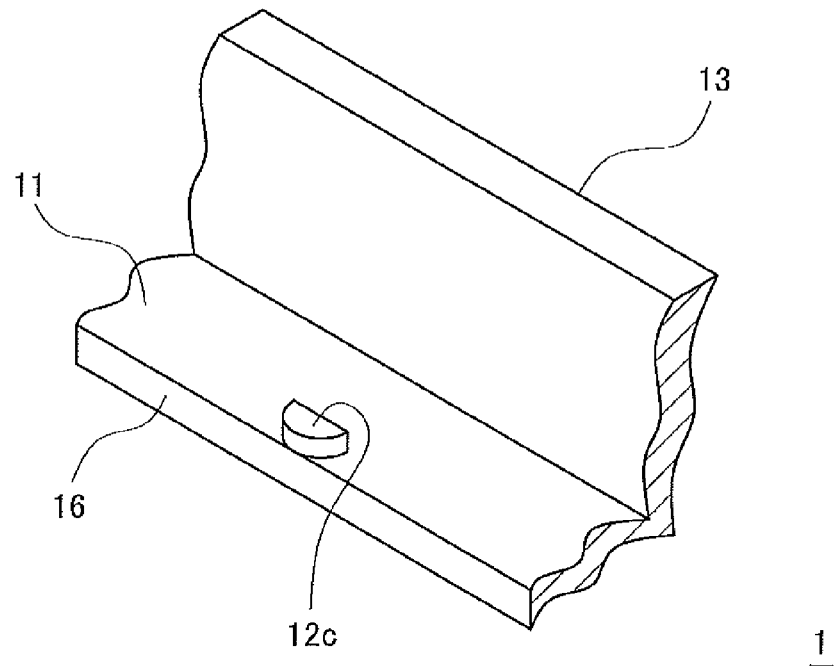
FIGS. 29A and 29B are external perspective views showing schematic configurations of engagement projections, where shown in FIG. 29A is an engagement projection having a substantially half-round shape, and shown in FIG. 29B is an engagement projection having a substantially square shape.
Figure 29B:
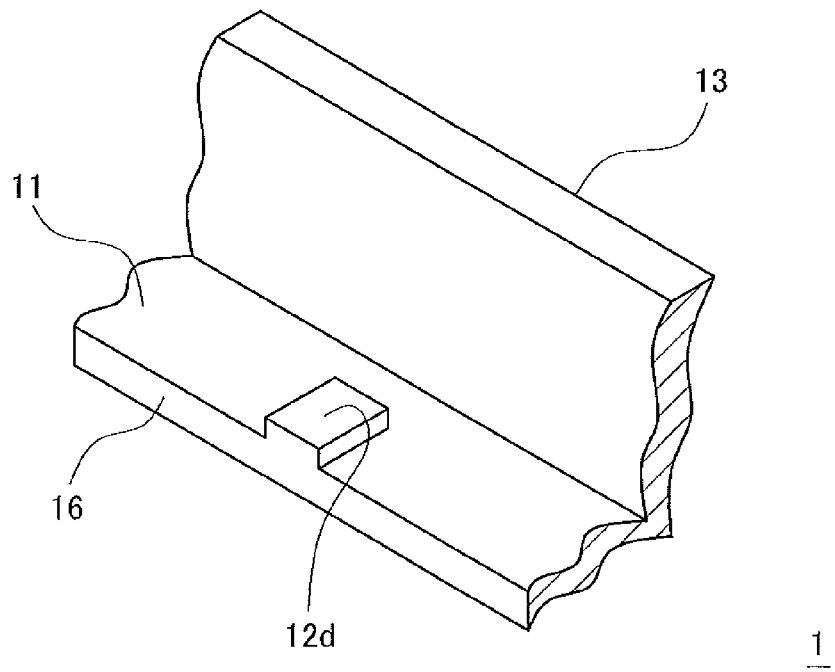

FIGS. 28A and 28B, and FIGS. 29A and 29B are external perspective views showing schematic configurations of the variety of engagement projections provided to the frame 1 for the light source device according to the another preferred embodiment of the present invention. Shown in FIG. 28A is the engagement projection 12*a* having a substantially oval shape. Shown in FIG. 28B is an engagement projection 12*b* having a substantially round shape. Shown in FIG. 29A is an engagement projection 12*c* having a substantially half-round shape. Shown in FIG. 29B is an engagement projection 12*d* having a substantially square shape.

In the case of the engagement projections 12*a* having the substantially oval shape, the axis lines in longitudinal directions of the engagement projections 12*a* are substantially perpendicular to longitudinal directions of the sides of the front side section 11 as shown in FIG. 28A. Thus, one ends in the longitudinal directions of the engagement projections 12*a* (i.e., the front-ends on curved surfaces of the half-round shapes of the engagement projections 12*a*) almost coincide with the inner peripheral surfaces 16 on the sides of the opening of the front side section 11. In the case of the engagement projections 12*b* having the substantially round shape, portions of outer surfaces of the engagement projections 12*b* almost coincide the inner peripheral surfaces 16 on the sides of the opening of the front side section 11 as shown in FIG. 28B. In the case of the engagement projections 12*c* having the substantially half-round shape, surfaces corresponding to the arcs of the half-round shapes of the engagement projections 12*c* (i.e., curved surfaces) are oriented in directions same as the inner peripheral surfaces 16 on the sides of the opening of the front side section 11, and surfaces corresponding to the chords of the half-round shapes of the engagement projections 12*c* (i.e., flat surfaces) are oriented toward the side walls 13 as shown in FIG. 29A. Thus, portions of the surfaces corresponding to the arcs almost coincide with the inner peripheral surfaces 16 on the sides of the opening of the front side section 11.

As described above, at least portions of lateral surfaces of the engagement projections 12*a*, 12*b*, 12*c* are formed to have a projecting shape (to be specific, are formed to be curved surfaces). Thus, the projecting portions are oriented in directions same as the inner peripheral surfaces 16 on the sides of the opening of the front side section 11. In other words, the lateral surfaces of the engagement projections 12*a*, 12*b*, 12*c* that are oriented in the directions same as the inner peripheral surfaces 16 on the sides of the opening of the front side section 11 are formed to project toward the opening. Thus, portions of the projecting portions almost coincide with the inner peripheral surfaces 16 on the sides of the opening of the front side section 11.

It is also preferable that the engagement projections include no projecting portion (no curved surface). For example, as shown in FIG. 29B, the engagement projections 12*d* have a substantially square shape. One lateral surfaces of the engagement projections 12*d* almost coincide with the inner peripheral surfaces 16 on the sides of the opening of the front side section 11.

Figure 30:
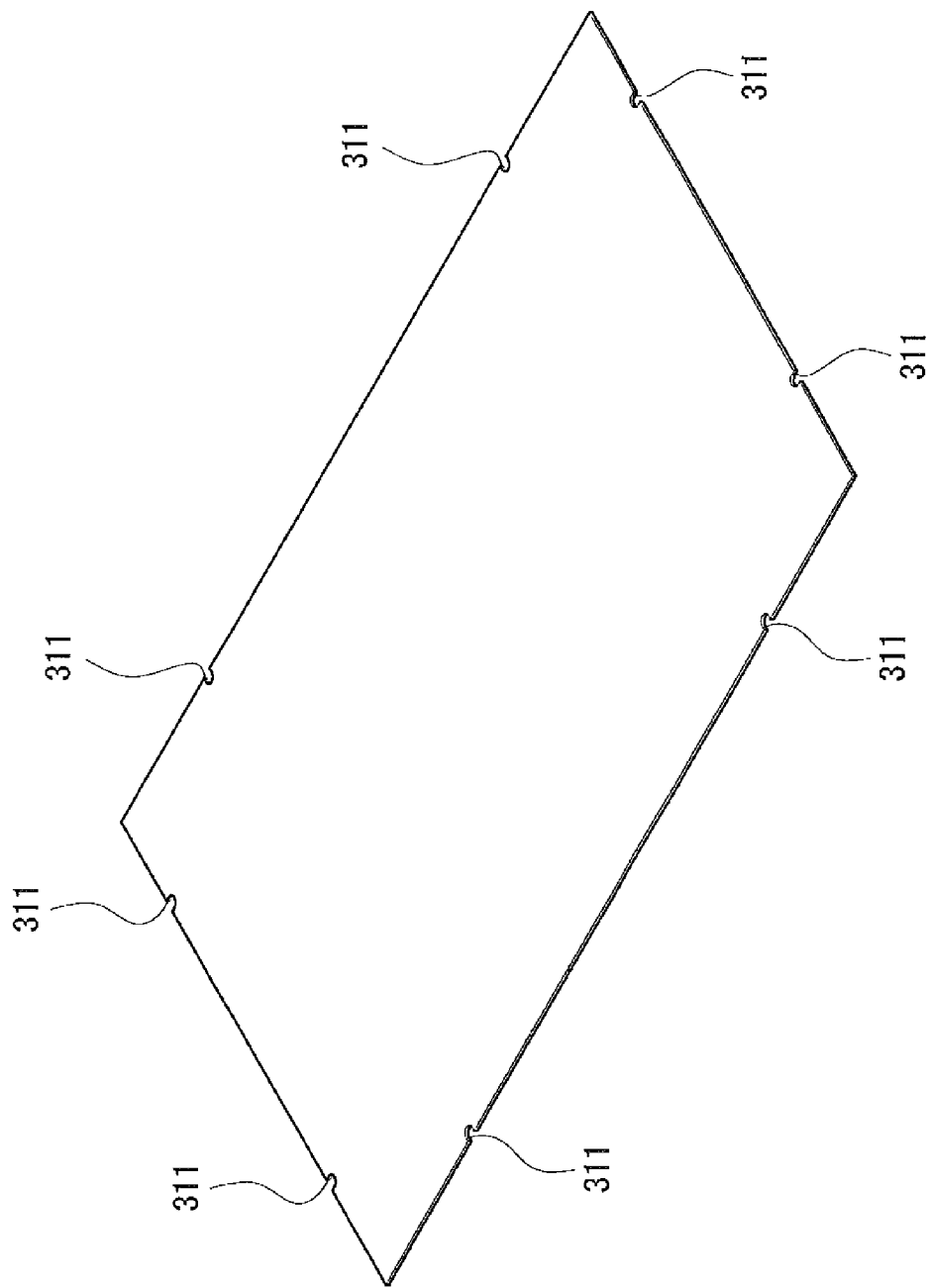
FIG. 30 is an external perspective view showing a schematic configuration of an optical member having a plate shape that is a subject to be held by the frame for the light source device according to the another preferred embodiment of the present invention.

FIG. 30 is an external perspective view showing a schematic configuration of an optical member 31 having a plate shape that is a subject to be held by the frame 1 for the light source device according to the another preferred embodiment of the present invention. As shown in FIG. 30, the plate-shaped optical member 31 has a substantially square shape, and includes notches 311 having a given shape and size that are disposed at given positions on its outer periphery. The notches 311 have their number, position, shape and dimension set so as to be engaged with the engagement projections 12*a*, 12*b*, 12*c*, 12*d* on all the sides of the front side section 11 of the frame 1 according to the another preferred embodiment of the present invention when the plate-shaped optical member 31 is disposed behind the front side section 11.

For example, when the engagement projections 12*a*, 12*b*, 12*c* shown in FIG. 28A, 28B, 29A are included in the frame 1, the notches 311 are formed so as to have the substantial shape of the letter U or a substantially half-round shape at positions on the plate-shaped optical member 31, the positions corresponding to the engagement projections 12*a*, 12*b*, 12*c*. When the engagement projections 12*d* shown in FIG. 29B are included in the frame 1, the notches 311 are formed so as to have a substantially square shape at positions on the plate-shaped optical member 31, the positions corresponding to the engagement projections 12*d*.

Figure 31:
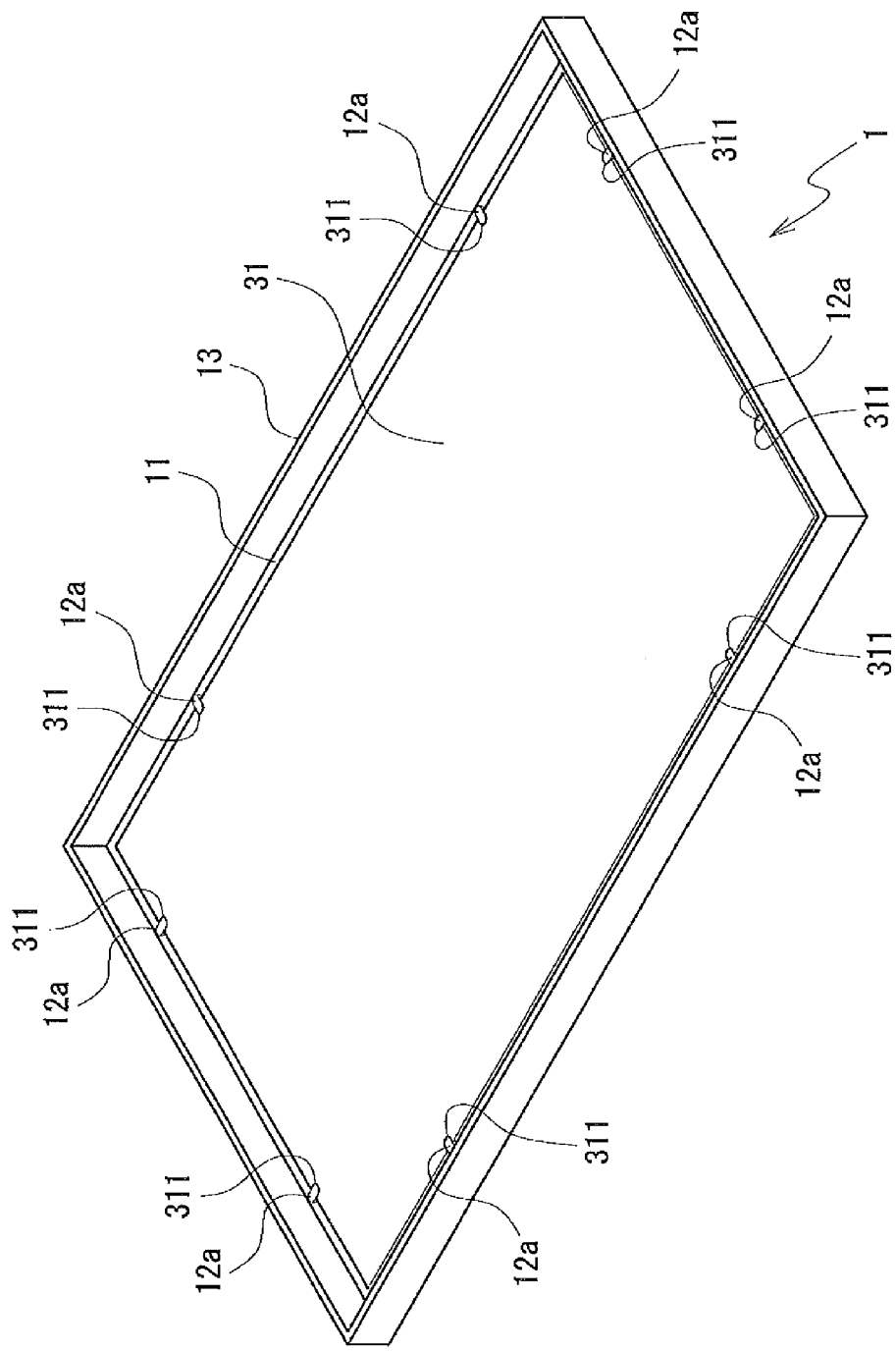
FIG. 31 is an external perspective view showing the frame for the light source device according to the another preferred embodiment of the present invention and the plate-shaped optical member held by the frame.

FIG. 31 is an external perspective view showing the frame 1 according to the another preferred embodiment of the present invention, where the plate-shaped optical member 31 is disposed behind the front side section 11 of the frame 1. It is to be noted that shown in FIG. 31 is the frame 1 including the engagement projections 12*a* having the substantially oval shape; however, the engagement projections 12*b*, 12*c*, 12*d* having other shapes may be included in the frame 1. The dimension of the opening of the front side section 11 is smaller than the outer dimension of the plate-shaped optical member 31. Thus, a border portion of the plate-shaped optical member 31 is placed on (i.e., opposed to) a portion of the front side section 11 that is closer to the opening. The engagement projections 12*a*, 12*b*, 12*c*, 12*d* of the front side section 11 are engaged with the notches 311 on the outer periphery of the plate-shaped optical member 31.

The dimension and shape of the engagement projections 12*a*, 12*b*, 12*c*, 12*d* provided to the frame 1 according to the another preferred embodiment of the present invention, and the dimensions and shapes of the notches 311 provided on the outer periphery of the plate-shaped optical member 31 will be described. The dimensions are set such that a given clearance is formed between the outer surfaces of the engagement projections 12a, 12b, 12c, 12d and inner peripheral surfaces of the notches 311 in the engaged state. To be specific, the clearance is set such that the outer surfaces of the engagement projections 12a, 12b, 12c, 12d and the inner peripheral surfaces of the notches 311 do not get in contact with each other (or, such that the engagement projections 12a, 12b, 12c, 12d do not hinder the plate-shaped optical member 31 from deforming) even when the plate-shaped optical member 31 changes in dimension due to temperature change or humidity change (or, even when a deformation volume of the front side section 11 differs from that of the plate-shaped optical member 31 due to temperature change or humidity change).

By setting as described above, even when the plate-shaped optical member 31 changes in dimension (or, even when a deformation volume of the plate-shaped optical member 31 differs from that of the front side section 11), the engagement projections 12a, 12b, 12c, 12 are prevented from getting in contact with and applying a force on the inner peripheral surfaces of the notches 311 of the plate-shaped optical member 31. Consequently, the plate-shaped optical member 31 is maintained flat, which can prevent a wrinkle or distortion from occurring therein.

Next, a description of a light source device 2 according to another preferred embodiment of the present invention will be provided, which includes the frame 1 for the light source device according to the another preferred embodiment of the present invention.

Figure 32:
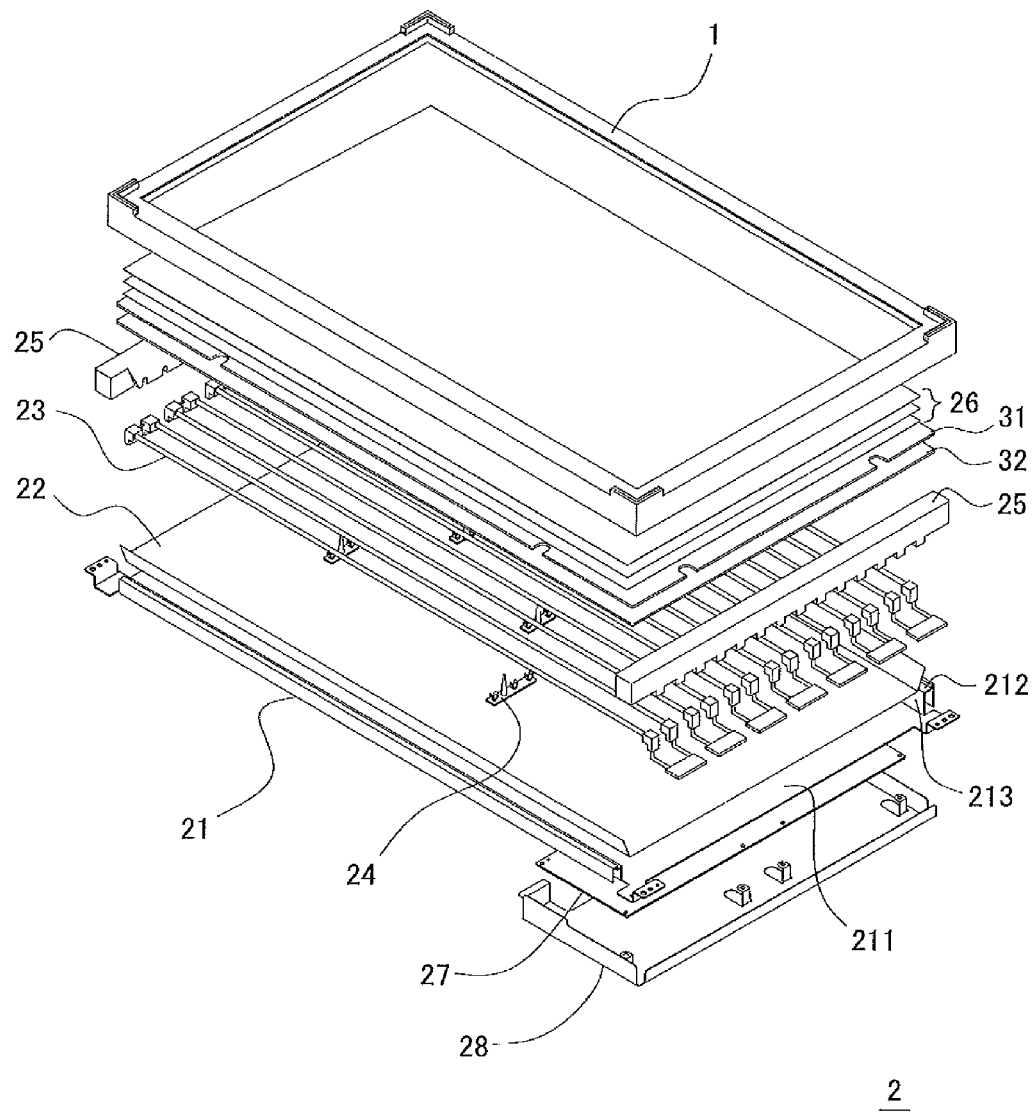
FIG. 32 is an exploded perspective view showing a schematic configuration of relevant members of the light source device according to the another preferred embodiment of the present invention.
Figure 33:
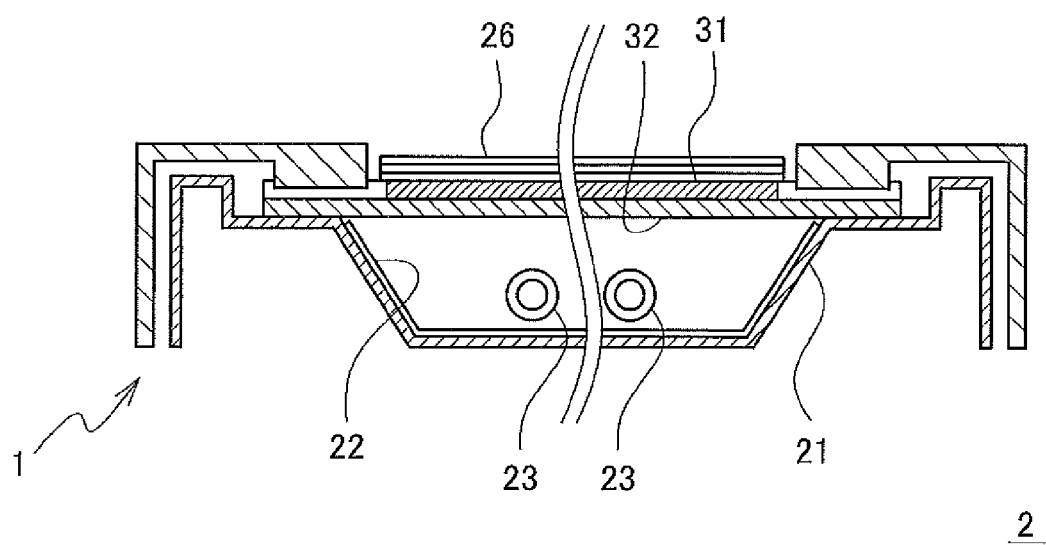
FIG. 33 is a schematic view showing a cross section structure of the light source device according to the another preferred embodiment of the present invention.

FIG. 32 is an exploded perspective view showing a schematic configuration of the light source device 2 according to the another preferred embodiment of the present invention. FIG. 33 is a schematic view showing a cross section structure of the light source device 2 according to the another preferred embodiment of the present invention. In FIGS. 32 and 33, the front surface of the light source device 2 faces toward the tops of FIGS. 32 and 33, and the back surface faces toward the bottoms of FIGS. 32 and 33.

The light source device 2 according to the another preferred embodiment of the present invention includes a chassis 21, a reflection sheet 22, light sources 23, light source holders 24, side holders 25, the plate-shaped optical member 31, another optical member 32 having a plate shape, optical members 26 having a sheet and/or film shape, the frame 1 according to the another preferred embodiment of the present invention, a light source driving circuit board 27, and a light source driving circuit board cover 28. In this description, the another plate-shaped optical member 32 is referred to as "the first plate-shaped optical member 32", and the plate-shaped optical member 31 (including the notches 311 at the given positions on its outer periphery) is referred to as "the second plate-shaped optical member 31".

The chassis 21 has the shape of a tray of low height. The chassis 21 includes a bottom 211, side walls 213, and support faces 212. The bottom 211 has a substantially planar surface. The bottom 211 may include through-holes disposed at given positions, with which the light source holders 24 are to be engaged. The side walls 213 are each disposed along the longer sides of the bottom 211 and raised from the bottom 211 toward the front side. The support faces 212 are disposed in the vicinity of top ends of the side walls 213. The support faces 212 are planes on which the border portions of the first plate-shaped optical member 32 and the second plate-shaped optical member 31 are to be placed, which are substantially parallel to the bottom 211.

The light sources 23 are capable of emitting light with a given wavelength (e.g., white light). A variety of conventional light sources can be used for the light sources 23. Examples of the conventional light sources include a fluorescent lamp such as a cold cathode fluorescent lamp and a hot cathode fluorescent lamp, a discharge lamp such as a xenon lamp, and a light emitting element such as an LED (Light Emitting Diode). The light source device 2 shown in FIGS. 32 and 33 includes linear fluorescent lamps as the light sources 23; however, the present invention is not limited to this configuration.

The reflection sheet 22 has a sheet, film or plate shape, and has a surface property of diffusely reflecting light. The reflection sheet 22 is preferably expanded PET (polyethylene terephthalate) formed like a sheet, film or plate. The reflection sheet 22 may include through-holes at its given positions, through which anchors (described later) of the light source holders 24 are made to pass, which are omitted and not shown in FIG. 32.

The light source holders 24 are arranged to hold the light sources 23 to fix to the chassis 21 while supporting the first plate-shaped optical member 32, the second plate-shaped optical member 31 and the sheet-shaped and/or film-shaped optical members 26. Each light source holder 24 includes clips for holding the light sources 23, a supporting pin for supporting the first plate-shaped optical member 32, the second plate-shaped optical member 31 and the sheet-shaped and/or film-shaped optical members 26, and the anchor for engaging light source holders 24 with the chassis 21. The clips, the supporting pin and the anchor of each light source holder 24 are of a monolithic construction preferably made of a resin material. Conventional light source holders can be used for the light source holders 24. For example, the light source holder disclosed in Japanese Patent Application Laid-Open Publication No. 2004-327449 (referred to as a "lamp holder" therein) can be favorably used for the light source holders 24.

The first plate-shaped optical member 32 and the second plate-shaped optical member 31 are arranged to control the properties of light transmitted therethrough. Diffusion plates are each used for the first plate-shaped optical member 32 and the second plate-shaped optical member 31. The diffusion plates are optical members having a plate shape, and have the function of randomly diffusing (or scattering) light transmitted therethrough, allowing uniformalization of intensity distribution in a plane direction of the light. The diffusion plates are made from a nearly clear resin material that is a base material, in which fine particles having a property of reflecting light, or fine particles made of a material having a refractive index different from the base material are mixed. The diffusion plates are formed like thin plates by being subjected to injection molding.

The first plate-shaped optical member 32 has a substantially square shape. The outer dimension of the first plate-shaped optical member 32 is set such that the first plate-shaped optical member 32 can be placed on the support faces 212 of the chassis 21, and is set to be larger than the dimension of the opening of the frame 1 according to the another preferred embodiment of the present invention. No notch is provided on the outer periphery of the first plate-shaped optical member 32.

The second plate-shaped optical member 31 has a substantially square shape. The outer dimension of the second plate-shaped optical member 31 is set such that the second plate-shaped optical member 31 can be placed on the support faces 212 of the chassis 21, and is set to be larger than the dimension of the opening of the frame 1 according to the another preferred embodiment of the present invention. The notches 311 are disposed at the given positions on the outer periphery of second plate-shaped optical member 31. The number, position and dimension of the notches 311 are set as described above.

The sheet-shaped and/or film-shaped optical members 26 are also arranged to control the properties of light transmitted therethrough. Examples of the sheet-shaped and/or film-shaped optical members 26 include a diffusion sheet, a lens sheet, and a reflective polarizing film.

The diffusion sheet has a function that is similar to the function of the diffusion plate. The diffusion sheet is made from a nearly clear material that is a base material, in which fine particles having a property of reflecting light, or fine particles made of a material having a refractive index different from the base material are mixed, and is formed into a sheet shape or a film shape. The nearly clear base material is preferably PET (polyethylene terephthalate).

The lens sheet has the function of gathering light transmitted therethrough, allowing enhancement of brightness of the light. The lens sheet has a layer structure made up of a base layer, and a layer of a given cross-sectional shape that has a light-gathering function. The base layer is preferably made from PET (polyethylene terephthalate). The layer having the light-gathering function is preferably made from an acrylic resin.

The reflective polarizing film (also referred to as a brightness enhancement film) has the function of effectively using light. To be specific, the reflective polarizing film is arranged to transmit light that is polarized in a given direction (i.e., light that vibrates in a given direction), and reflect light other than the polarized light. The reflective polarizing film is preferably a DBEF film (DBEF is a registered trademark of 3M COMPANY).

The outer dimension and shape of the sheet-shaped and/or film-shaped optical members 26 is set to fit in the opening of the front side section 11 of the frame 1 according to the another preferred embodiment of the present invention. In other words, the sheet-shaped and/or film-shaped optical members 26 are formed so as to have the dimension and the shape almost same as the opening of the front side section 11 of the frame 1, or formed so as to have the shape almost same as the opening while having the dimension smaller than it.

Conversely, the dimension of the opening of the front side section 11 of the frame 1 according to the another preferred embodiment of the present invention is set larger than the outer dimension of the sheet-shaped and/or film-shaped optical members 26, and set smaller than the outer dimensions of the first plate-shaped optical member 32 and the second plate-shaped optical member 31.

The light source driving circuit board 27 incorporates electronic circuits and/or electric circuits for driving the light sources 23. When fluorescent lamps are used for the light sources 23, the light source driving circuit board 27 incorporates an inverter circuit that generates a high-tension alternating-current voltage. The light source driving circuit board cover 28 has the shape of a plate, or a tray of low height. The light source driving circuit board cover 28 is arranged to protect the light source driving circuit board 27, and prevent unnecessary radiation from the light source driving circuit board 27. For this purpose, the light source driving circuit board cover 28 is made from a conductor such as metal.

Next, a description of assembly of the light source device 2 according to the another preferred embodiment of the present invention will be provided. The reflection sheet 22 is laid on the front surface of the bottom 211 of the chassis 21. The light sources 23 of a given number are arranged in parallel on the front surface of the bottom 211 of the chassis 21 on which the reflection sheet 22 is laid. The light sources 23 are held by the light source holders 24 and fixed to the front surface of the bottom 211 of the chassis 21.

The side holders 25 are disposed along the shorter sides of the chassis 21 so as to cover both end portions of the light sources 23.

The first plate-shaped optical member 32 and the second plate-shaped optical member 31 are layered on the front surfaces of the chassis 21 and the side holders 25. To be specific, the border portions of the first plate-shaped optical member 32 and the second plate-shaped optical member 31 are placed on the support faces 212 of the chassis 21 and the front surfaces of the side holders 25. The center portions of first plate-shaped optical member 32 and the second plate-shaped optical member 31 (i.e., portions that are not placed on the support faces 212 of the chassis 21 nor the front surfaces of the side holders 25) are supported by the supporting pins of the light source holders 24. The first plate-shaped optical member 32 is disposed behind the second plate-shaped optical member 31.

The sheet-shaped and/or film-shaped optical members 26 are layered on the front surface of the second plate-shaped optical member 31. Specific combinations of the sheet-shaped and/or film-shaped optical members 26 include a combination of two lens sheets, a diffusion sheet, and a reflective polarizing film, where the first lens sheet, the diffusion sheet, the second lens sheet, and the reflective polarizing film are layered in this order from the back side of the light source device 2.

The kind and combination of the sheet-shaped and/or film-shaped optical members 26 are not limited to the ones described above. The kind and combination of the sheet-shaped and/or film-shaped optical members 26 are preferably selected according to the kind and the requirements of the light source device 2 or the kind and the requirements of a display device including the light source device 2.

Then, the frame 1 according to the another preferred embodiment of the present invention is attached to the front surface of the chassis 21, whereby the border portions of the first plate-shaped optical member 32 and the second plate-shaped optical member 31 are sandwiched between the support faces 212 of the chassis 21 and the front side section 11 of the frame 1 and between the front surfaces of the side holders 25 and the front side section 11 of the frame 1 (see especially FIG. 33). Thus, the first plate-shaped optical member 32 and the second plate-shaped optical member 31 are held by the frame 1 in the light source device 2 according to the another preferred embodiment of the present invention.

The distance between the support faces 212 of the chassis 21 and the back surface of the front side section 11 of the frame 1 is set to be larger than the sum of the thicknesses of the first plate-shaped optical member 32 and the second plate-shaped optical member 31. Thus, sandwiched between the support faces 212 of the chassis 21 and the back surface of the front side section 11 of the frame 1, the border portions of the first plate-shaped optical member 32 and the second plate-shaped optical member 31 are prevented from being stuck and fixed therebetween. Thus, a clearance is formed between the second plate-shaped optical member 31 and the front side section 11 of the frame 1.

In order that the light source device 2 may have the configuration described above, the frame 1 according to the another preferred embodiment of the present invention and the chassis 21 have a configuration such that the dimension of a clearance formed between the support faces 212 and the front side section 11 is larger than the sum of the thicknesses of the first plate-shaped optical member 32 and the second plate-shaped optical member 31 when the frame 1 is attached to the chassis 21.

In addition, the frame 1 according to the another preferred embodiment of the present invention and the chassis 21 have a configuration such that the dimension of a clearance formed between the support faces 212 and top surfaces (surfaces facing the back side) of the engagement projections 12*a*, 12*b*, 12*c*, 12*d* is larger than the thickness of the first plate-shaped optical member 32 but smaller than the sum of the thicknesses of the first plate-shaped optical member 32 and the second plate-shaped optical member 31 when the frame 1 is attached to the chassis 21. Thus, the border portion of the first plate-shaped optical member 32 is prevented from being stuck between the engagement projections 12*a*, 12*b*, 12*c*, 12*d* of the front side section 11 of the frame 1 and the support faces 212 of the chassis 21.

When the frame 1 according to the another preferred embodiment of the present invention is attached to the front surface of the chassis 21, the engagement projections 12*a*, 12*b*, 12*c*, 12*d* of the front side section 11 are engaged with the notches 311 on the outer periphery of the second plate-shaped optical member 31. In other words, because the dimension of the clearance formed between the support faces 212 and the top surfaces of the engagement projections 12*a* is larger than the thickness of the first plate-shaped optical member 32 but smaller than the sum of the thicknesses of the first plate-shaped optical member 32 and the second plate-shaped optical member 31, the top surfaces (surfaces facing the back side) of the engagement projections 12*a*, 12*b*, 12*c*, 12*d* are disposed at a more back side than the front surface of the second plate-shaped optical member 31.

With the configuration described above, even when the first plate-shaped optical member 32 and the second plate-shaped optical member 31 change in dimension (or, even when a deformation volume of the front side section 11 of the frame 1 differs from that of the first plate-shaped optical member 32 and the second plate-shaped optical member 31) due to temperature change or humidity change, a force to hinder the change in dimension is prevented from being exerted on the border portions of the first plate-shaped optical member 32 and the second plate-shaped optical member 31. Consequently, the first plate-shaped optical member 32 and the second plate-shaped optical member 31, even if change in dimension, are maintained flat, which can prevent a wrinkle or distortion from occurring therein. Thus, luminance unevenness or shadow resulting from a wrinkle or distortion in the first plate-shaped optical member 32 and the second plate-shaped optical member 31 can be prevented from showing up.

In addition, when the frame 1 according to the another preferred embodiment of the present invention is attached, the sheet-shaped and/or film-shaped optical members 26 fit in the opening of the front side section 11, in other words, fit in the region surrounded by the engagement projections 12*a*, 12*b*, 12*c*, 12*d*.

Accordingly, the sheet-shaped and/or film-shaped optical members 26, even if shift in their plane direction, cannot shift out of the region surrounded by the engagement projections 12*a*, 12*b*, 12*c*, 12*d* because the outer surface of the sheet-shaped and/or film-shaped optical members 26 touches the engagement projections 12*a*, 12*b*, 12*c*, 12*d*. In other words, the engagement projections 12*a*, 12*b*, 12*c*, 12*d* confine a region within which the sheet-shaped and/or film-shaped optical members 26 can shift to the region surrounded by them, and thus the sheet-shaped and/or film-shaped optical members 26 cannot shift out of the region surrounded by the engagement projections 12*a*, 12*b*, 12*c*, 12*d*. In addition, because the portions of the lateral surfaces of the engagement projections 12*a*, 12*b*, 12*c*, 12*d* almost coincide with the inner peripheral surfaces 16 of the opening of the front side section 11, the borer portion of the sheet-shaped and/or film-shaped optical members 26 does not get into between the second plate-shaped optical member 31 and the front side section 11 of the frame 1.

Consequently, an unexpected force is prevented from being exerted on the border portion of the sheet-shaped and/or film-shaped optical members 26, which can prevent a wrinkle or distortion from occurring therein. For example, even when the sheet-shaped and/or film-shaped optical members 26 change in dimension due to temperature change or humidity change, the border portion of the sheet-shaped and/or film-shaped optical members 26 can be maintained in a free state (a state where no external force is exerted, or a state where the change in dimension is not hindered), which can prevent a wrinkle or distortion from occurring therein. Thus, because the sheet-shaped and/or film-shaped optical members 26 are maintained flat, luminance unevenness or shadow resulting from a wrinkle or distortion in the sheet-shaped and/or film-shaped optical members 26 can be prevented from showing up.

As described above, according to the light source device 2 according to the another preferred embodiment of the present invention, the formation of the clearance between the border portions of the first plate-shaped optical member 32 and the second plate-shaped optical member 31 and the front side section 11 of the frame 1 according to the another preferred embodiment of the present invention can prevent a wrinkle or distortion from occurring in the first plate-shaped optical member 32 and the second plate-shaped optical member 31 when the first plate-shaped optical member 32 and the second plate-shaped optical member 31 change in dimension, while the border portion of the sheet-shaped and/or film-shaped optical members 26 does not get into the clearance, which can prevent a wrinkle or distortion from occurring in the sheet-shaped and/or film-shaped optical members 26. Thus, luminance unevenness or shadow resulting from a wrinkle or distortion in the second plate-shaped optical member 31, the first plate-shaped optical member 32 and the sheet-shaped and/or film-shaped optical members 26 can be prevented from showing up. Therefore, the display quality of a display device including the light source device 2 can be maintained or improved.

In addition, when the second plate-shaped optical member 31, the first plate-shaped optical member 32 and the sheet-shaped and/or film-shaped optical members 26 shift or change in dimension, the outer surfaces thereof could get in contact with the lateral surfaces of the engagement projections 12*a*, 12*b*, 12*c*, 12*d*. When the engagement projections 12*a*, 12*b*, 12*c* shown in FIGS. 28A, 28B, 29A are used, the outer surfaces of the second plate-shaped optical member 31, the first plate-shaped optical member 32 and the sheet-shaped and/or film-shaped optical members 26 get in contact with the portions of the engagement projections 12*a*, 12*b*, 12*c* that are formed to project (i.e., formed to be curved surfaces). Thus, a local force is prevented from being exerted on the outer surfaces of the second plate-shaped optical member 31, the first plate-shaped optical member 32 and the sheet-shaped and/or film-shaped optical members 26. Consequently, a large force is prevented from being exerted at one point on the outer surfaces of the outer surfaces of the second plate-shaped optical member 31, the first plate-shaped optical member 32 and the sheet-shaped and/or film-shaped optical members 26, which can prevent a wrinkle or distortion from occurring around the positions where the second plate-shaped optical member 31, the first plate-shaped optical member 32 and the sheet-shaped and/or film-shaped optical members 26 get in contact with the engagement projections 12a, 12b, 12c. Thus, luminance unevenness or shadow resulting from a wrinkle or distortion in the second plate-shaped optical member 31, the first plate-shaped optical member 32 and the sheet-shaped and/or film-shaped optical members 26 can be prevented from showing up. Therefore, the display quality of a display device including the light source device 2 can be maintained or improved.

The light source driving circuit board 27 is disposed behind the chassis 21. The light source driving circuit board cover 28 is disposed so as to cover the light source driving circuit board 27. In FIG. 33, the light source driving circuit board 27 and the light source driving circuit board cover 28 are omitted and not shown.

With the configuration described above, the light emitted from the light sources 23 is transmitted through the second plate-shaped optical member 31, the first plate-shaped optical member 32 and the sheet-shaped and/or film-shaped optical members 26 while its properties are controlled thereby, and projected toward the outside.

Described above is the configuration that the light source device 2 includes one first plate-shaped optical member 32 and one second plate-shaped optical member 31; however, the numbers of the first plate-shaped optical member 32 and the second plate-shaped optical member 31 are not limited thereto. It is preferable that two or more first plate-shaped optical members 32 are included. In this case, the two or more first plate-shaped optical members 32 are layered, and the second plate-shaped optical member 31 is disposed in front of the first plate-shaped optical member 32 disposed at the most front side. Then, the engagement projections 12a, 12b, 12c, 12d of the front side section 11 are engaged with the notches 311 of the second plate-shaped optical member 31.

In this case, the distance between the support faces 212 of the chassis 21 and the front side section 11 of the frame 1 is set to be larger than the sum obtained by the following equation: the sum=(the thickness of one first plate-shaped optical member 32)×(the number of all the first plate-shaped optical members 32)+(the thickness of the second plate-shaped optical member 31). In addition, the clearance formed between the support faces 212 of the chassis 21 and the top surfaces of the engagement projections 12a, 12b, 12c, 12d of the front side section 11 is set to be larger than the sum obtained by the following equation: the sum=(the thickness of one first plate-shaped optical member 32)×(the number of all the first plate-shaped optical members 32), and smaller than the sum obtained by the following equation: the sum=(the thickness of one first plate-shaped optical member 32)×(the number of all the first plate-shaped optical members 32)+(the thickness of the second plate-shaped optical member 31). In this case, the two or more first plate-shaped optical members 32 are layered, and the one second plate-shaped optical member 31 is disposed in front of the first plate-shaped optical member 32 disposed at the most front side. Then, the engagement projections 12a, 12b, 12c, 12d of the front side section 11 are engaged with the notches 311 of the second plate-shaped optical member 31.

It is preferable that only one or more second plate-shaped optical members 31 are included and no first plate-shaped optical member 32 is included. In this case, the distance between the support faces 212 of the chassis 21 and the front side section 11 of the frame 1 is set to be larger than the sum obtained by the following equation: the sum=(the thickness of one second plate-shaped optical member 31)×(the number of all the second plate-shaped optical members 31). In addition, the clearance formed between the support faces 212 of the chassis 21 and the top surfaces of the engagement projections 12a, 12b, 12c, 12d of the front side section 11 is set to be smaller than the sum obtained by the following equation: the sum=(the thickness of one second plate-shaped optical member 31)×(the number of all the second plate-shaped optical members 31). Then, the engagement projections 12a, 12b, 12c, 12d of the front side section 11 are engaged with the notches 311 of the second plate-shaped optical member 31.

By having the configuration that only one or more second plate-shaped optical members 31 are included and no first plate-shaped optical member 32 is included, the kind of plate-shaped optical members can be reduced (or, the need to increase the kind is eliminated). Therefore, reduction of cost of production or cost of parts can be achieved, or increase thereof can be restrained. In addition, this configuration eliminates the necessity to distinguish the second plate-shaped optical members 31 from the first plate-shaped optical member 32 in assembling the light source device 2 according to the another preferred embodiment of the present invention, which can simplify the assembly operation.

As described above, it is essential that at least one second plate-shaped optical member 31 should be included, which is opposed directly to the back surface of the front side section 11 of the frame 1 according to the another preferred embodiment of the present invention, and the number of first plate-shaped optical member 32 and the number of second plate-shaped optical member 31 are not limited. It is also preferable that only one second plate-shaped optical member 31 is included and no first plate-shaped optical member 32 is included. In addition, in using a plurality of plate-shape optical members, it is essential only that the second plate-shaped optical member 31 should be disposed at the most front side, and it does not matter whether the plate-shaped optical members except the second plate-shaped optical member 31 disposed at the most front side are a first plate-shaped optical member 32 or a second plate-shaped optical member 31.

It is essential only that the engagement projections 12a, 12b, 12c, 12d should be engaged with the notches 311 of the second plate-shaped optical member 31 opposed directly to the back surface of the front side section 11 of the frame 1 according to the another preferred embodiment of the present invention. That is, in using one second plate-shaped optical member 31, it is essential only that the engagement projections 12a, 12b, 12c, 12d should be engaged with the notches 311 of the second plate-shaped optical member 31. In addition, in using two or more second plate-shaped optical member 31, it is essential only that the engagement projections 12a, 12b, 12c, 12d should be engaged with the notches 311 of the second plate-shaped optical member 31 disposed at the most front side, and it does not matter whether the engagement projections 12a, 12b, 12c, 12d are engaged with the notches 311 of the other second plate-shaped optical members 31, or not.

Figure 34:
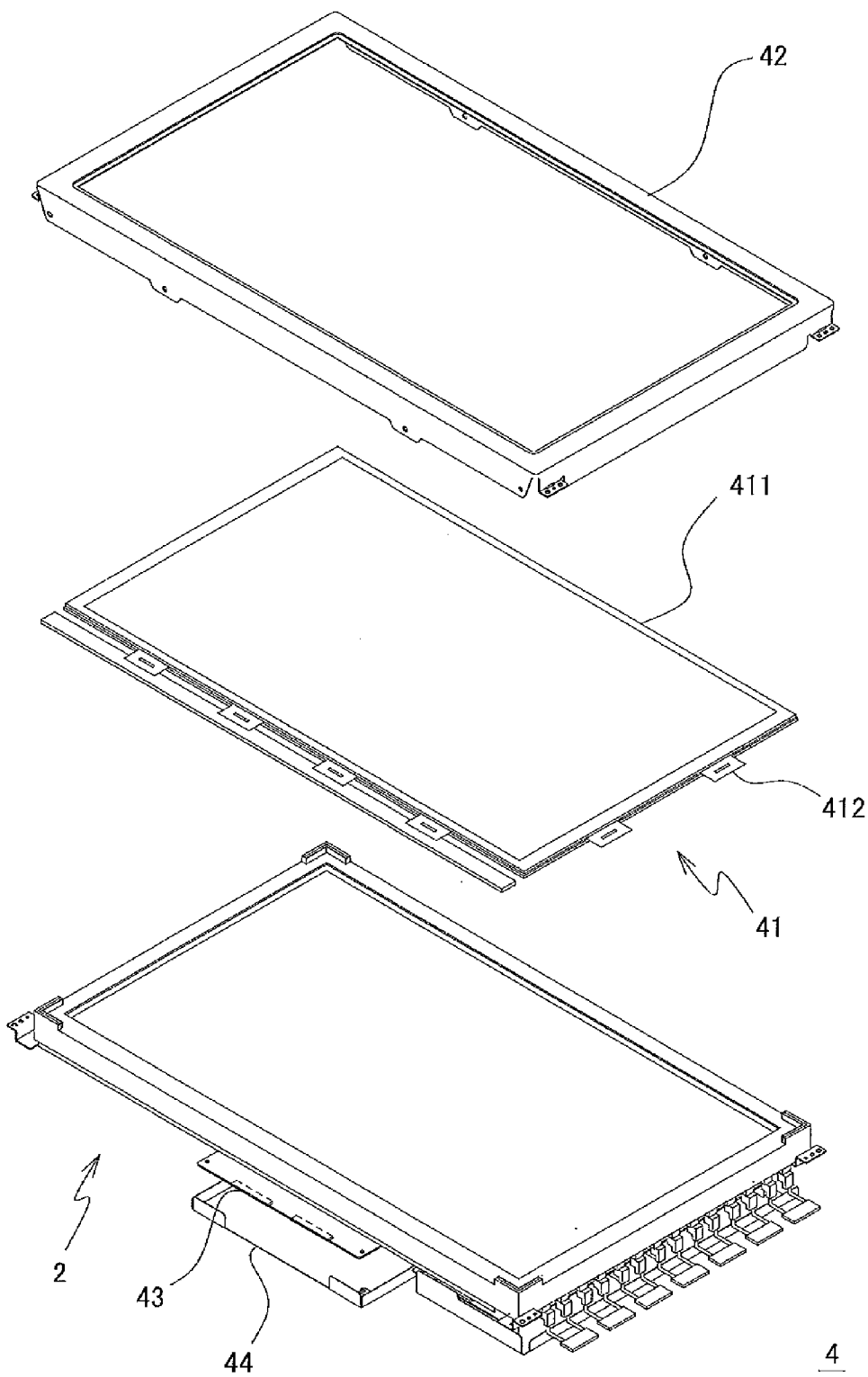
FIG. 34 is an exploded perspective view showing a schematic configuration of a display device according to another preferred embodiment of the present invention.

Next, a description of a display device 4 according to another preferred embodiment of the present invention that includes the light source device 2 according to the another preferred embodiment of the present invention will be provided. FIG. 34 is an exploded perspective view showing a schematic configuration of the display device 4 according to the another preferred embodiment of the present invention.

As shown in FIG. 34, the display device 4 according to the another preferred embodiment of the present invention includes the light source device 2 according to the another preferred embodiment of the present invention, a display panel assembly 41, a bezel 42, a control circuit board 43, and a control circuit board cover 44.

The display panel assembly 41 includes a display panel 411, and a circuit board 412 that incorporates driver ICs (or driver SIs) arranged to drive the display panel 411. A variety of conventional transmissive display panels can be used for the display panel 411. For example, a generally-used transmissive active matrix liquid crystal display panel can be used. The generally-used transmissive crystal display panel includes a pair of substrates (a TFF array substrate and a color filter), and liquid crystals are filled between the substrates. When one surface of the display panel 411 is illuminated with light, the light transmits the substrates to display an image visible on the other surface of the display panel 411. That is, the image display is performed using the light emitted from a light source device.

The bezel 42 has the function of supporting and protecting the display panel assembly 41. As shown in FIG. 34, the bezel 42 has a substantially square shape with an opening. A variety of conventional bezels can be used for the bezel 42.

The control circuit board 43 incorporates electronic circuits and/or electric circuits for generating a signal to control the display panel 411 based on a signal inputted from the outside (e.g., a tuner). A variety of conventional control circuit boards can be used for the control circuit board 43. The control circuit board cover 44 has the shape of a plate, or a tray of low height to cover the control circuit board 43. The control circuit board cover 44 has the function of protecting the control circuit board 43, and preventing unnecessary radiation from the control circuit board 43. For this purpose, the light source driving circuit board cover 44 is made from a conductor such as metal.

Next, a description of assembly of the display device 4 according to the another preferred embodiment of the present invention will be provided.

The display panel assembly 41 is disposed in front of the light source device 2 according to the another preferred embodiment of the present invention. To be specific, the display panel 411 is placed on the front surface of the front side section 11 of the frame 1 according to the another preferred embodiment of the present invention, and located by the locating projections 14. The circuit board 412 attached to the display panel 411 is disposed on the front surface of the front side section 11 of the frame 1 and on the outer surfaces of the outer walls 13.

Then, the bezel 42 is attached to the front surfaces of and the display panel assembly 41 and the light source device 2. Thus, the border portion of the display panel 411 is sandwiched between the front side section 11 and the bezel 42, whereby the display panel assembly 41 is held in the display device 4.

The control circuit board 43 is disposed behind the chassis 21 of the light source device 2 according to the another preferred embodiment of the present invention. The control circuit board cover 44 is disposed so as to cover the control circuit board 43.

Figure 35:
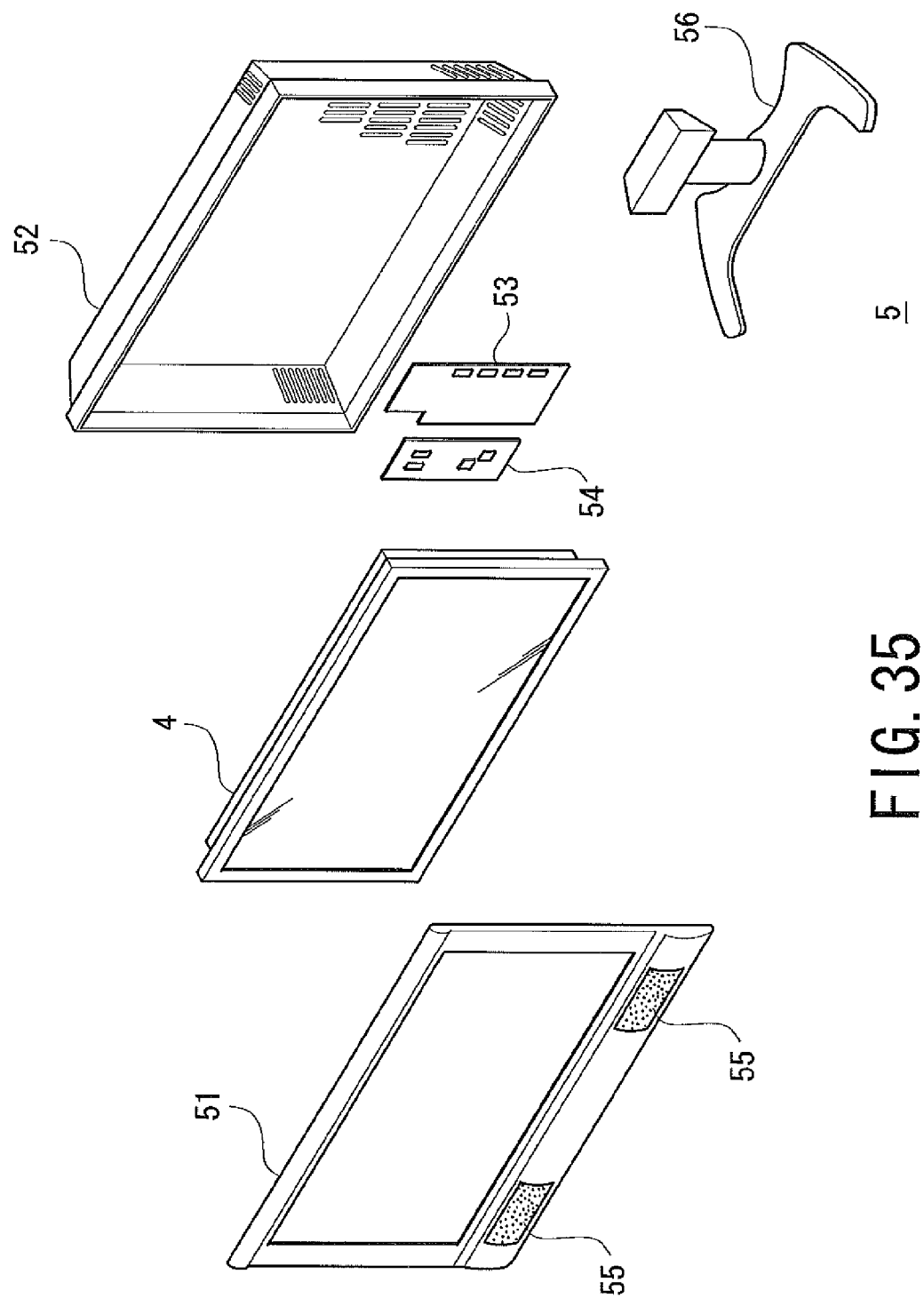
FIG. 35 is an exploded perspective view showing an example of a schematic configuration of a television receiver including the display device according to the another preferred embodiment of the present invention.

Next, a brief description of a television receiver 5 including the display device 4 according to the another preferred embodiment of the present invention will be provided. FIG. 35 is an exploded perspective view showing a schematic configuration of the television receiver 5 including the display device 4 according to the another preferred embodiment of the present invention. The television receiver 5 includes the display device 4 according to the another preferred embodiment of the present invention, an electric power supply board 53, a tuner 54, loudspeaker units 55, a front side cabinet 51, a back side cabinet 52, and a supporting member 56.

The electric power supply board 53 is arranged to supply electric power to the display device 4 according to the another preferred embodiment of the present invention, the tuner 54 and other components. A variety of conventional electric power supply boards may be used for the electric power supply board 53.

The tuner board 54 is arranged to produce an image signal and a sound signal of a given channel based on a received radio wave and a signal inputted from the outside. A conventional terrestrial tuner (analog and/or digital), a BS tuner and a CS tuner may be used for the tuner 54.

The display device 4 according to the another preferred embodiment of the present invention is arranged to display an image based on the image signal of the given channel produced by the tuner 54. The loudspeaker units 55 are arranged to produce a sound based on the sound signal produced by the tuner 54. A variety of conventional loudspeaker units such as generally-used speakers may be used for the loudspeaker units 55.

The display device 4 according to the another preferred embodiment of the present invention, the electric power supply board 53, the tuner 54 and the loudspeaker units 55 are housed between the front side cabinet 51 and the back side cabinet 52, which is supported by the supporting member 56. The television receiver 5 is not limited to this configuration. For example, the electric power supply board 53, the tuner board 54 and the loudspeaker units 55 may be incorporated in the display device 4 according to the another preferred embodiment of the present invention.

The foregoing descriptions of the preferred embodiments of the present invention have been presented for purposes of illustration and description with reference to the drawings. However, it is not intended to limit the present invention to the preferred embodiments, and modifications and variations are possible as long as they do not deviate from the principles of the present invention.

The invention claimed is:

1. A frame for holding a first optical member and a second optical member, the frame comprising:
   a first holding face disposed opposed to a border portion on one face in a thickness direction of the first optical member;
   a second holding face disposed opposed to an end face in a plane direction of the second optical member;
   a male engagement portion arranged to be engaged with a female engagement portion disposed at a given position on the border portion of the first optical member; and
   an opening that is smaller than an outer dimension of the first optical member and larger than an outer dimension of the second optical member, wherein an inner peripheral surface of the opening functions as the second holding face.

2. The frame according to claim 1, wherein the second holding face corresponds inside an outer periphery of the first optical member in a state where the male engagement portion is engaged with the female engagement portion of the first optical member.

3. The frame according to claim 1, wherein the inner peripheral surface of the opening comprises a protrusion that protrudes inward, wherein the protrusion comprises a third holding face disposed opposed to a border portion on one face in a thickness direction of the second optical member.

4. The frame according to claim 1, wherein the male engagement portion comprises a structure having a convex shape that is disposed on the first holding face.

5. The frame according to claim 4, wherein at least a portion of a lateral surface of the male engagement portion almost coincides with the second holding face.

6. The frame according to claim 4, wherein the male engagement portion has a lateral surface having a projecting shape, the lateral surface being oriented in a direction same as the second holding face, wherein the male engagement portion has any one of a substantially round shape, a substantially oval shape and a substantially half-round shape.

7. The frame according to claim 1, wherein the male engagement portions are each disposed at positions close to both ends of all sides of the frame.

8. A light source device comprising:
the frame according to claim 1;
a light source;
a first optical member that comprises a female engagement portion disposed at a given position on a border portion of the first optical member, and is arranged to control properties of light transmitted therethrough;
a second optical member that is arranged to control properties of light transmitted therethrough; and
a chassis that comprises a support face on which a border portion of the first optical member is placed, the light source being disposed in front of the chassis, the first optical member being disposed in front of the chassis and the light source, the frame being attached to a front surface of the chassis,
wherein the border portion of the first optical member is held between the support face of the chassis and the first holding face of the frame while the male engagement portion of the frame is engaged with the female engagement portion of the first optical member, and the second optical member fits in the region surrounded by the second holding face of the frame.

9. The light source device according to claim 8, wherein the first optical member comprises an optical member that has a plate shape, and the second optical member comprises an optical member having a sheet shape or a film shape that is more deformable than the first optical member.

10. A light source device comprising:
the frame according to claim 1;
a light source;
one or more first optical members that comprise a female engagement portion disposed at a given position on a border portion of the one or more first optical members, and are arranged to control properties of light transmitted therethrough;
one or more second optical members that are arranged to control properties of light transmitted therethrough;
one or more third optical members that are arranged to control properties of light transmitted therethrough; and
a chassis that comprises a support face on which a border portion of the one or more first optical members and a border portion of the one or more third optical members are placed, the light source being disposed in front of the chassis, the one or more third optical members being disposed in front of the chassis and the light source, the one or more first optical members being disposed in front of the one or more third optical members, the frame being attached to a front surface of the chassis,
wherein the border portion of the one or more first optical members and the border portion of the one or more third optical members are held between the support face of the chassis and the first holding face of the frame while the male engagement portion of the frame is engaged with the female engagement portion of the one or more first optical members, and the one or more second optical members fit in the region surrounded by the second holding face of the frame.

11. The light source device according to claim 10, wherein the one or more first optical members and the one or more third optical members comprise optical members that have a plate shape, and the one or more second optical members comprise optical members that have a sheet shape or a film shape and are more deformable than the one or more first optical members and the one or more third optical members.

12. A display device comprising:
the light source device according to claim 8; and
a display panel that is arranged to perform display using light emitted from the light source device, and comprises a liquid crystal display panel that comprises:
a pair of substrates; and
liquid crystals that are filled between the substrates.

13. The display device according to claim 12, further comprising:
a bezel attached to front surfaces of the light source device and the display panel.

14. A television receiver comprising the display device according to claim 12.

15. A frame for holding a first optical member and a second optical member, the frame comprising:
a first holding face disposed opposed to a border portion on one face in a thickness direction of the first optical member;
a second holding face disposed opposed to an end face in a plane direction of the second optical member;
a male engagement portion arranged to be engaged with a female engagement portion disposed at a given position on the border portion of the first optical member; and
an opening that is smaller than an outer dimension of the first optical member and larger than an outer dimension of the second optical member, wherein the second holding face is provided to an inner peripheral surface of the opening.

16. A frame for holding a first optical member and a second optical member, the frame comprising:
a first holding face disposed opposed to a border portion on one face in a thickness direction of the first optical member;
a second holding face disposed opposed to an end face in a plane direction of the second optical member;
a male engagement portion arranged to be engaged with a female engagement portion disposed at a given position on the border portion of the first optical member; and
an opening that is smaller than an outer dimension of the first optical member and an outer dimension of the second optical member, wherein the second holding face is disposed outer than an inner peripheral surface of the opening.

17. The frame according to claim 16, wherein the second holding face corresponds inside an outer periphery of the first optical member in a state where the male engagement portion is engaged with the female engagement portion of the first optical member.

18. The frame according to claim 17, wherein the first holding face is disposed outer than the second holding face, and the third holding surface is disposed inner than the second holding face.

* * * * *